United States Patent
Akhbari et al.

(10) Patent No.: US 10,719,175 B2
(45) Date of Patent: Jul. 21, 2020

(54) ULTRASONIC TOUCH SENSOR AND SYSTEM

(71) Applicant: UltraSense Systems, Inc., Santa Clara, CA (US)

(72) Inventors: Sina Akhbari, San Jose, CA (US); Hao-Yen Tang, San Jose, CA (US); Mo Maghsoudnia, San Jose, CA (US); Man-Chia Chen, Palo Alto, CA (US)

(73) Assignee: UltraSense System, Inc., San Jose, CA (US)

( * ) Notice: Subject to any disclaimer, the term of this patent is extended or adjusted under 35 U.S.C. 154(b) by 0 days.

(21) Appl. No.: 16/418,180

(22) Filed: May 21, 2019

(65) Prior Publication Data

US 2019/0354210 A1 Nov. 21, 2019

Related U.S. Application Data

(63) Continuation-in-part of application No. 16/396,597, filed on Apr. 26, 2019, now Pat. No. 10,466,844, and
(Continued)

(51) Int. Cl.
*G06F 3/043* (2006.01)
*B25J 13/08* (2006.01)
(Continued)

(52) U.S. Cl.
CPC .......... *G06F 3/0436* (2013.01); *B25J 13/084* (2013.01); *G06F 3/0416* (2013.01); *H04M 1/026* (2013.01);
(Continued)

(58) Field of Classification Search
CPC .... G06F 3/0436; G06F 3/0416; B25J 13/084; H04M 1/026; B60K 2370/1446; B60K 37/06; B62D 1/046
See application file for complete search history.

(56) References Cited

U.S. PATENT DOCUMENTS 4,412,544 A 11/1983 Beretsky et al.
8,676,540 B1 3/2014 Welch et al.
(Continued)

FOREIGN PATENT DOCUMENTS

WO 2018077761 A1 5/2018

OTHER PUBLICATIONS

U.S. Appl. No. 16/396,597, Notice of Allowance dated Jun. 17, 2019, 11 pages.
(Continued)

*Primary Examiner* — Stephen G Sherman
(74) *Attorney, Agent, or Firm* — Kilpatrick Townsend & Stockton LLP

(57) ABSTRACT

A touch sensor chip can comprise an ultrasound sensor layer comprising an array of ultrasonic transducers. The array of ultrasonic transducers can comprise one or more ultrasonic transducers. The touch sensor chip can also comprise an integrated circuit layer coupled to the ultrasound sensor layer. The integrated circuit layer can comprise circuitry configured for driving the array of ultrasonic transducers to generate ultrasound signals and receiving reflected ultrasound signals using the array of ultrasonic transducers. The integrated circuit layer can also comprise circuitry configured for generating an energy signal associated with received reflected ultrasound signals.

11 Claims, 64 Drawing Sheets

Related U.S. Application Data a continuation-in-part of application No. 16/417,184, filed on May 20, 2019, now Pat. No. 10,585,534.

(60) Provisional application No. 62/674,317, filed on May 21, 2018, provisional application No. 62/725,697, filed on Aug. 31, 2018, provisional application No. 62/751,053, filed on Oct. 26, 2018, provisional application No. 62/784,615, filed on Dec. 24, 2018.

(51) Int. Cl.
| | |
|---|---|
| *G06F 3/041* | (2006.01) |
| *H04M 1/02* | (2006.01) |
| *B62D 1/04* | (2006.01) |
| *B60K 37/06* | (2006.01) |

(52) U.S. Cl.
CPC ...... *B60K 37/06* (2013.01); *B60K 2370/1446* (2019.05); *B62D 1/046* (2013.01)

(56) References Cited

U.S. PATENT DOCUMENTS

| | | | |
|---|---|---|---|
| 10,466,844 | B1 | 11/2019 | Tang et al. |
| 2001/0000666 | A1 | 5/2001 | Wood et al. |
| 2002/0005108 | A1 | 1/2002 | Ludwig |
| 2003/0144814 | A1 | 7/2003 | Hama et al. |
| 2003/0217873 | A1 | 11/2003 | Paradiso et al. |
| 2003/0233233 | A1 | 12/2003 | Hong |
| 2007/0260425 | A1 | 11/2007 | Kim |
| 2008/0316184 | A1 | 12/2008 | D'Souza |
| 2009/0157206 | A1 | 6/2009 | Weinberg et al. |
| 2009/0224161 | A1* | 9/2009 | Fritsch ............... G02B 6/08 250/370.09 |
| 2010/0117993 | A1 | 5/2010 | Kent |
| 2010/0139991 | A1 | 6/2010 | Philipp et al. |
| 2010/0258361 | A1 | 10/2010 | Yamauchi et al. |
| 2011/0061464 | A1 | 3/2011 | Yi-Min |
| 2012/0274609 | A1 | 11/2012 | Sheng et al. |
| 2013/0345864 | A1 | 12/2013 | Park |
| 2014/0022189 | A1 | 1/2014 | Sheng et al. |
| 2014/0071095 | A1 | 3/2014 | Godsill |
| 2015/0148674 | A1 | 5/2015 | Park et al. |
| 2015/0169136 | A1* | 6/2015 | Ganti ............... B06B 1/0666 345/177 |
| 2016/0216794 | A1 | 7/2016 | Yoon et al. |
| 2016/0246449 | A1* | 8/2016 | Jarske ............... G06F 3/0436 |
| 2017/0110504 | A1* | 4/2017 | Panchawagh ........ H01L 27/20 |
| 2017/0255338 | A1 | 9/2017 | Medina et al. |
| 2017/0322290 | A1 | 11/2017 | Ng et al. |
| 2017/0336903 | A1 | 11/2017 | Rivaud et al. |
| 2017/0336926 | A1 | 11/2017 | Chaudhri et al. |
| 2018/0032161 | A1 | 2/2018 | Shi et al. |
| 2018/0032211 | A1 | 2/2018 | King et al. |
| 2018/0039392 | A1 | 2/2018 | Kim et al. |
| 2018/0164937 | A1 | 6/2018 | Lynn et al. |
| 2018/0246612 | A1 | 8/2018 | Lynn et al. |
| 2018/0276440 | A1* | 9/2018 | Strohmann ......... G06K 9/0002 |
| 2018/0284892 | A1* | 10/2018 | Kwon ............... G06F 3/04817 |
| 2018/0323783 | A1* | 11/2018 | Bang .................. G01S 15/04 |
| 2019/0050618 | A1 | 2/2019 | Khuri-Yakub et al. |
| 2019/0074833 | A1 | 3/2019 | Sheng et al. |
| 2019/0354209 | A1 | 11/2019 | Tang et al. |
| 2019/0354237 | A1 | 11/2019 | Tang et al. |
| 2019/0354238 | A1 | 11/2019 | Akhbari et al. |

OTHER PUBLICATIONS

U.S. Appl. No. 16/417,184, Non-Final Office Action dated Jul. 1, 2019, 18 pages.
International Patent Application No. PCT/US2019/033366, Invitation to Pay Additional Fees and, Where Applicable, Protest Fee, dated Jul. 3, 2019, 2 pages.
U.S. Appl. No. 16/417,184, Notice of Allowance dated Oct. 25, 2019, 12 pages.
U.S. Appl. No. 16/418,410, Non-Final Office Action dated Aug. 26, 2019, 15 pages.
International Patent Application No. PCT/US2019/033366, International Search Report and Written Opinion, dated Sep. 13, 2019, 17 pages.
U.S. Appl. No. 16/418,410, Final Office Action dated Dec. 10, 2019, 17 pages.
U.S. Appl. No. 16/570,995, Non-Final Office Action dated Dec. 3, 2019, 21 pages.

* cited by examiner

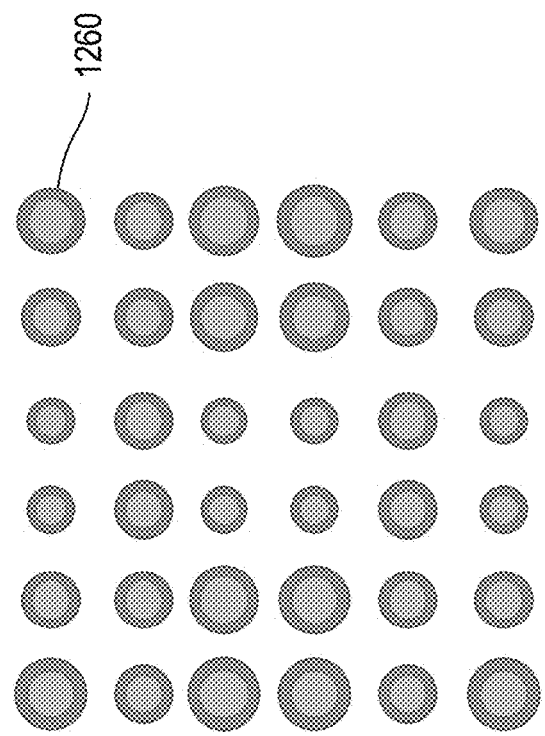
FIG. 12B

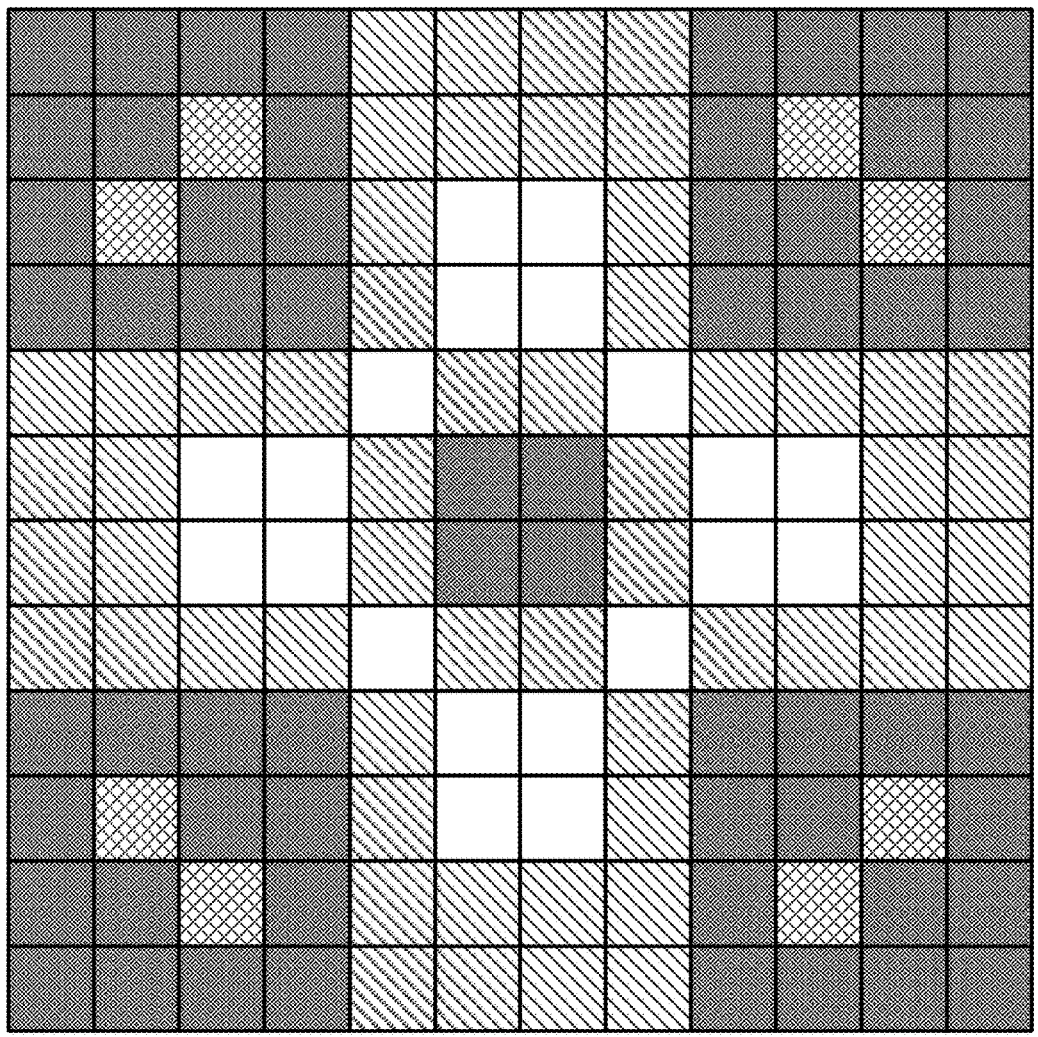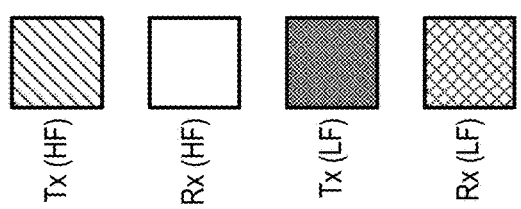
FIG. 13A

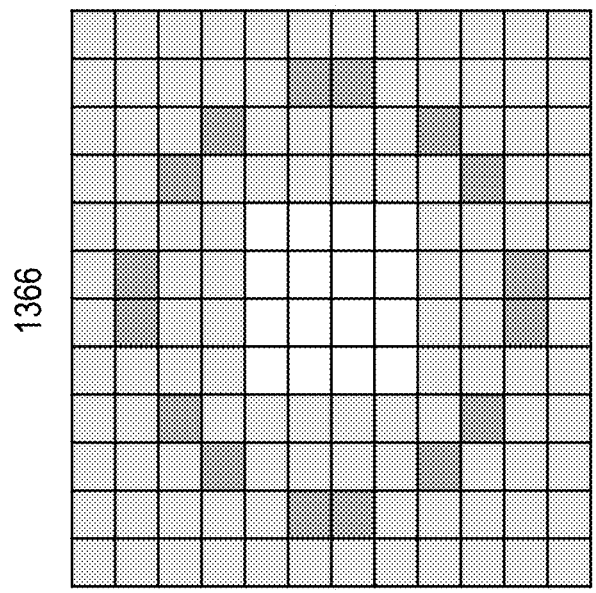
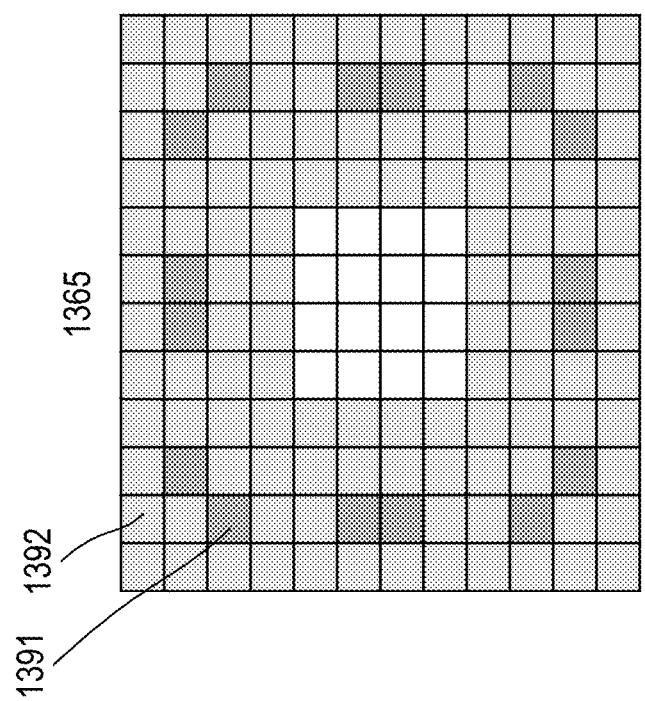
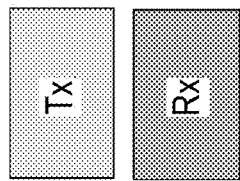
FIG. 13E

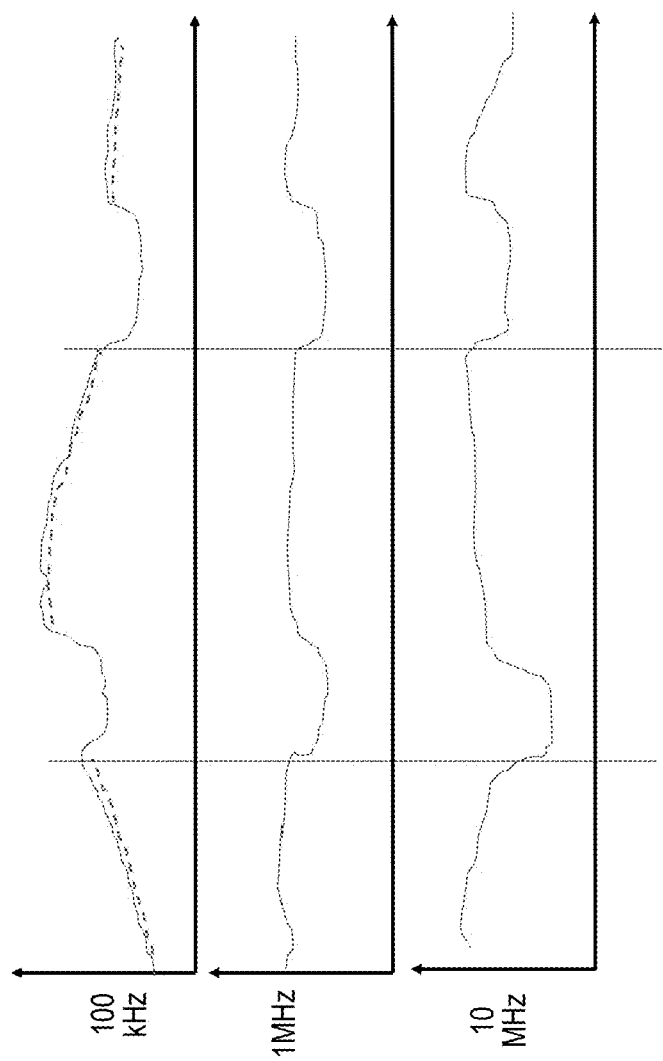
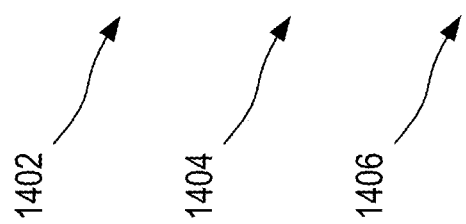
FIG. 14

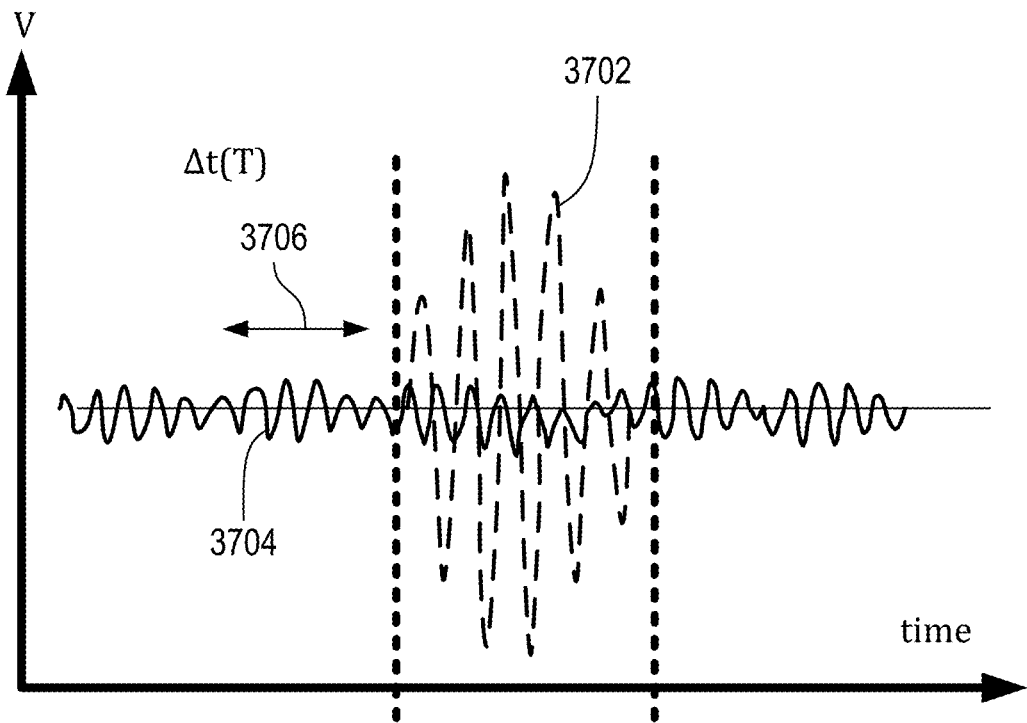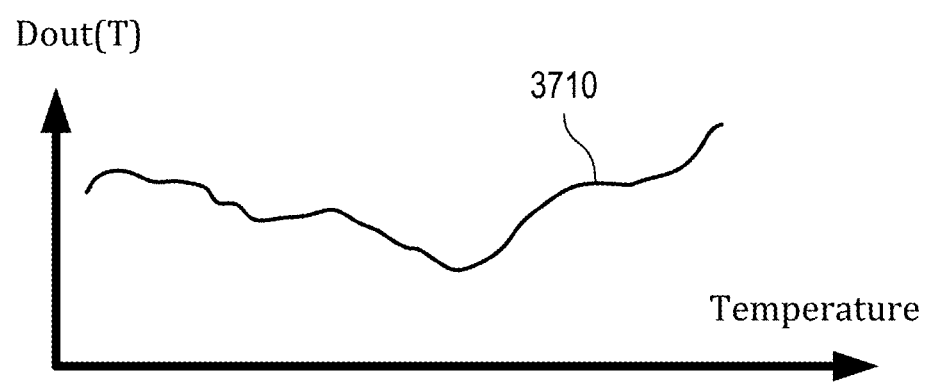
FIG. 37

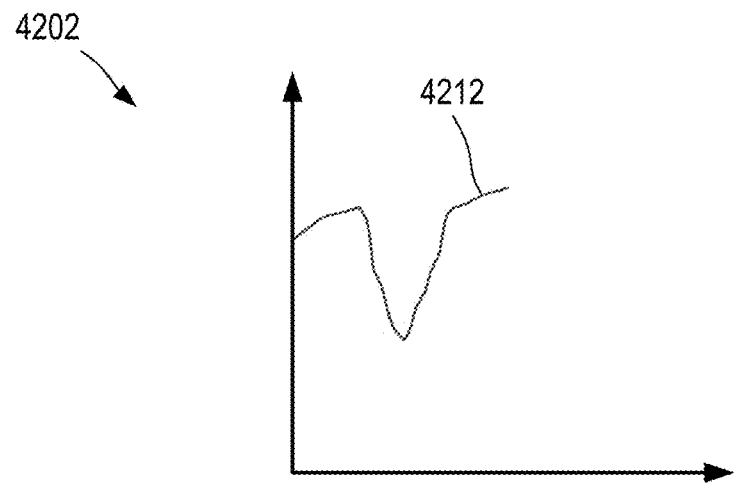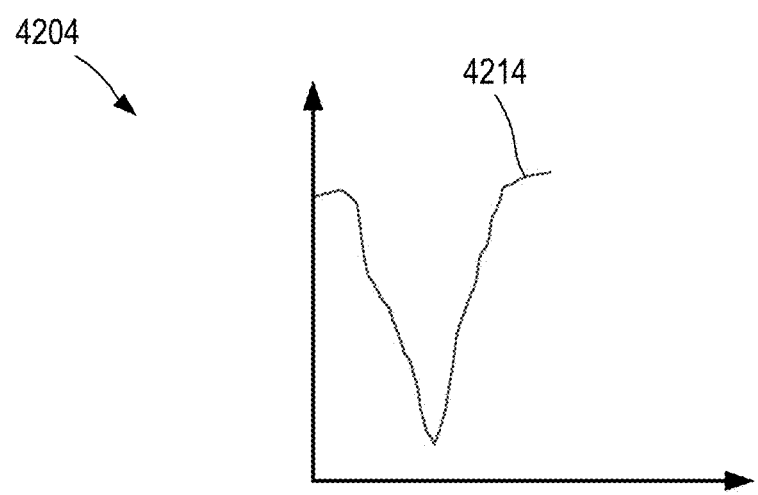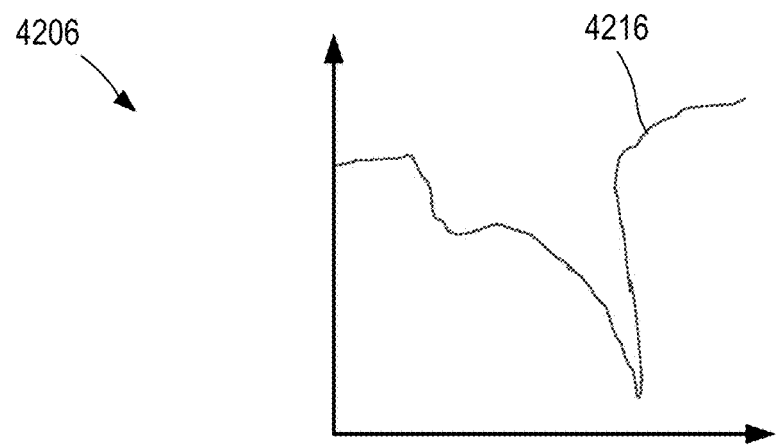
FIG. 42

Material Detection
Normal finger
Plastic glove (sticky)
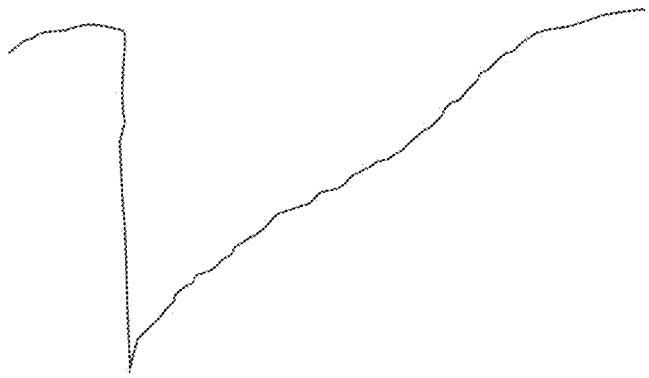
FIG. 55

ULTRASONIC TOUCH SENSOR AND SYSTEM

CROSS-REFERENCES TO RELATED APPLICATIONS

The present application is a non-provisional of and claims the benefit of U.S. Provisional Application No. 62/674,317 filed May 21, 2018 and entitled "ULTRASONIC TOUCH AND FORCE INPUT DETECTION," U.S. Provisional Application No. 62/725,697 filed Aug. 31, 2018 and entitled "ULTRASONIC TOUCH AND FORCE INPUT DETECTION," U.S. Provisional Application No. 62/751,053 filed Oct. 26, 2018 and entitled "ULTRASONIC TOUCH FEATURE EXTRACTION," U.S. Provisional Application No. 62/784,615 filed Dec. 24, 2018 and entitled "ULTRASONIC TOUCH SENSOR AND SYSTEM," is a continuation-in-part of U.S. patent application Ser. No. 16/396,597 filed Apr. 26, 2019 and entitled "ULTRA SONIC TOUCH AND FORCE INPUT DETECTION," and is a continuation-in-part of U.S. patent application Ser. No. 16/417,184 filed May 20, 2019 and entitled "ULTRASONIC TOUCH FEATURE EXTRACTION," which are all hereby incorporated by reference in their entirety.

BACKGROUND

Capacitive, resistive and inductive sensing are used in industrial, automotive, medical, and consumer applications to detect touch inputs. The use of capacitive technology to detect a touch input has grown rapidly in human interface devices (HID), such as track-pads and touch-screens. Consumer and industrial applications are beginning to adopt touch-buttons and sliders using capacitive technology in devices such as mobile phones, TV controls, automotive dashboards, remote controls, or industrial controls. Capacitive sensing has proven to be much more appealing than mechanical switches and rotary encoders, both in terms of looks and reliability.

However, the use of capacitive, resistive, or inductive sensing limits creative industrial designs due to challenges in touch input layout and system stack up. Conflicting priorities between design and robustness further complicates the design. It is also to be noted that present input touch sensing methodologies cannot be implemented on metal surfaces. In addition, current sensing technologies has inherent properties that limit water-proof applications. Pressure sensing technologies using strain gauges have emerged as alternative sensing technologies for metal surface touch input. However, the measurement of deflection and strain is often unreliable, specifically in metals. Such sensors are highly susceptible to unwanted disturbances resulting in deflection of the surface, and their sensitivity and performance are very dependent on the overall boundary conditions of the surface they are attached to. In addition, the surface the sensor is attached to has to be conformal enough that it deflects adequately upon human touching in order for the sensor to be able to detect it. Additional sensing layers (e.g., capacitive) are required to detect an x-y position of an input touch detected using a strain gauge. Increased complexity in touch input interface materials, the implications of complex interfaces on industrial designs, water-proofing, and cost have been key challenges limiting the use of touch-inputs in any environment and in with any material. There is a need for improved systems and methods of detecting touch inputs to human machine interfaces (HMI).

Embodiments of the invention address these and other problems, individually and collectively.

BRIEF SUMMARY

Embodiments of the invention are directed to systems, methods, and apparatuses relating to ultrasonic touch sensors and systems. A touch sensor can comprise an ultrasound sensor layer and an integrated circuit layer.

The ultrasound sensor layer can comprise an array of ultrasonic transducers. The array of ultrasonic transducers can comprise one or more ultrasonic transducers. The integrated circuit layer can be coupled to the ultrasound sensor layer. The integrated circuit layer can comprise circuitry configured for driving the array of ultrasonic transducers to generate ultrasound signals. The integrated circuit layer can also comprise circuitry configured for receiving reflected ultrasound signals using the array of ultrasonic transducers as well as generating an energy signal associated with received reflected ultrasound signals.

According to some embodiments, a method that can be performed by the touch sensor, or other suitable device, is provided. The method includes generating a driving signal in the integrated circuit coupled to a transmitting ultrasonic transducer in an array of ultrasonic transducers coupled to the integrated circuit. The transmitting ultrasonic transducer can be a piezoelectric micromachined ultrasonic transducer. An emitted ultrasound signal can then be generated by the transmitting ultrasonic transducer, in response to the driving signal. Generating the emitted ultrasound signal can include transmitting the emitted ultrasound signal through a material layer in a longitudinal direction that is normal to an exterior surface of the material layer or, in some embodiments, is within 20% of normal to the exterior surface of the material layer. A set of reflection signals can then be received at a receiving ultrasonic transducer in the array of ultrasonic transducers. The set of reflection signals can comprise one or more ultrasound signals associated with the emitted ultrasound signal. The receiving ultrasonic transducer can be a piezoelectric micromachined ultrasonic transducer. Then, an energy signal can be measured. The energy signal can be associated with the received set of reflected signals. The method can further include determining that a touch event has occurred at the exterior surface of the material layer based on the measured energy signal.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION

FIG. 12B is a top view of an alternate sensor array of an ultrasound input device according to certain aspects of the present disclosure.

Figure 12A:
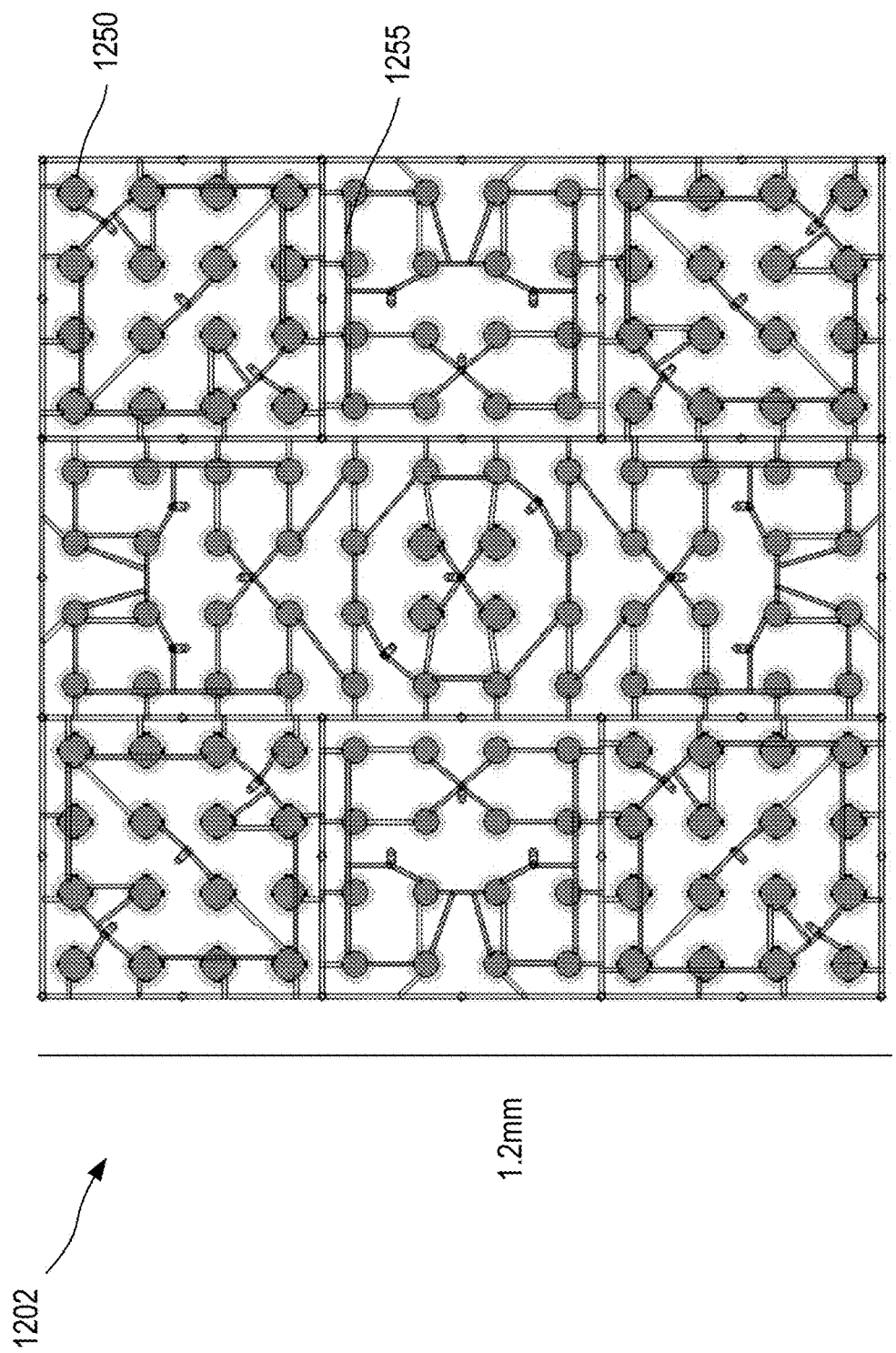
FIG. 12A is a top view of a sensor array of an ultrasound input device according to certain aspects of the present disclosure.
Figure 13B:
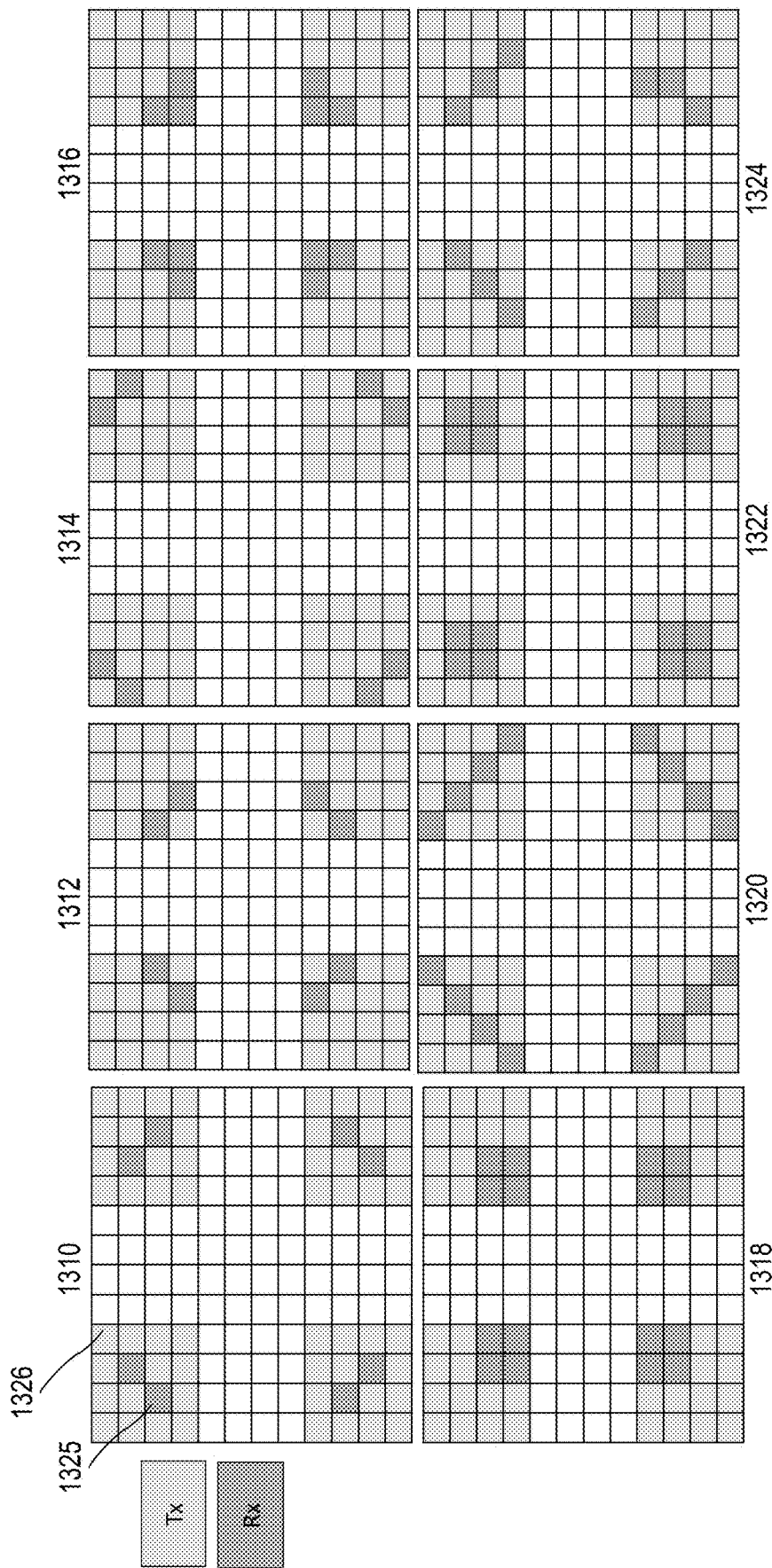
Figure 13C:
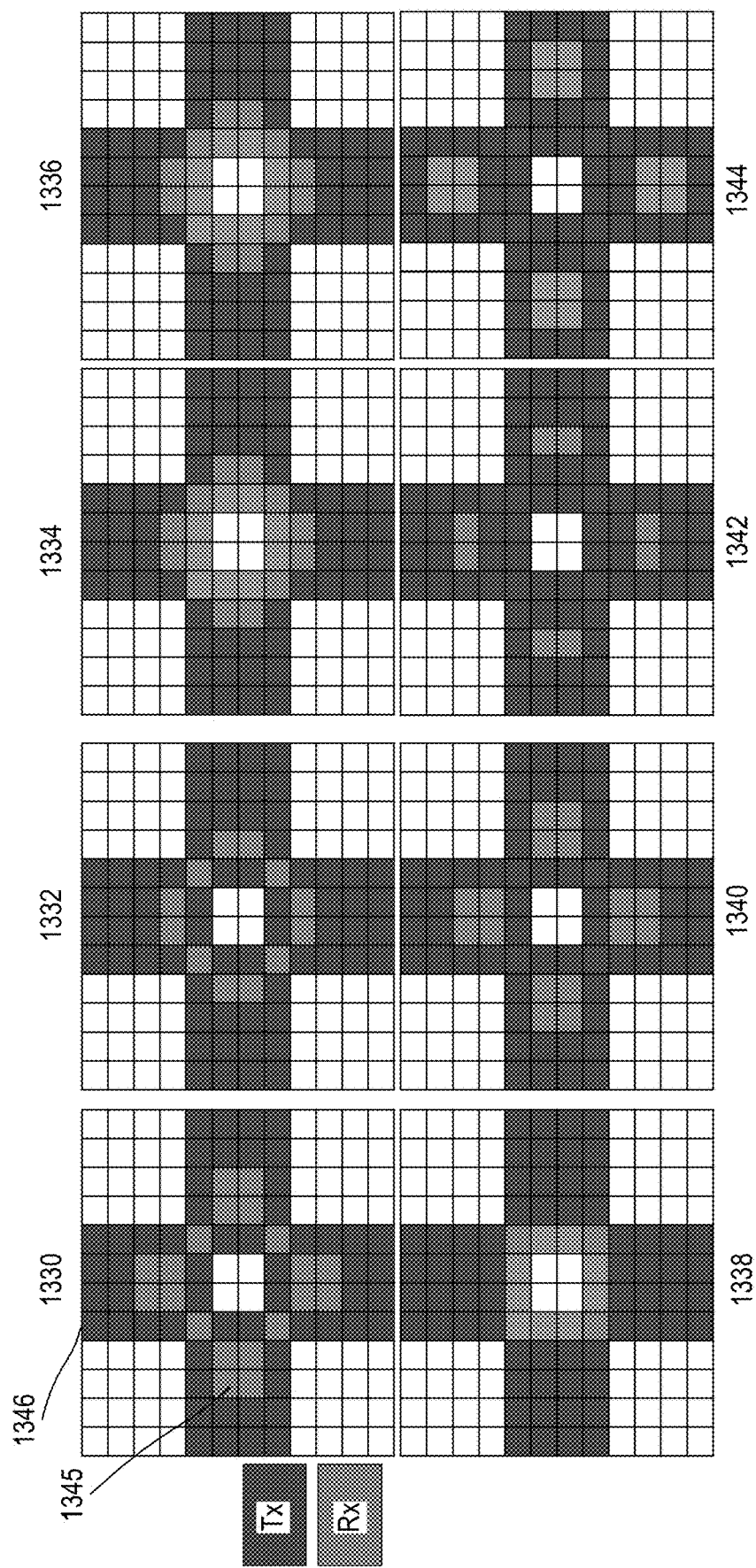
Figure 13D:
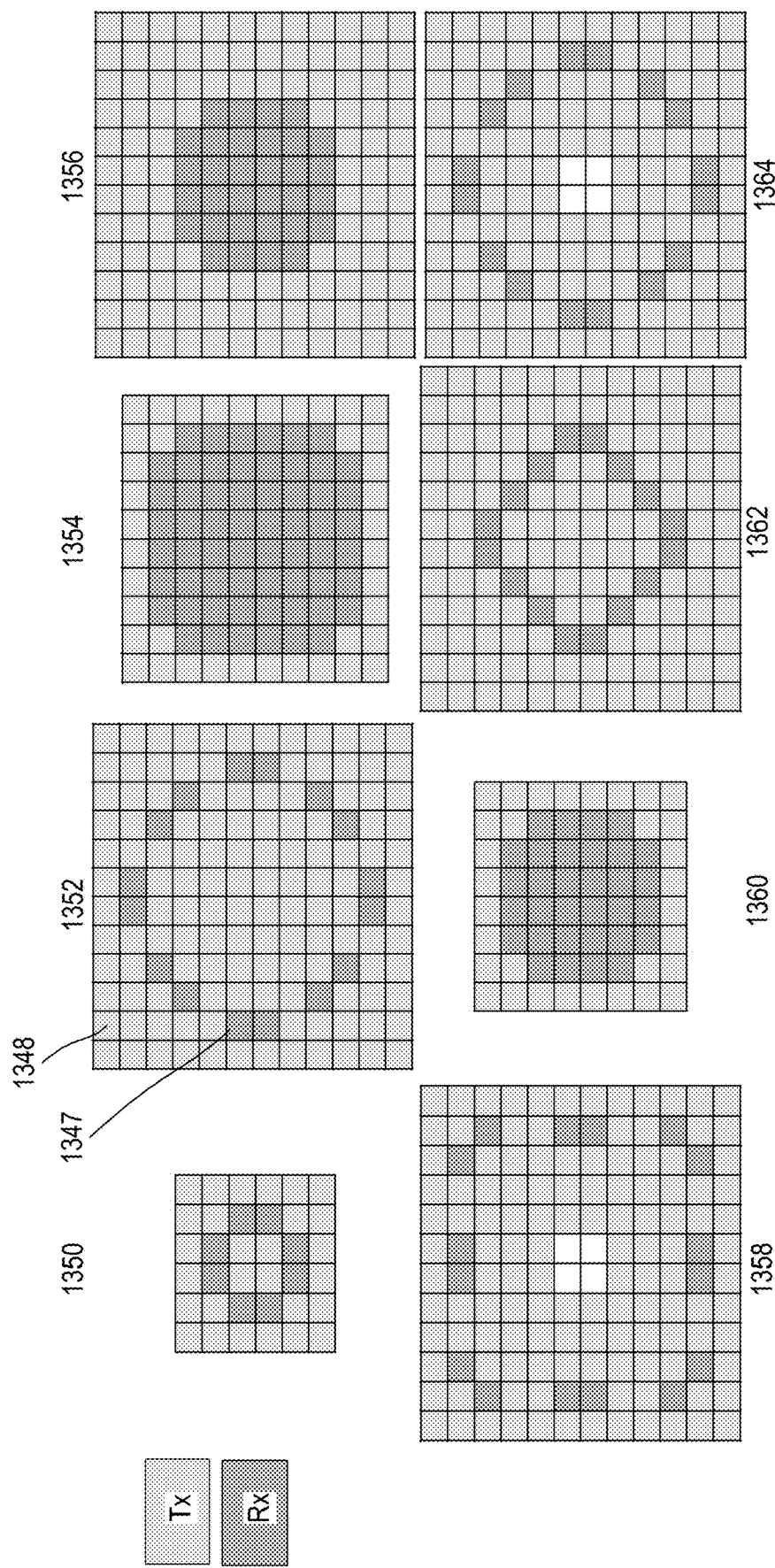
Figure 13F:
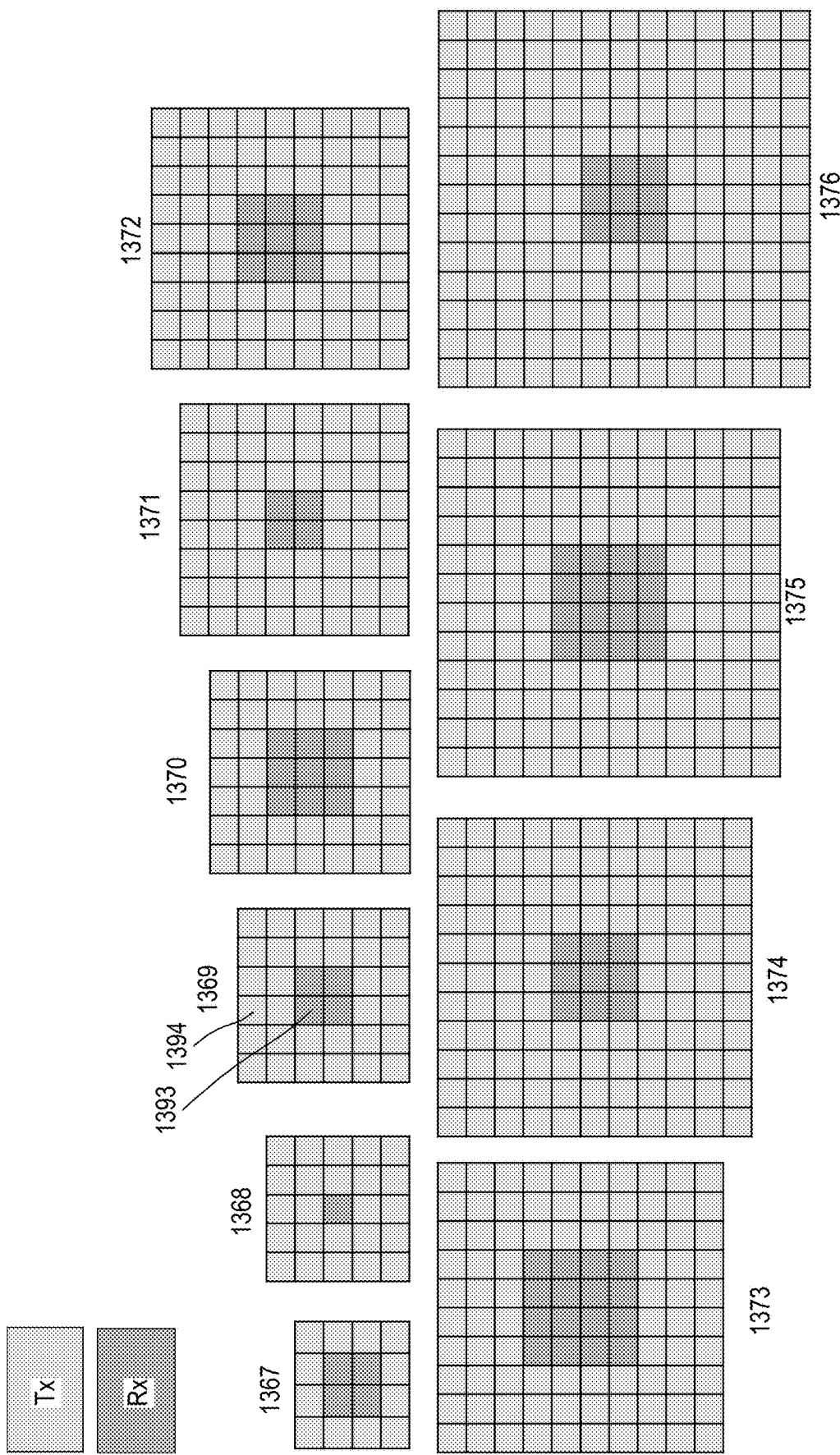
Figure 13G:
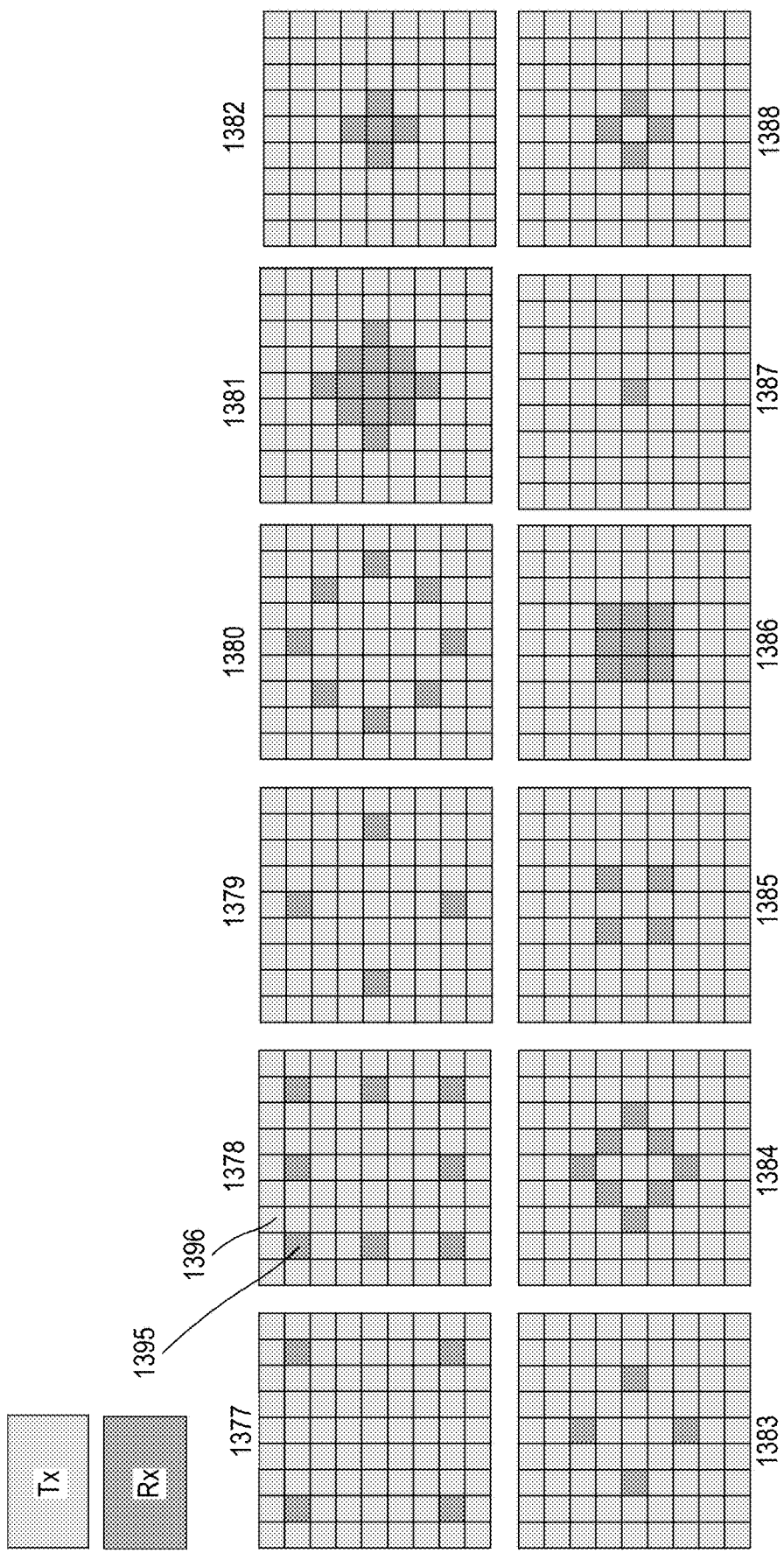

FIG. 13A is a schematic diagram of the sensor array of FIG. 12A depicting functions of the various transducers of the array according to certain aspects of the present disclosure. FIG. 13B is a schematic diagram of a sensor array depicting eight example configurations of the various transducers of a corner region of the sensor array according to certain aspects of the present disclosure. FIG. 13C is a schematic diagram of a sensor array depicting eight example configurations of the various transducers of the sensor array according to certain aspects of the present disclosure. FIG. 13D is a schematic diagram of a sensor array depicting eight example configurations of the various transducers of the sensor array according to certain aspects of the present disclosure. FIG. 13E is a schematic diagram of a sensor array depicting two example configurations of the various transducers of the sensor array according to certain aspects of the present disclosure. FIG. 13F is a schematic diagram of a sensor array depicting example configurations of the various transducers of the sensor array of various sizes according to certain aspects of the present disclosure. FIG. 13G is a schematic diagram of a sensor array depicting twelve example configurations of the various transducers of the sensor array of a size of 8×8 transducers according to certain aspects of the present disclosure.

FIG. 14 is a set of charts depicting energy measurements from transducers of a single sensor array operating in different frequencies according to certain aspects of the present disclosure.

Figure 15:
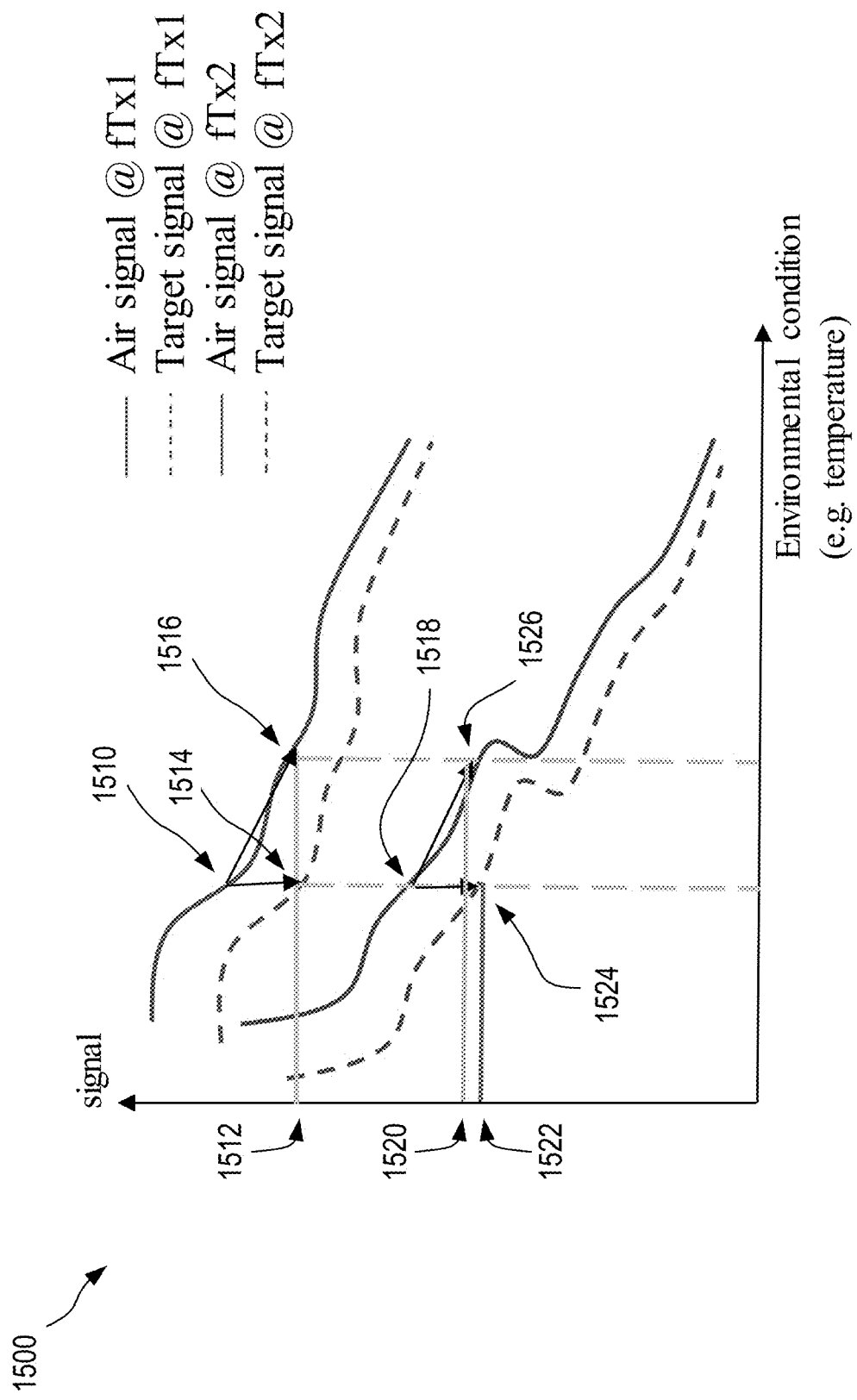

FIG. 15 is a chart depicting temperature behavior of an ultrasonic transducer with respect to operating frequency according to certain aspects of the present disclosure.

Figure 16:
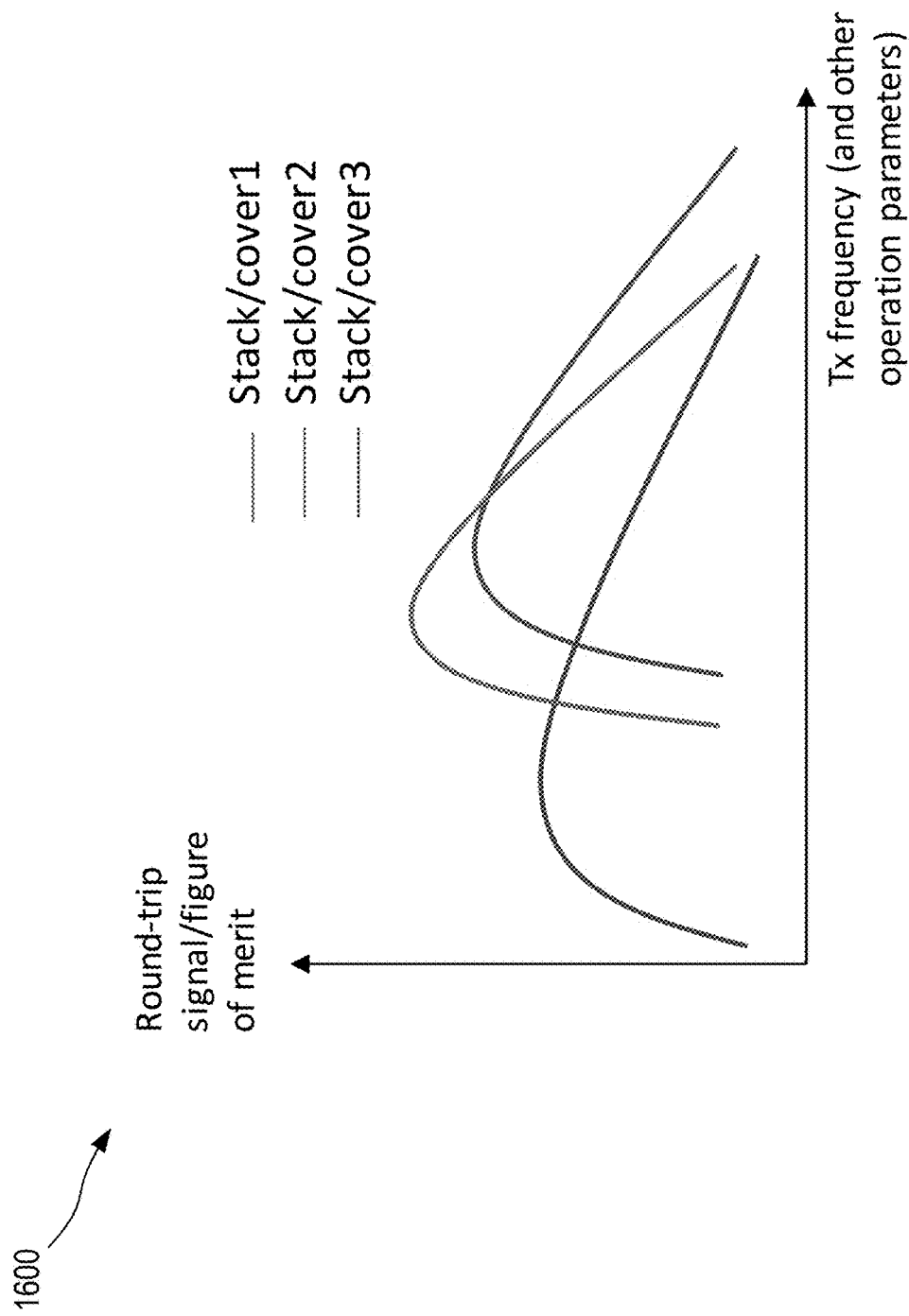

FIG. 16 is a chart depicting frequency response with respect to stack makeup according to certain aspects of the present disclosure.

Figure 17:
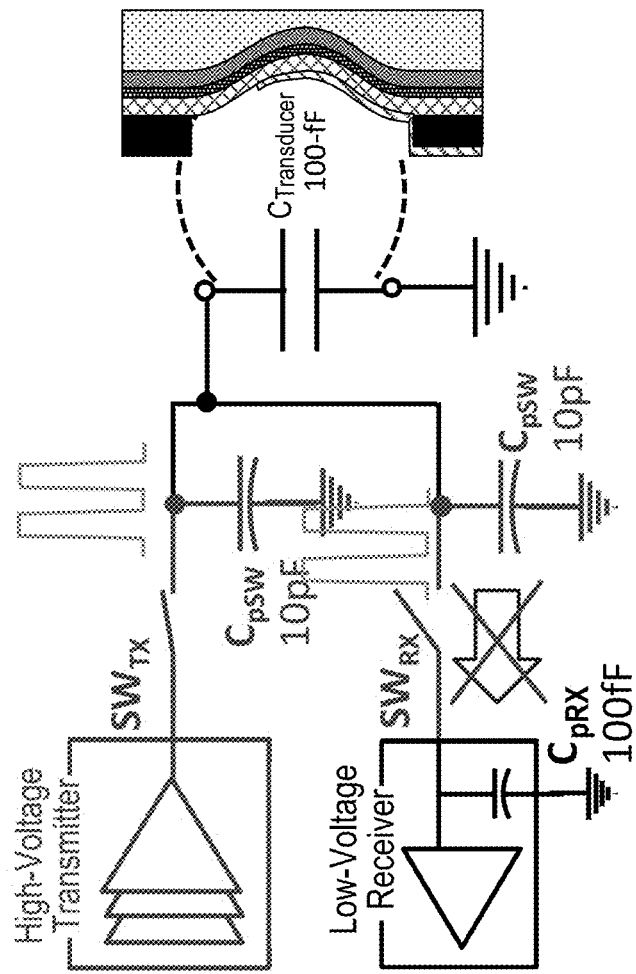

FIG. 17 is a schematic diagram depicting a circuit for receiving and transmitting a signal through an ultrasonic transducer, with the circuit in a transmitting state, according to certain aspects of the present disclosure.

Figure 18:
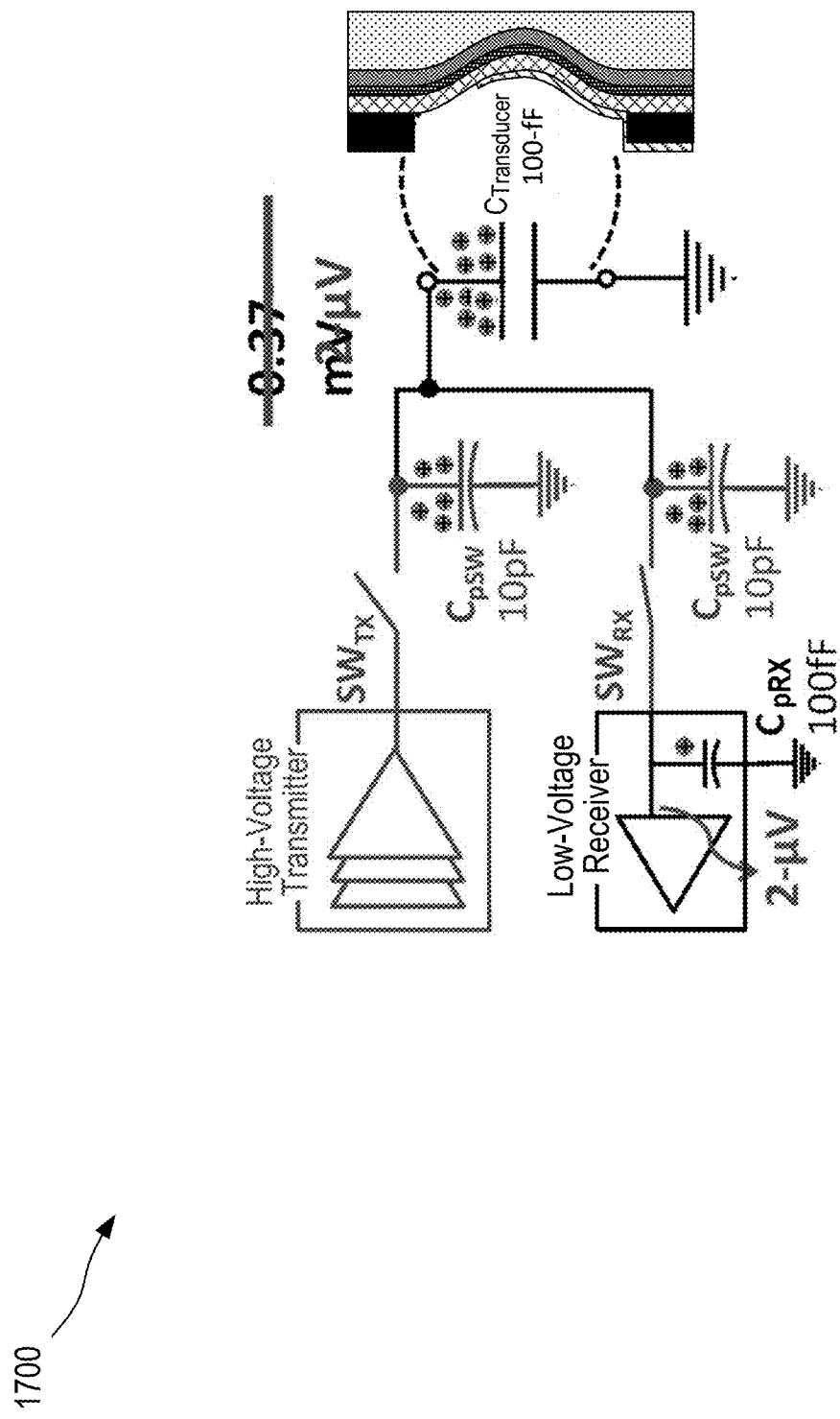

FIG. 18 is a schematic diagram depicting a circuit for receiving and transmitting a signal through an ultrasonic transducer, with the circuit in a receiving state, according to certain aspects of the present disclosure.

Figure 19:
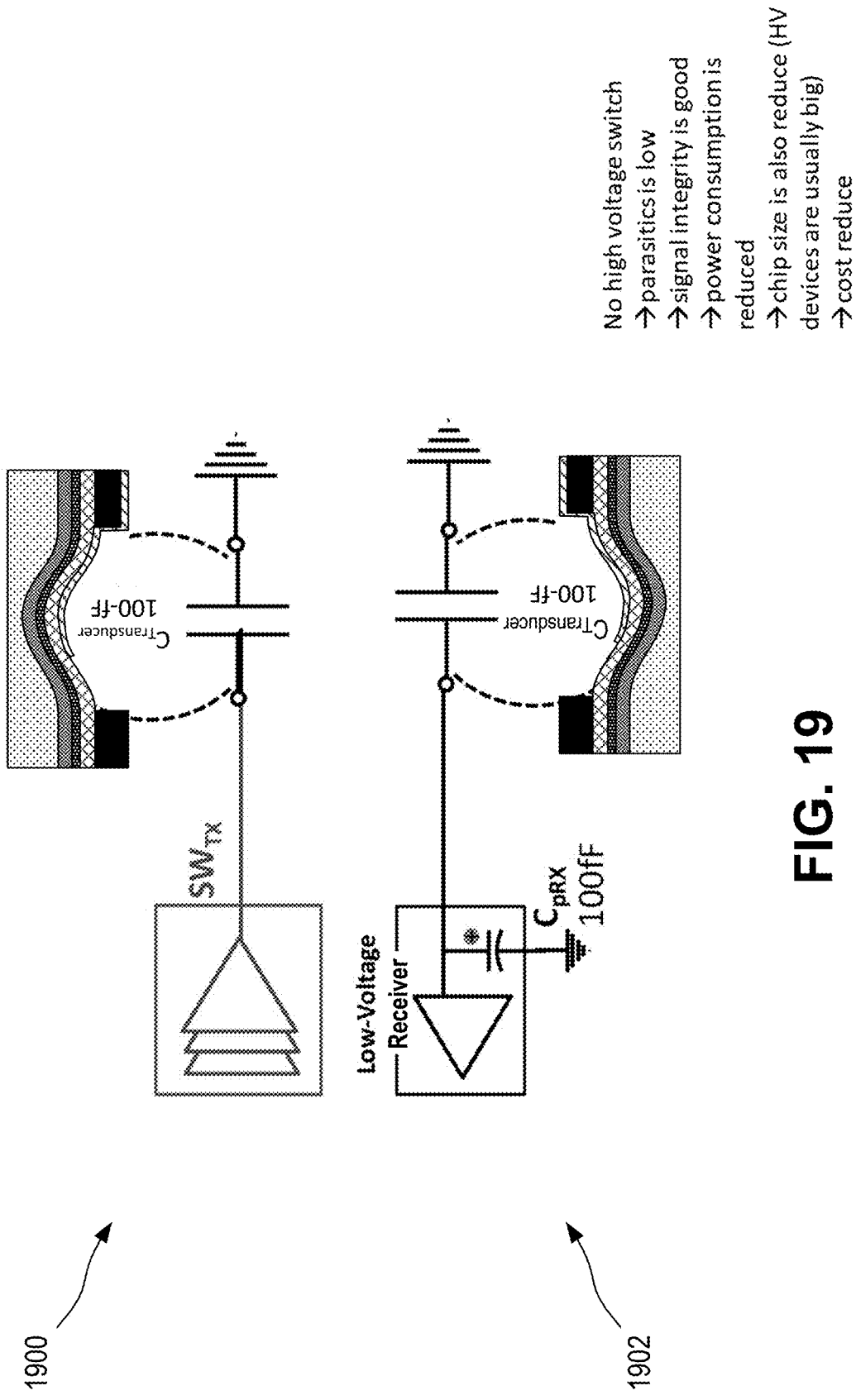

FIG. 19 is a schematic diagram depicting segregated circuits for receiving and transmitting signals through ultrasonic transducers according to certain aspects of the present disclosure.

Figure 20:
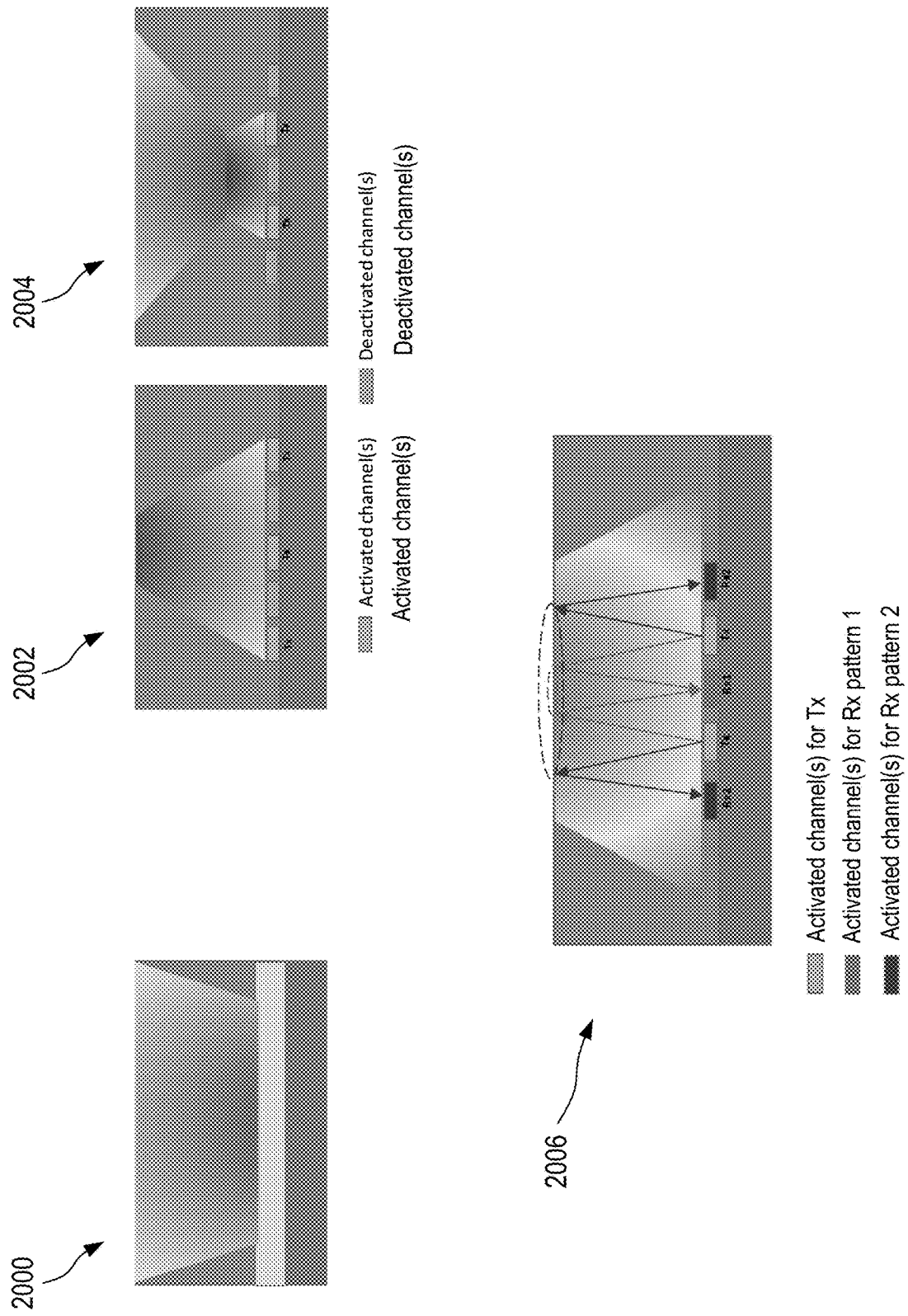

FIG. 20 is a set of side view schematic diagrams depicting beamforming achieved through the use of ultrasonic transducers according to certain aspects of the present disclosure.

Figure 21:
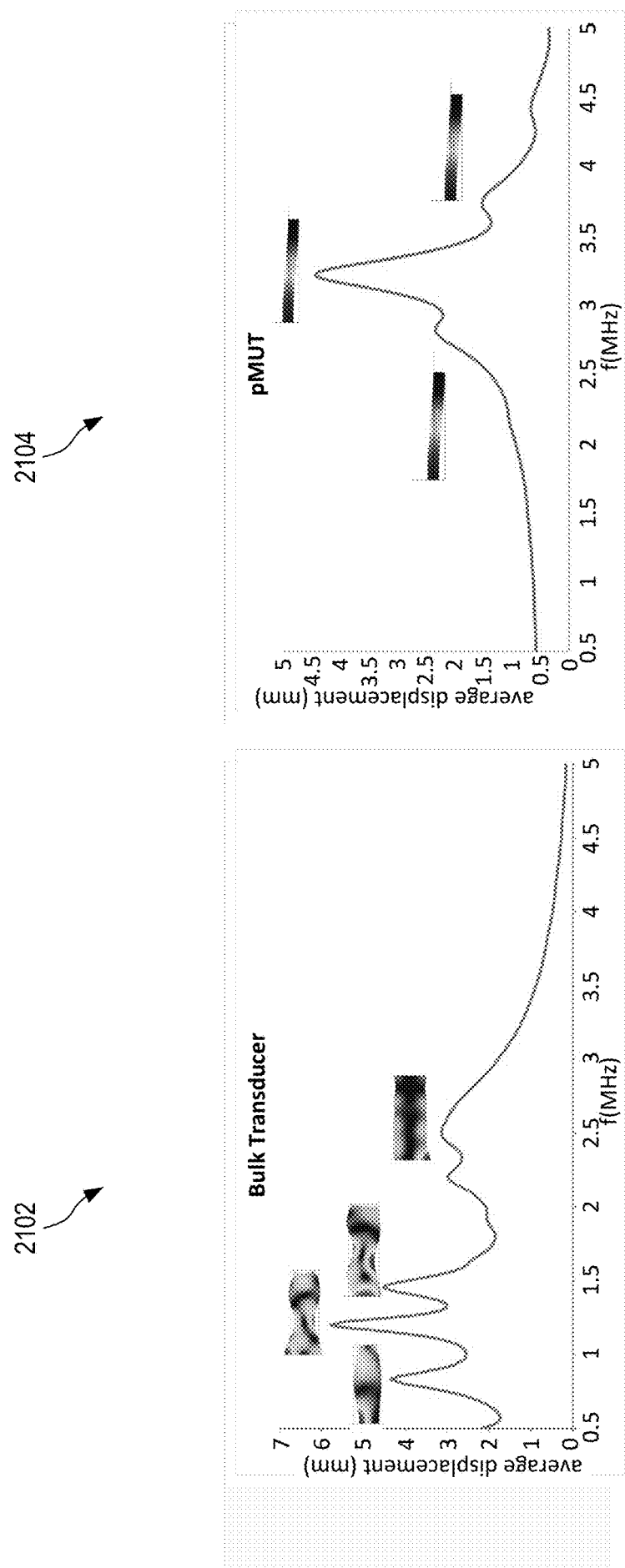

FIG. 21 is a set of charts depicting modes of operation of micromachined ultrasonic transducers according to certain aspects of the present disclosure as compared to standard bulk transducers, depicted as average displacement for different frequencies.

Figure 22:
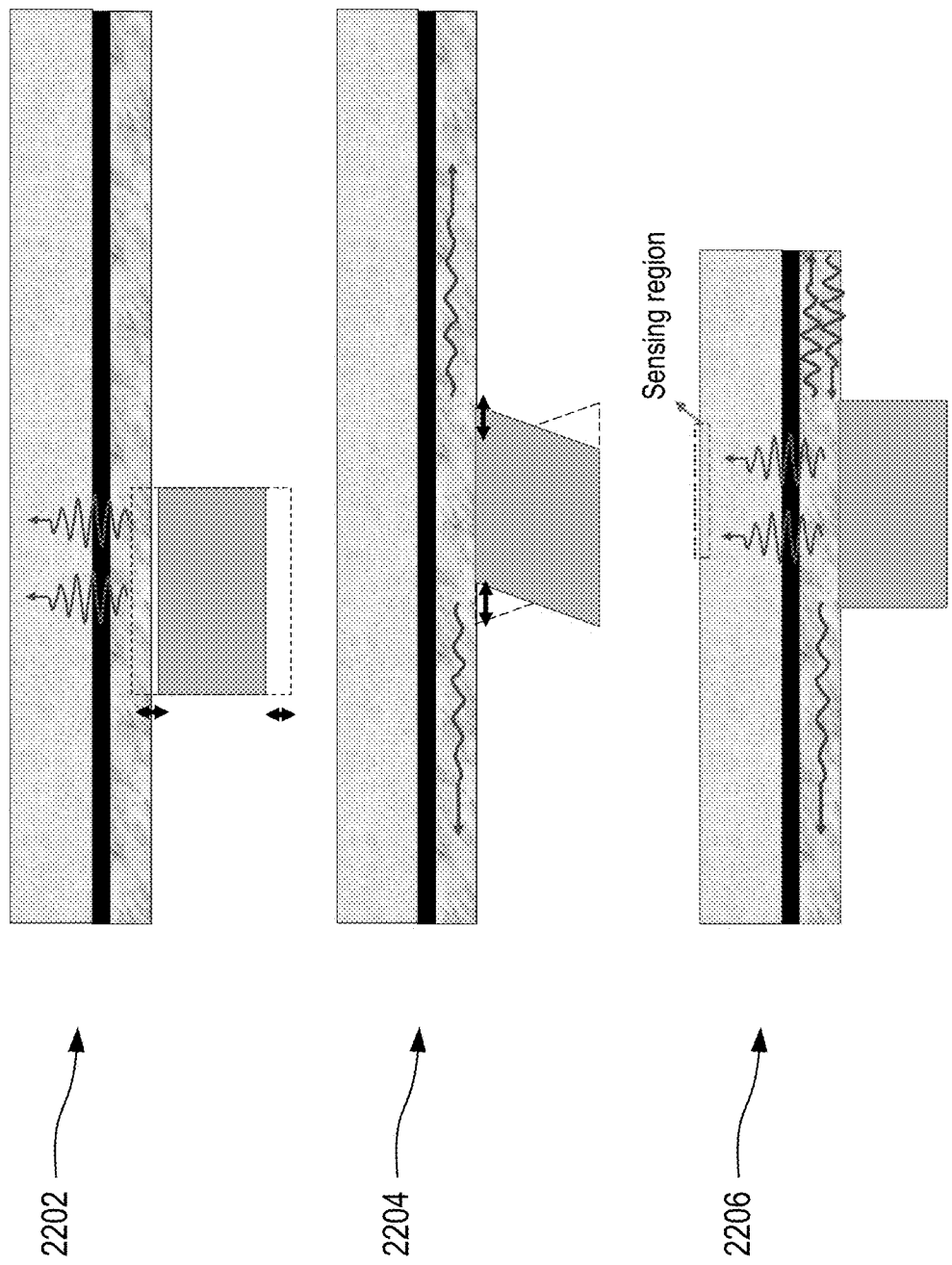

FIG. 22 is a set of side view schematic diagrams depicting lateral signal rejection of micromachined ultrasonic transducers according to certain aspects of the present disclosure as compared to standard bulk transducers.

Figure 23:
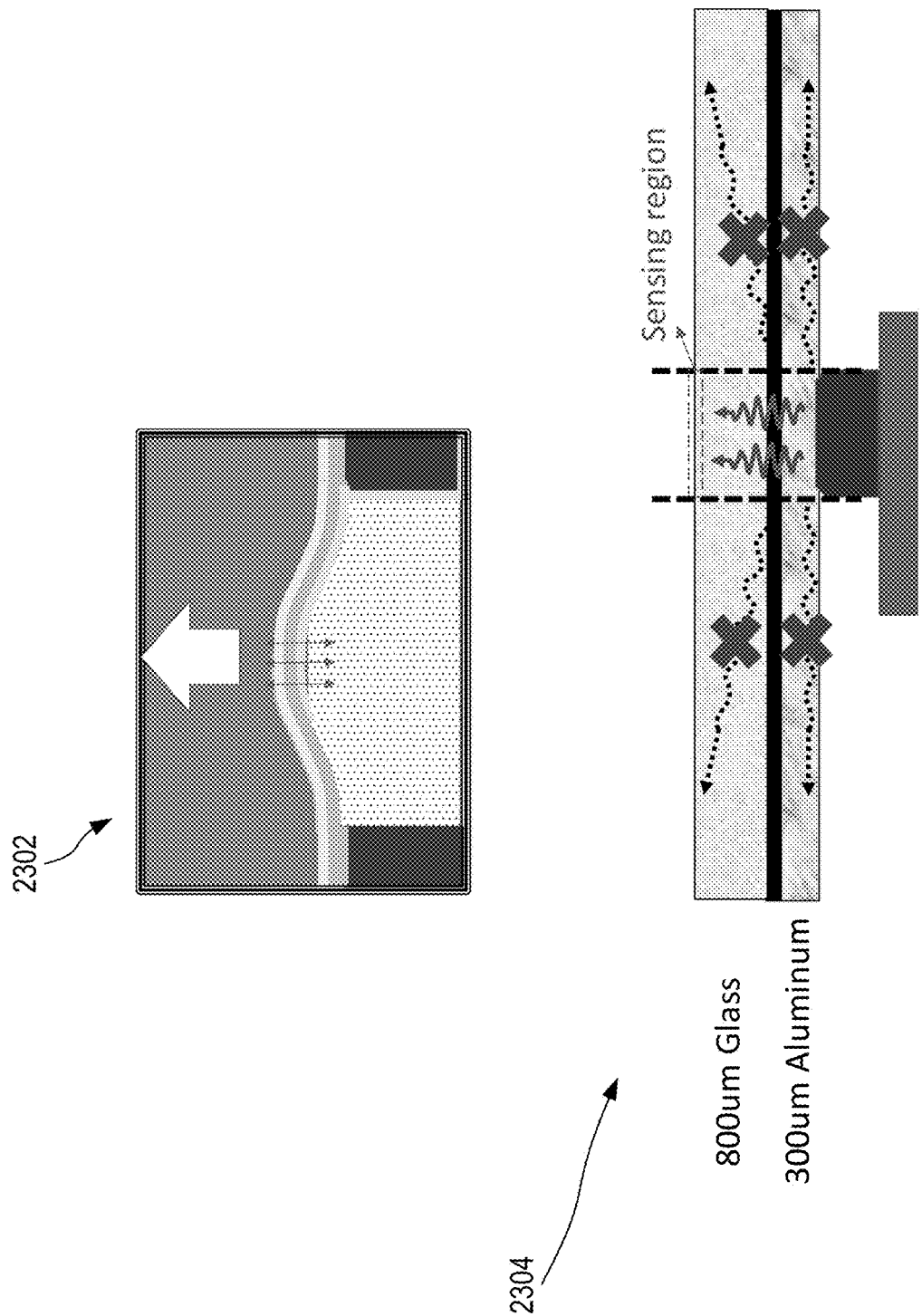

FIG. 23 is a set of side view schematic diagrams depicting lateral signal rejection of micromachined ultrasonic transducers according to certain aspects of the present disclosure.

Figure 24:
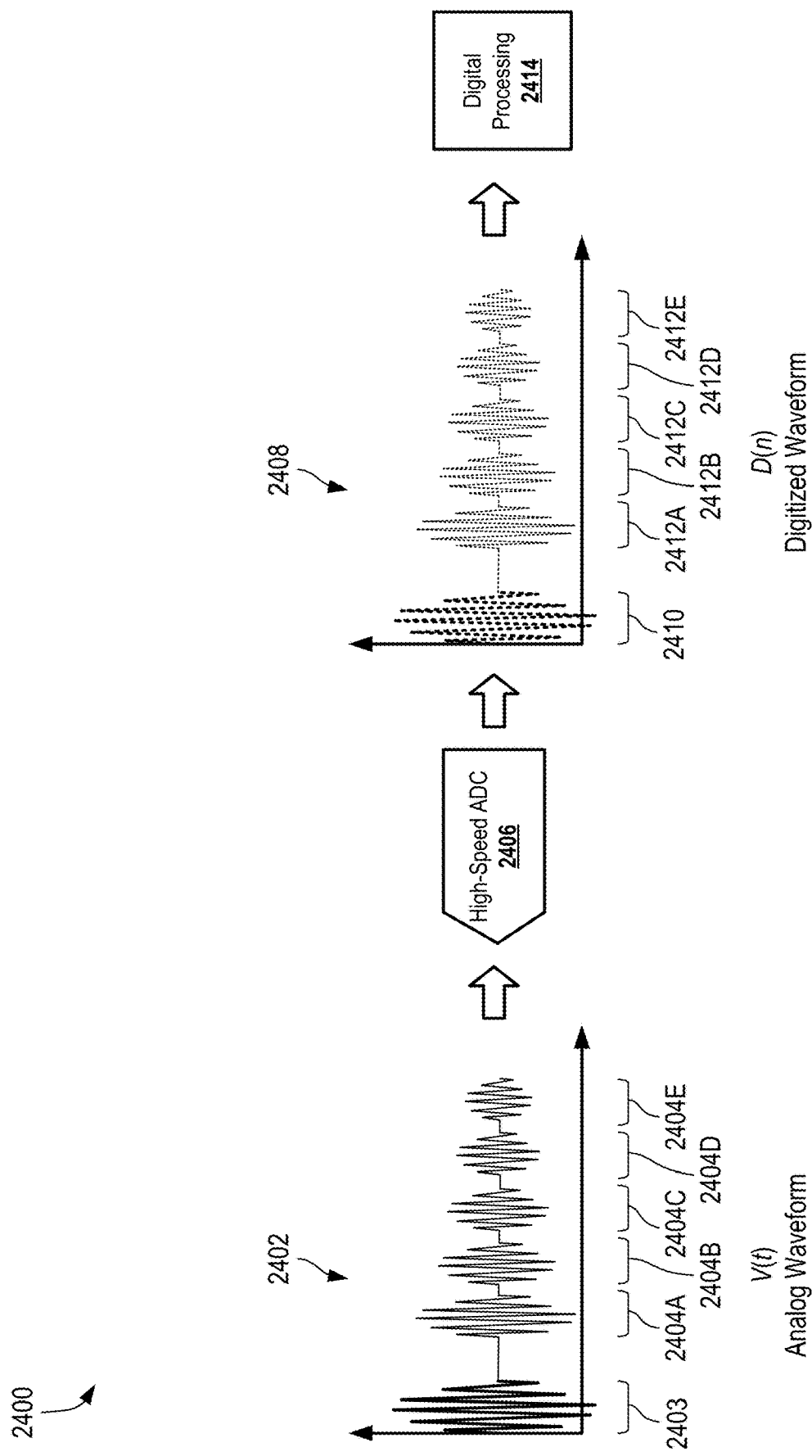

FIG. 24 is a schematic diagram of a flow for digitally processing ultrasound signals emitted and received by an ultrasound input device according to certain aspects of the present disclosure.

Figure 25:
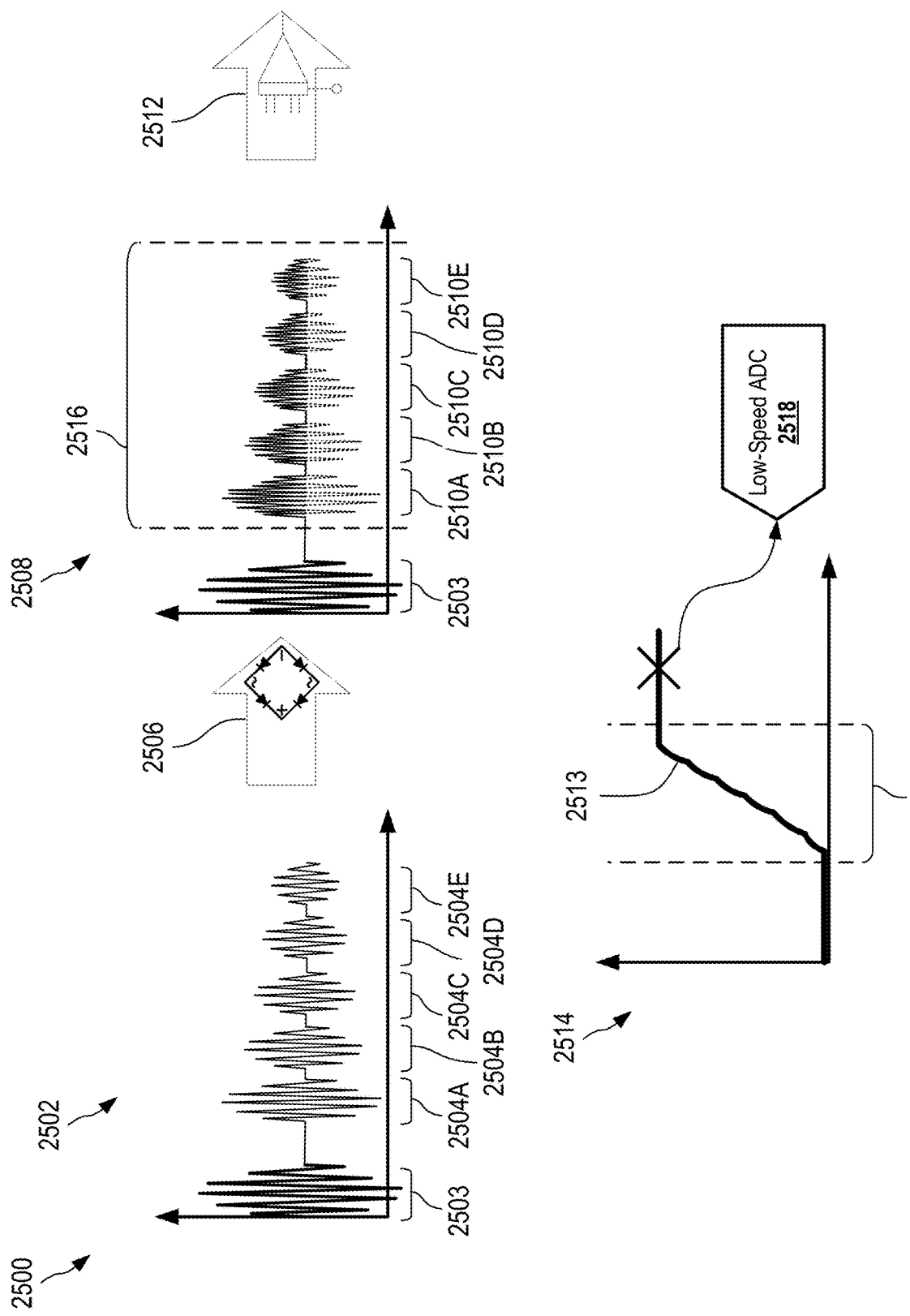

FIG. 25 is a schematic diagram of a flow for processing ultrasound signals emitted and received by an ultrasound input device using energy integration according to certain aspects of the present disclosure.

Figure 26:
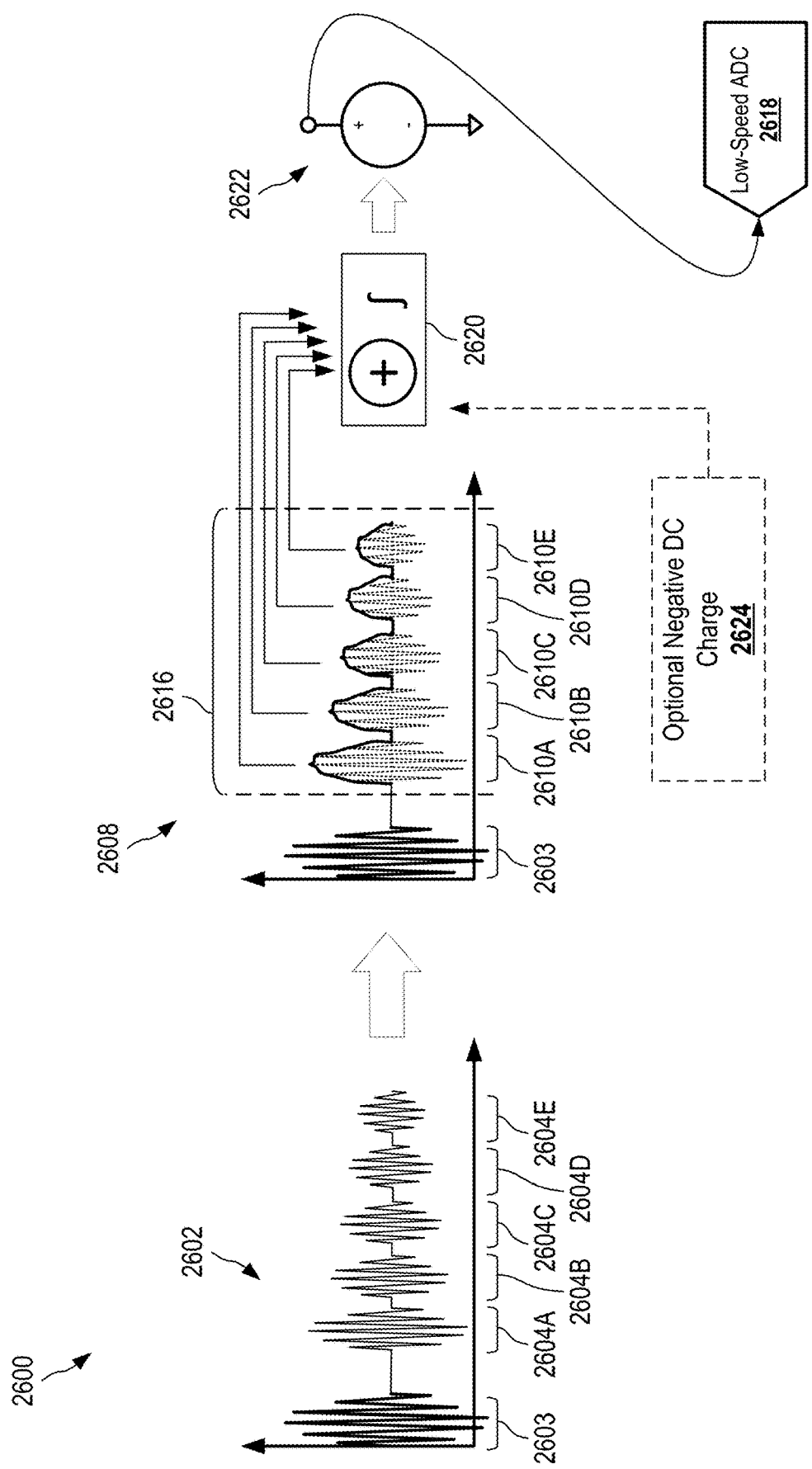

FIG. 26 is a schematic diagram of an example of a flow for processing ultrasound signals emitted and received by an ultrasound input device using energy integration according to certain aspects of the present disclosure.

Figure 27:
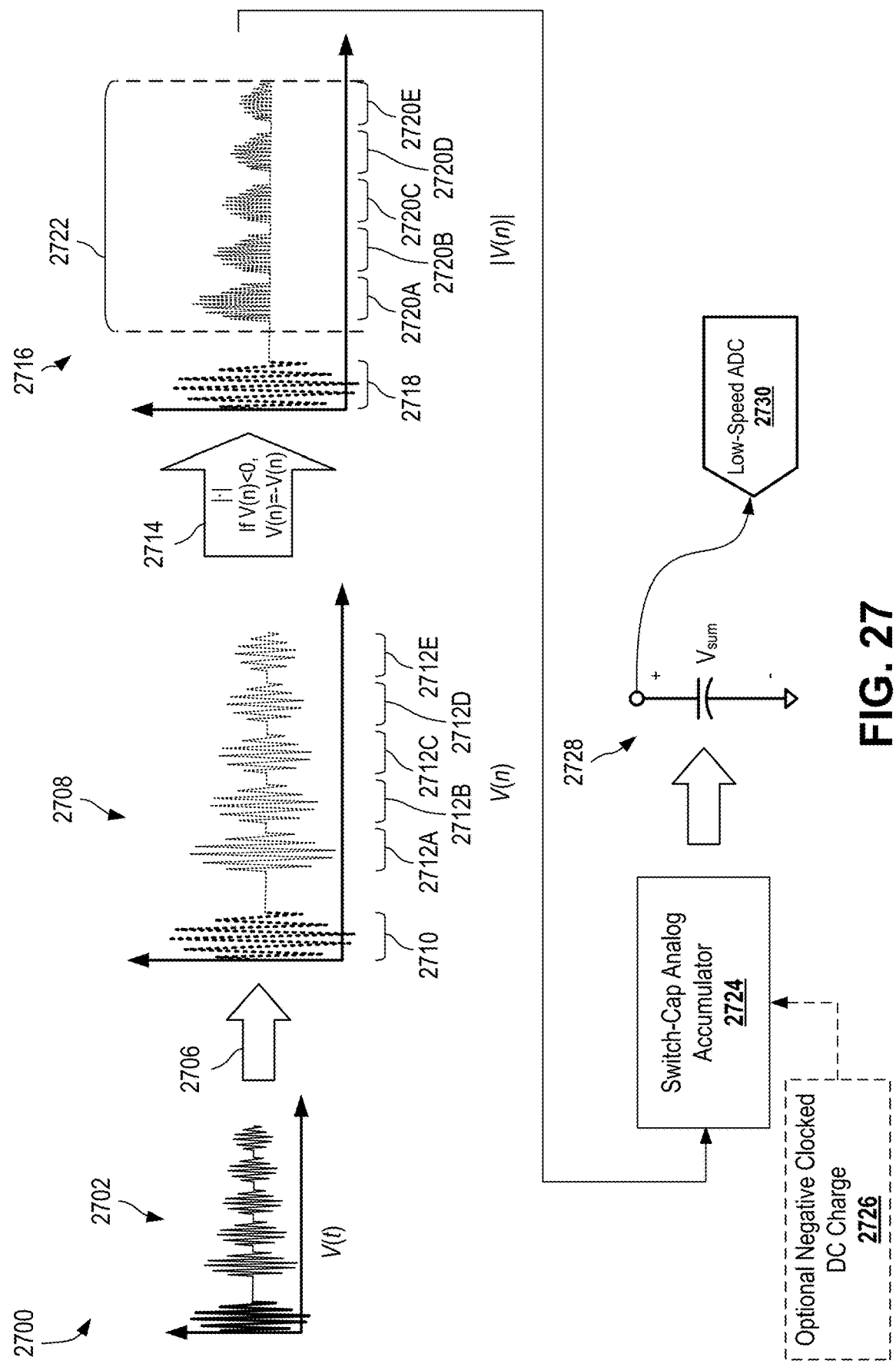

FIG. 27 is a schematic diagram of a flow for processing ultrasound signals emitted and received by an ultrasound input device using energy integration via absolute value accumulation according to certain aspects of the present disclosure.

Figure 28:
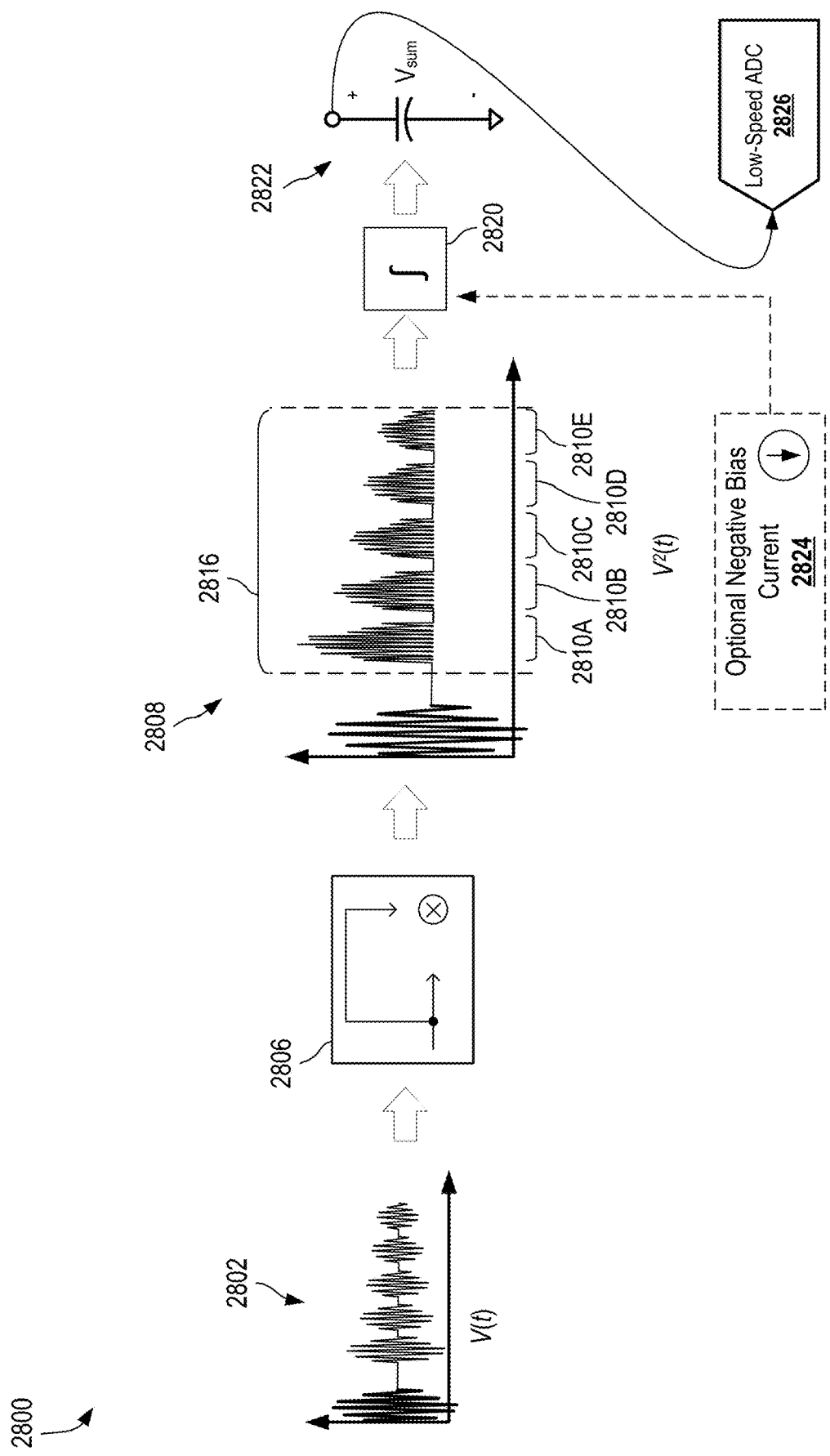

FIG. 28 is a schematic diagram of a flow for processing ultrasound signals emitted and received by an ultrasound input device using energy integration via self-mixing and integration according to certain aspects of the present disclosure.

Figure 29:
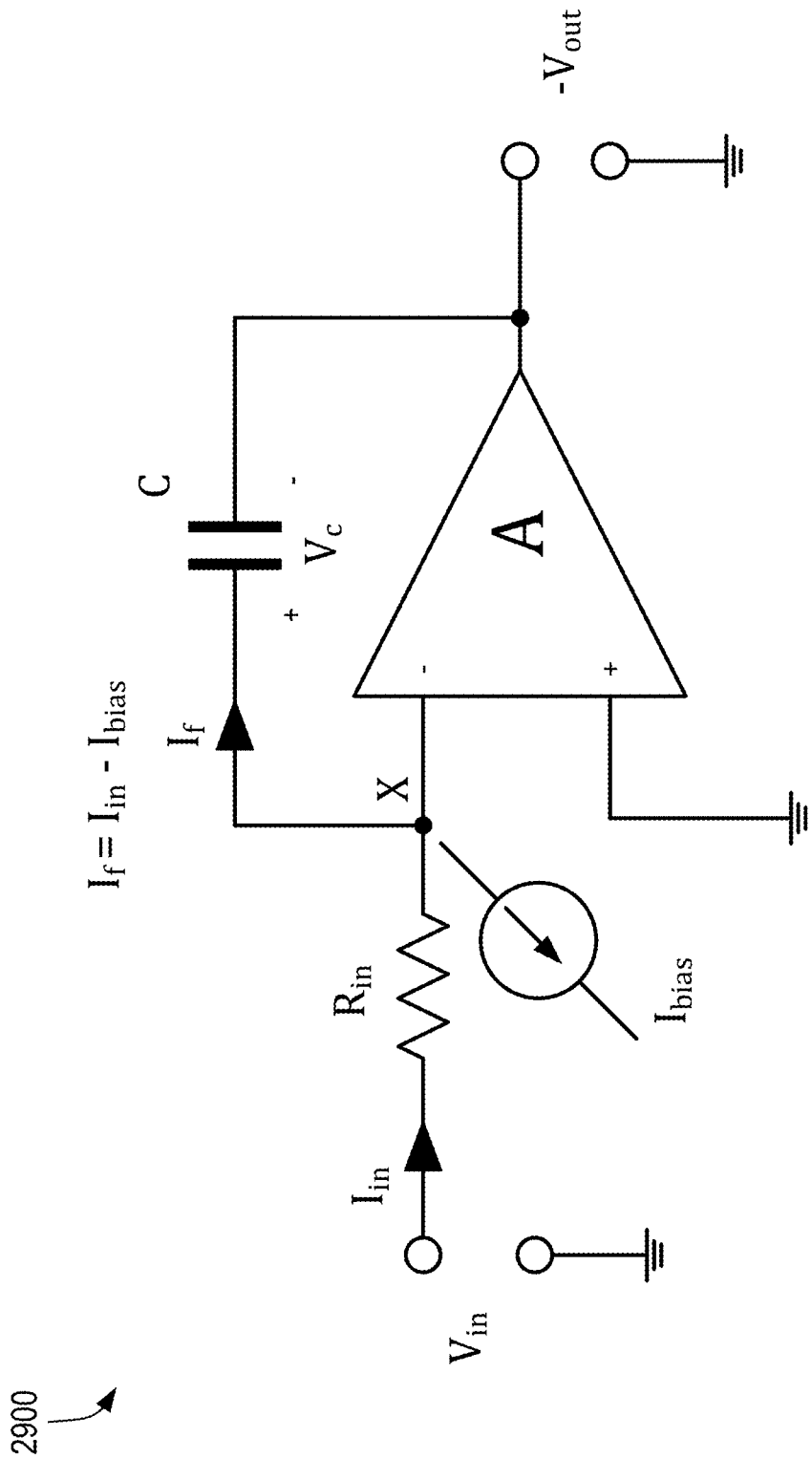

FIG. 29 is a schematic circuit diagram depicting an analog integrator with a negative bias current circuit according to certain aspects of the present disclosure.

Figure 30:
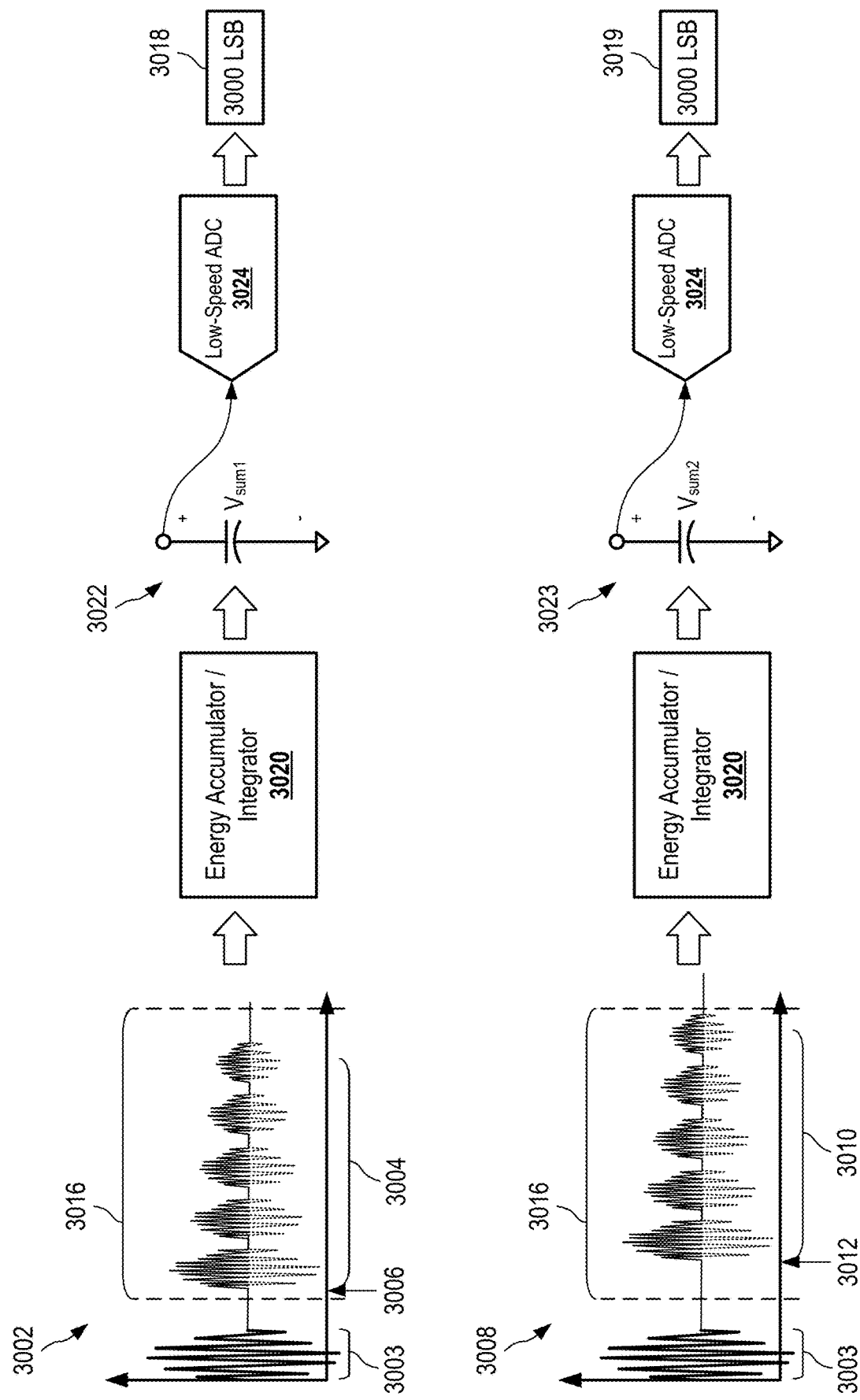

FIG. 30 is a schematic diagram of a flow for processing ultrasound signals depicting the reduced effects of reflected ultrasonic signal time-of-flight changes on touch input detection within an energy measurement window according to certain aspects of the present disclosure.

Figure 31:
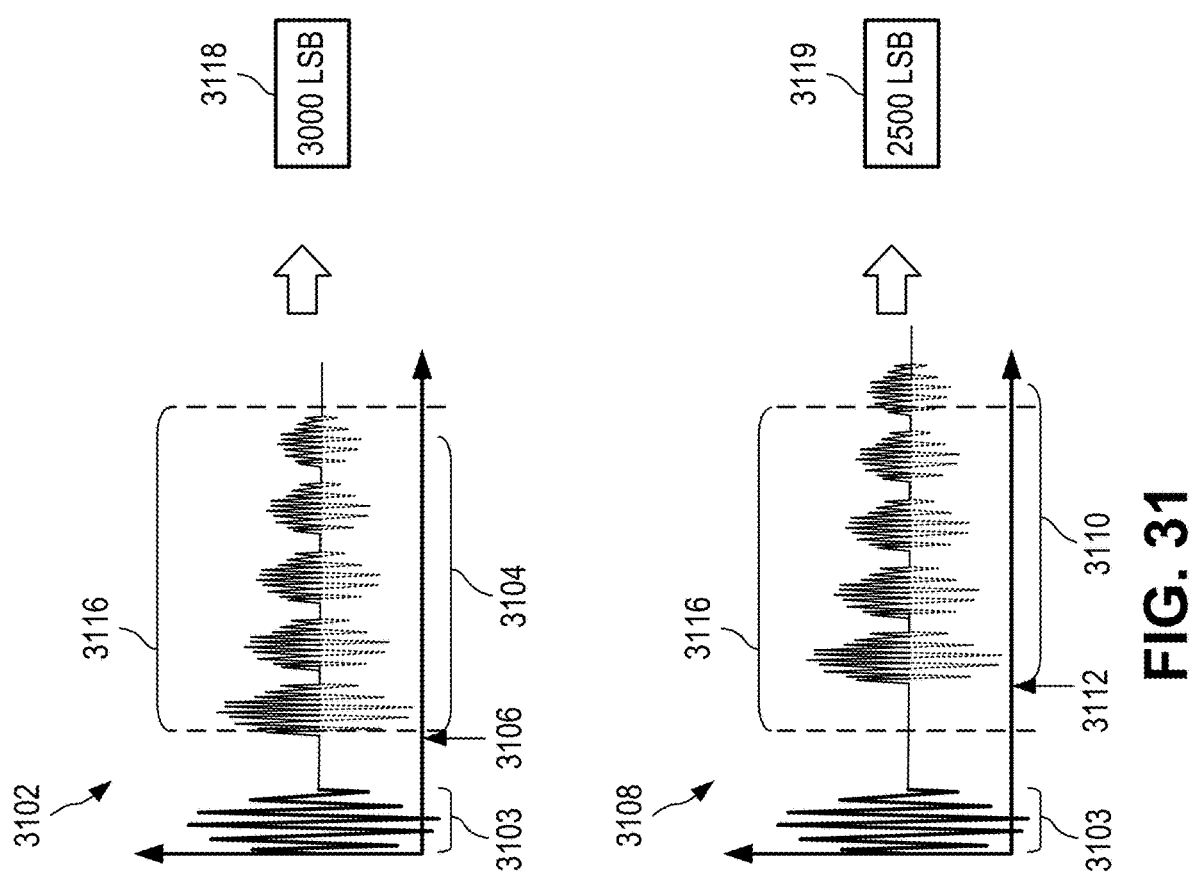

FIG. 31 is a schematic diagram of an abbreviated flow for processing ultrasound signals depicting the heightened effects of reflected ultrasonic signal time-of-flight changes on touch input detection outside of an energy measurement window.

Figure 32:
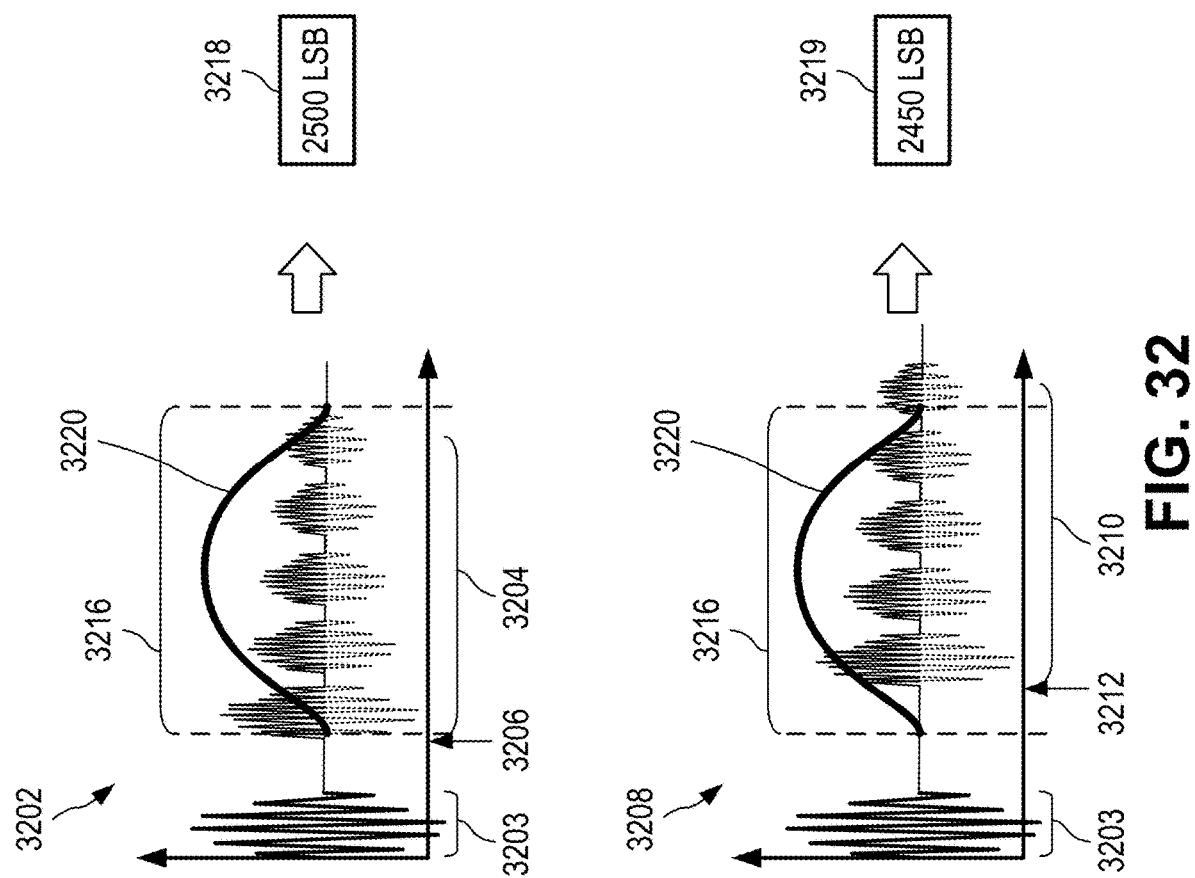

FIG. 32 is a schematic diagram of a flow for processing ultrasound signals depicting the minimal effects of reflected ultrasonic signal time-of-flight changes on touch input detection outside of an energy measurement window when window shaping is used according to certain aspects of the present disclosure.

Figure 33:
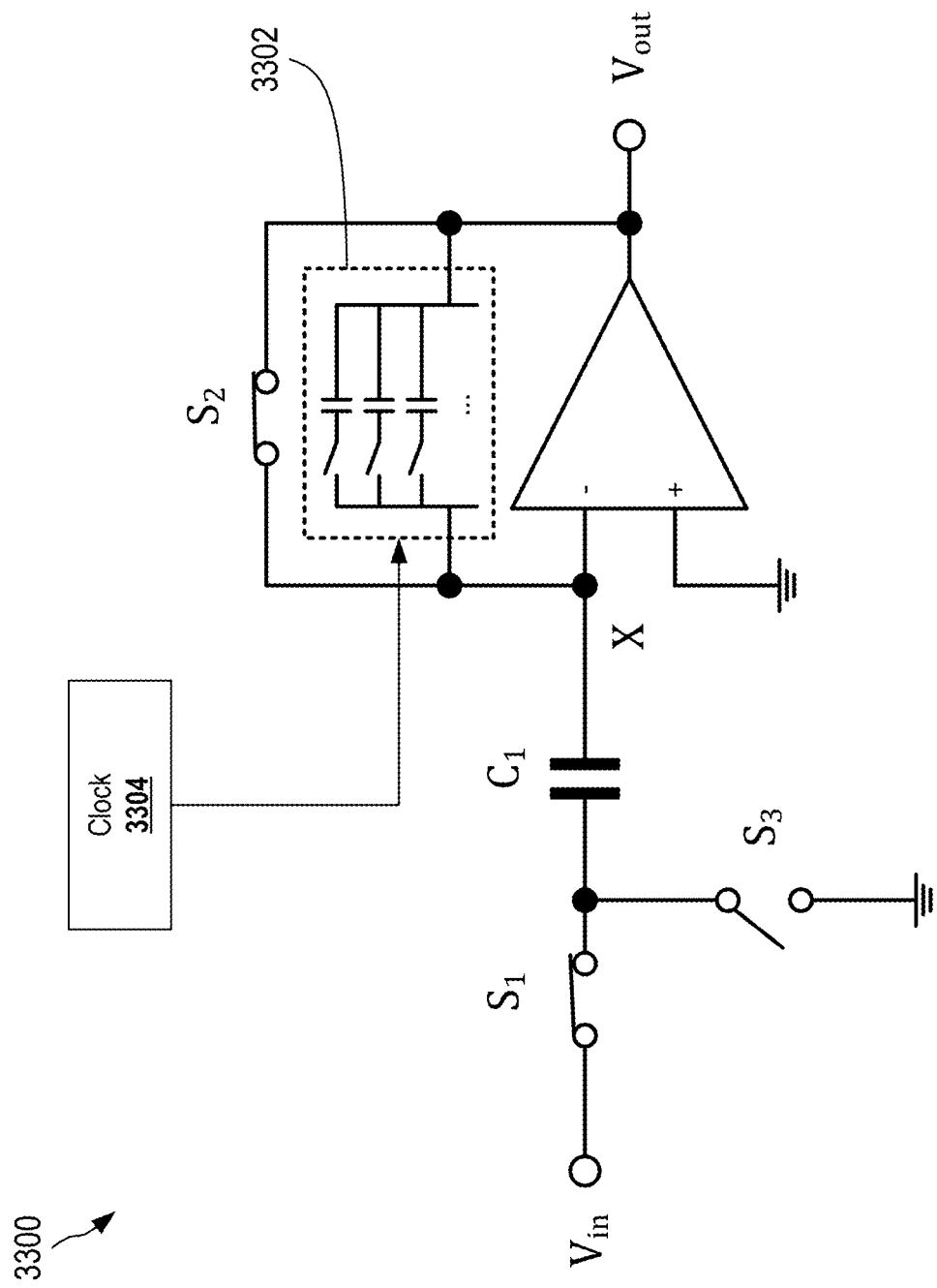

FIG. 33 is a schematic circuit diagram depicting a window shaping circuit according to certain aspects of the present disclosure.

Figure 34:
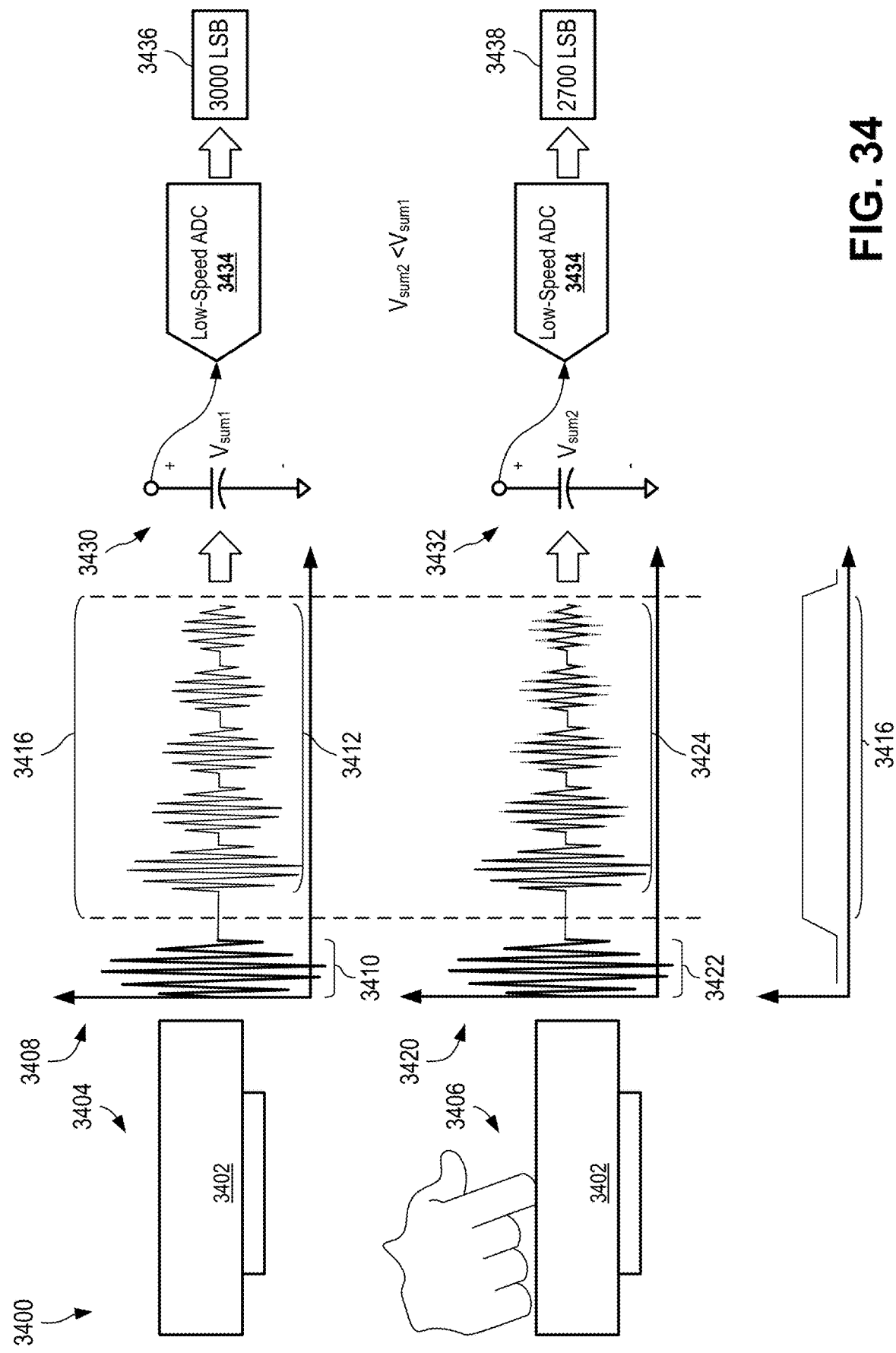

FIG. 34 is a schematic diagram depicting a flow for processing ultrasound signals to detect a touch input using the amplitude of reflected ultrasonic signals according to certain aspects of the present disclosure.

Figure 35:
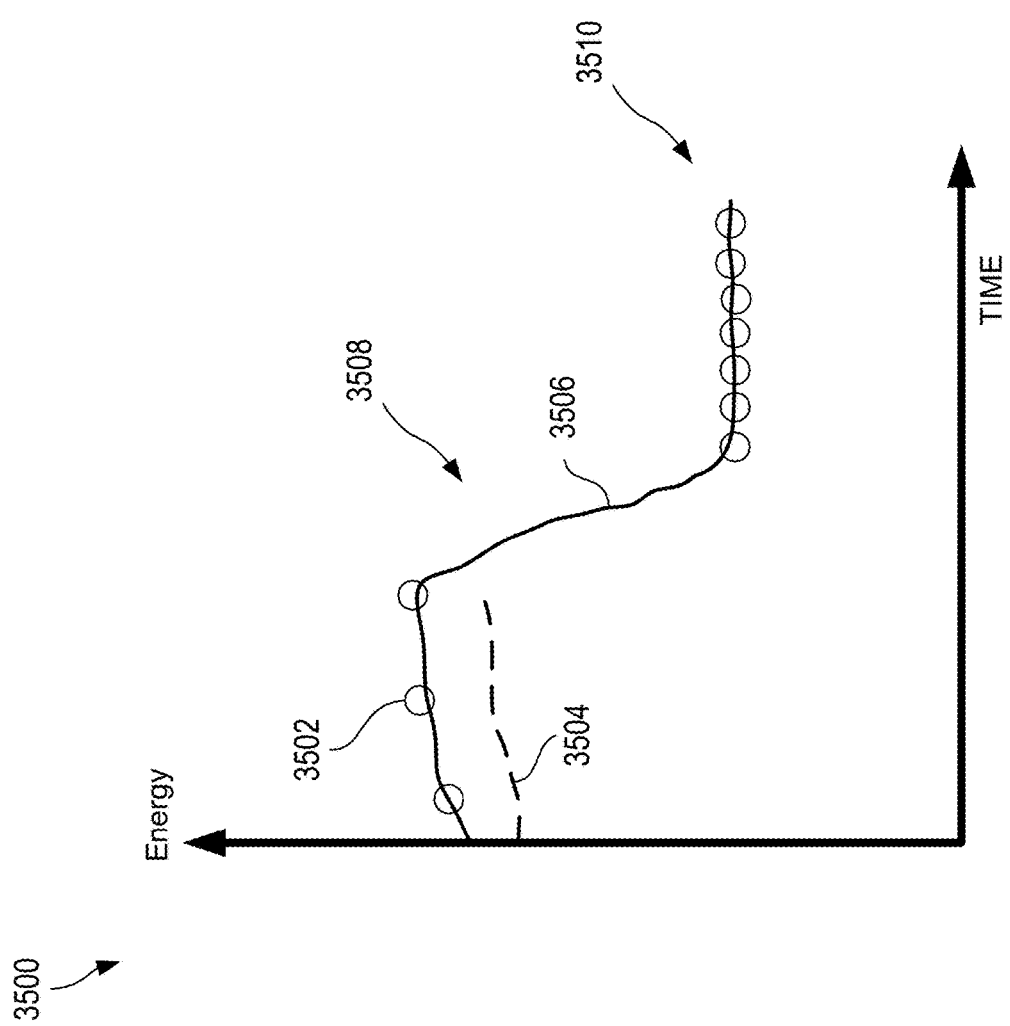

FIG. 35 is a chart depicting reflected ultrasonic signal measurements made using an ultrasound input device and illustrating techniques to improve touch input detection according to certain aspects of the present disclosure.

Figure 36:
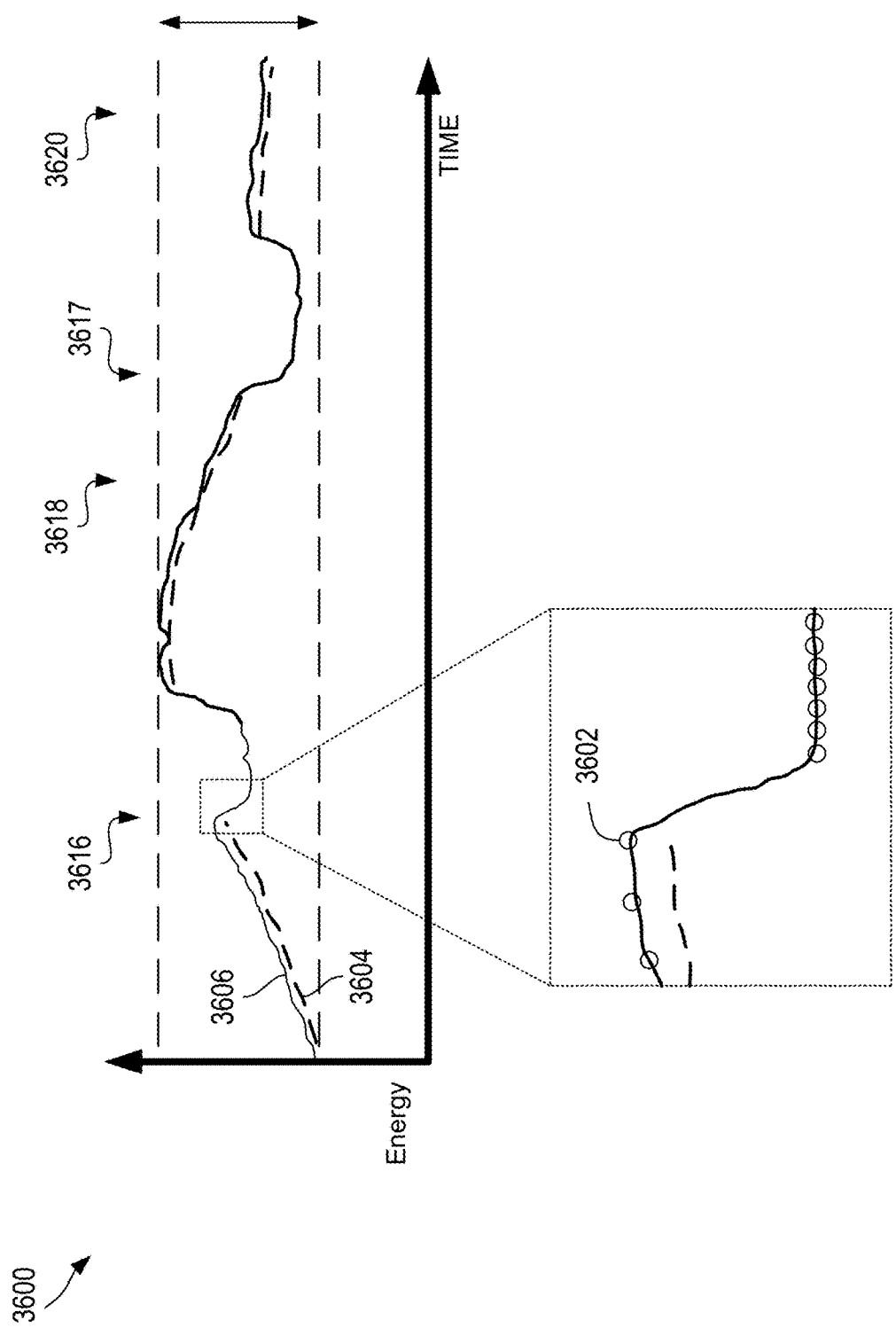

FIG. 36 is a chart depicting reflected ultrasonic signal measurements made using an ultrasound input device and illustrating additional techniques to improve touch input detection according to certain aspects of the present disclosure.

FIG. 37 is a set of charts depicting temperature dependence of reflected ultrasonic signals according to certain aspects of the present disclosure.

Figure 38:
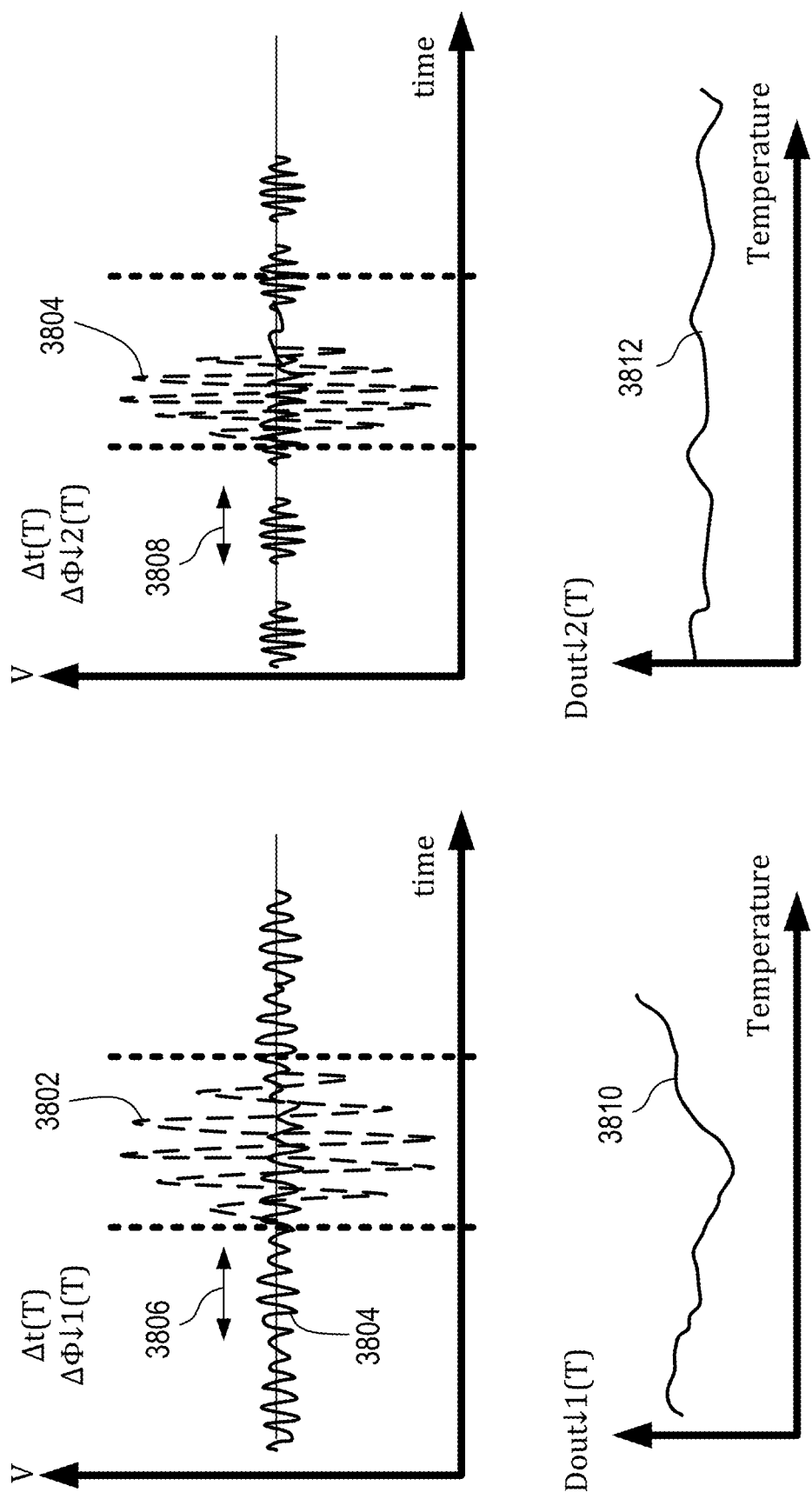

FIG. 38 is a set of charts depicting time-of-flight temperature dependence of a two frequency method of detecting a touch input according to certain aspects of the present disclosure.

Figure 39:
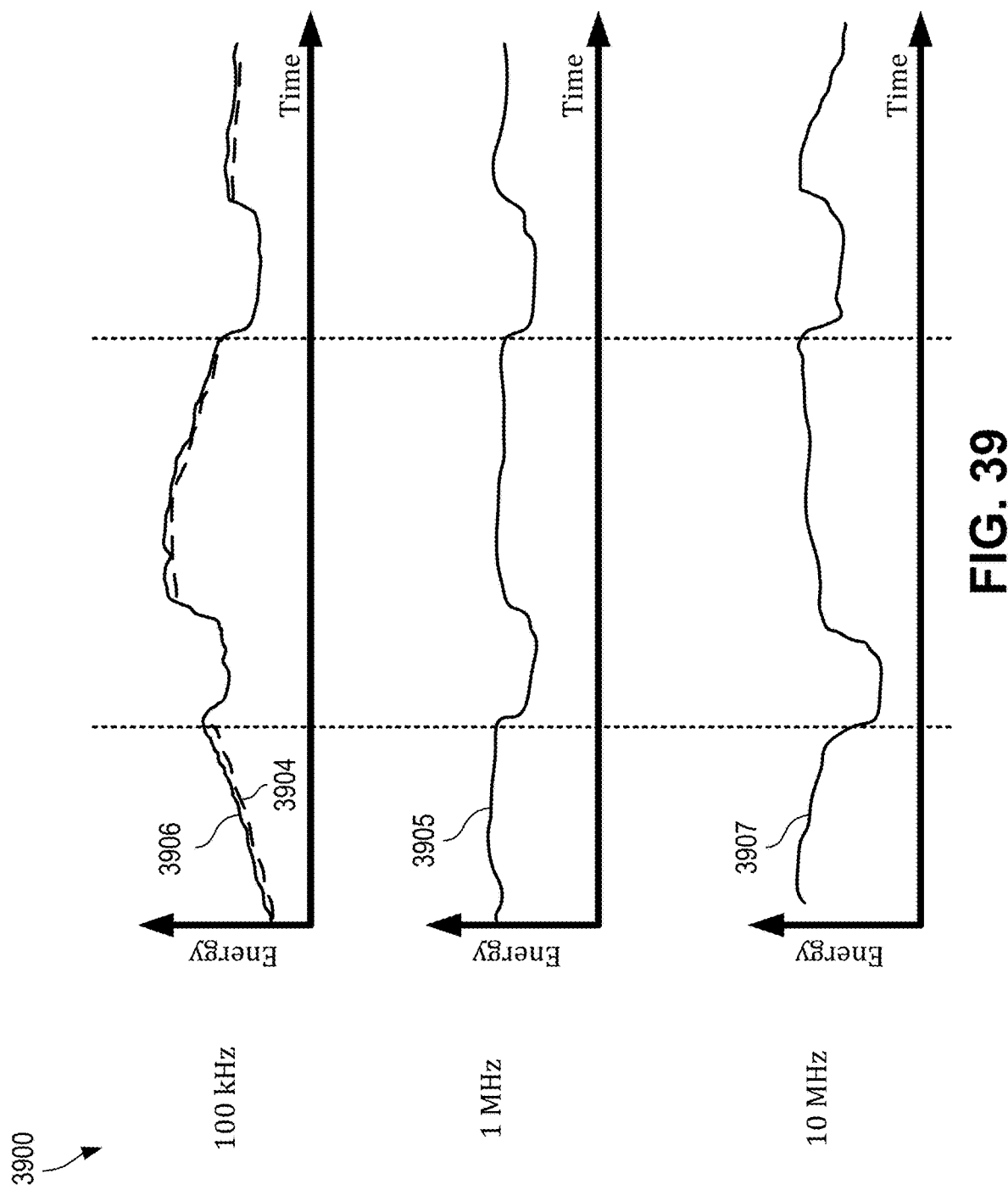

FIG. 39 is a chart depicting reflected ultrasonic signal measurements made across several frequencies using an ultrasound input device and illustrating techniques to improve touch input detection according to certain aspects of the present disclosure.

Figure 40:
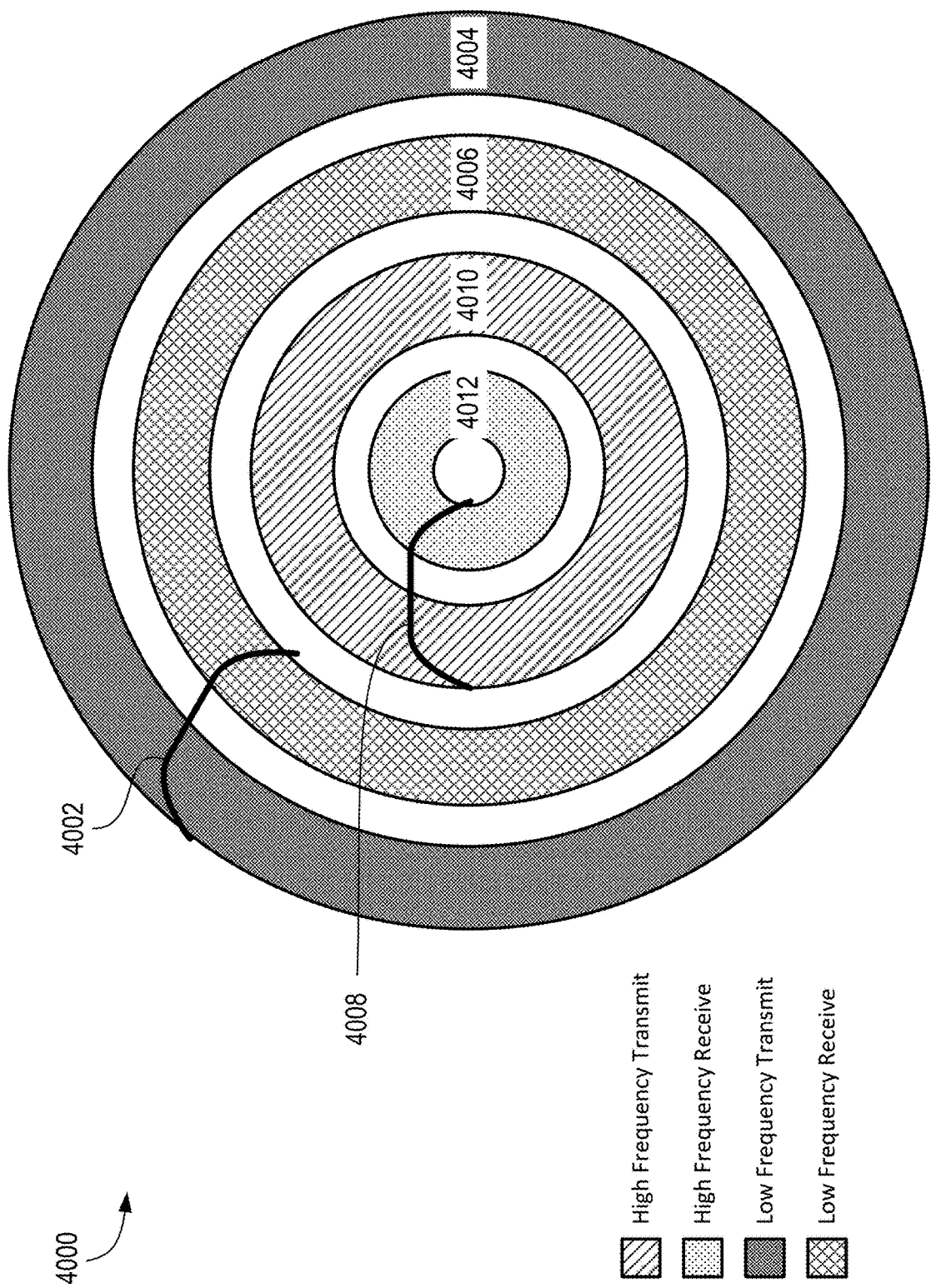

FIG. 40 is a schematic plan view depicting a two-frequency PMUT with a concentric-circular design according to certain aspects of the present disclosure.

Figure 41:
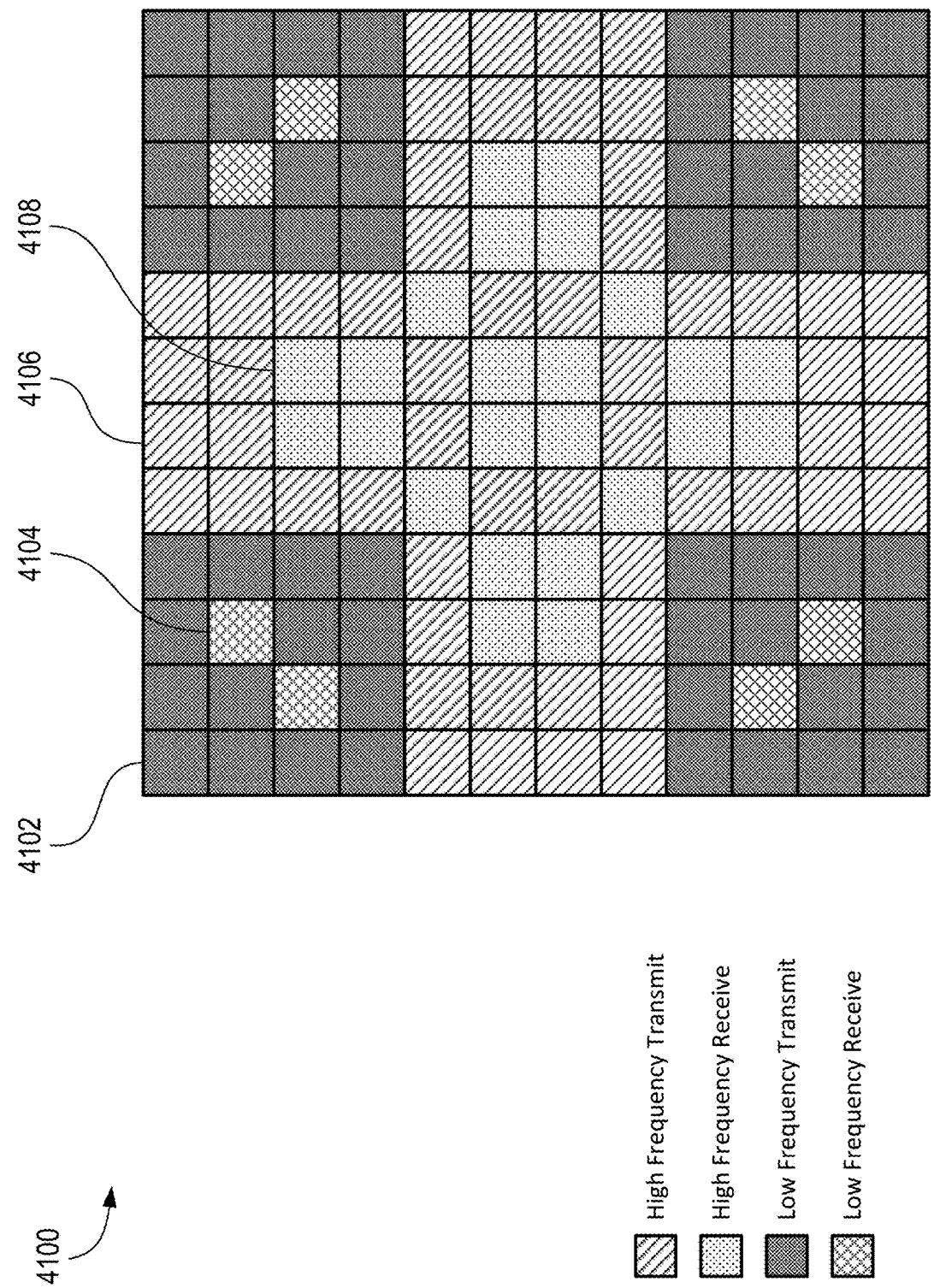

FIG. 41 is a schematic plan view depicting a multi-frequency ultrasound input device with a square design according to certain aspects of the present disclosure.

FIG. 42 is a set of three charts depicting example signals received by an ultrasound input system attributable to three different users according to certain aspects of the present disclosure.

Figure 43:
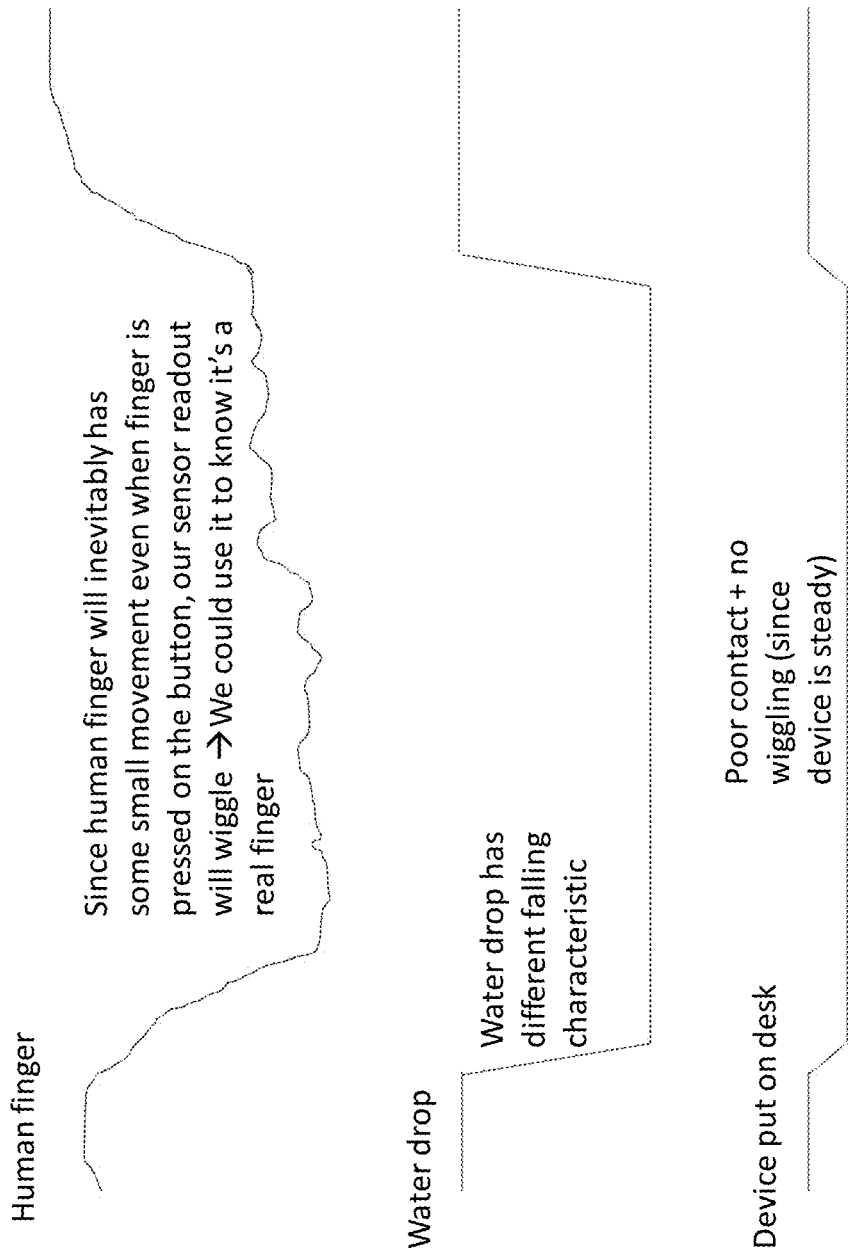

FIG. 43 is a set of charts depicting energy measurement signals associated with a human finger, a water drop, and placing a device on a desk (e.g., placing an object over a sensor).

Figure 44:
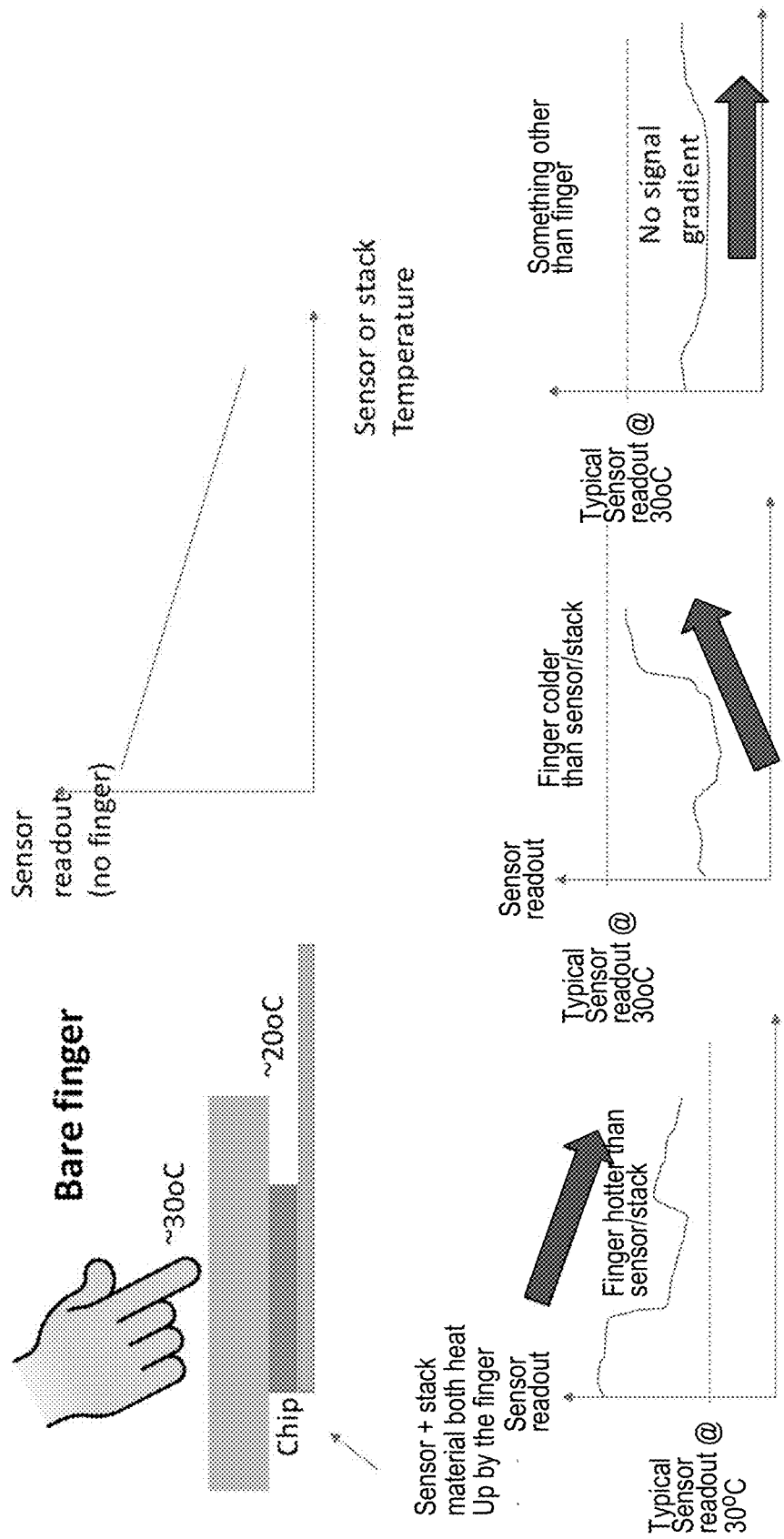

FIG. 44 is a combination schematic diagram and set of charts depicting how temperature can be leveraged to further identify whether a human finger is initiating a touch event.

Figure 45:
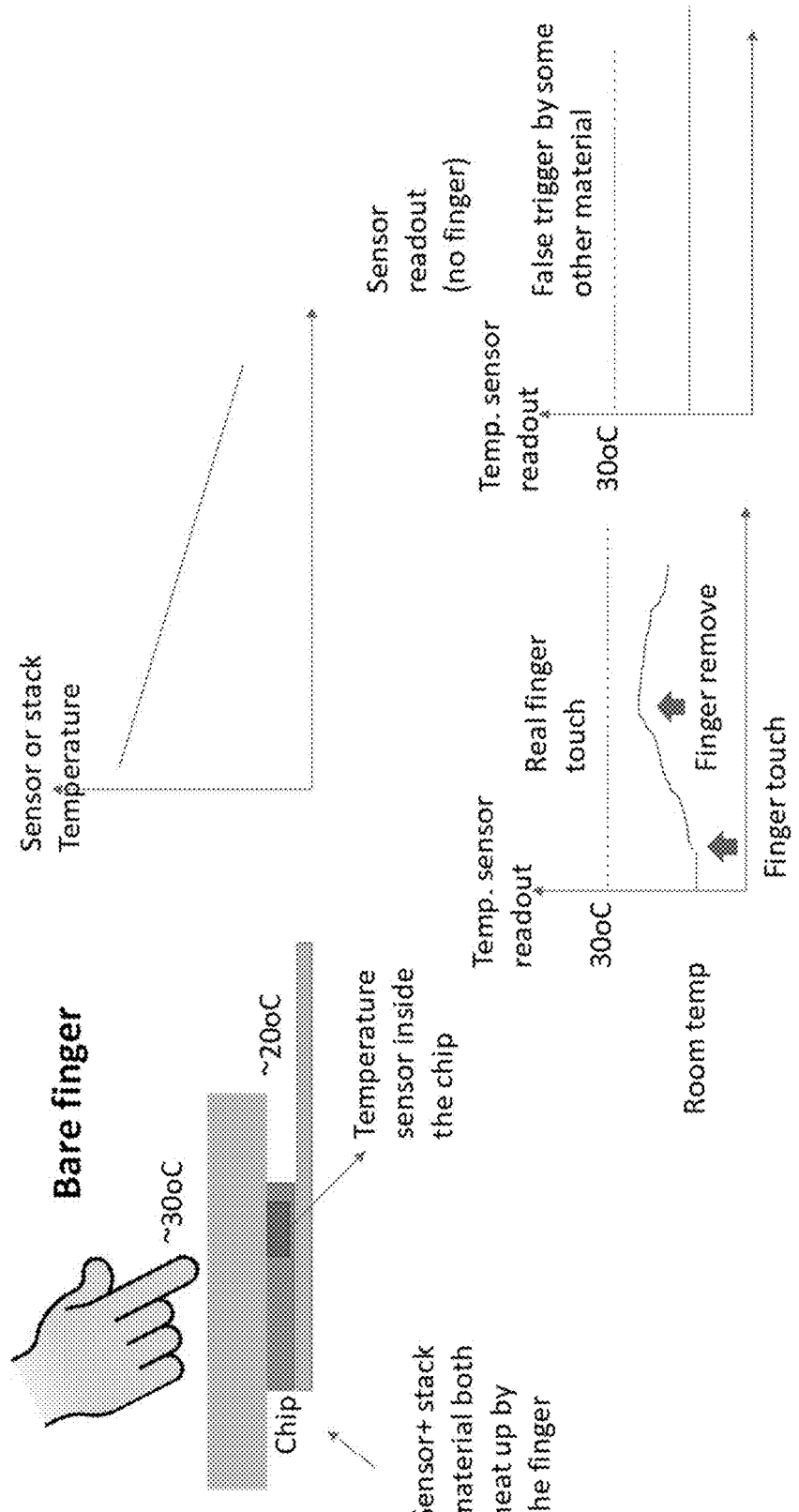

FIG. 45 is a combination schematic diagram and charts depicting a finger touch and associated temperature information according to certain aspects of the present disclosure.

Figure 46:
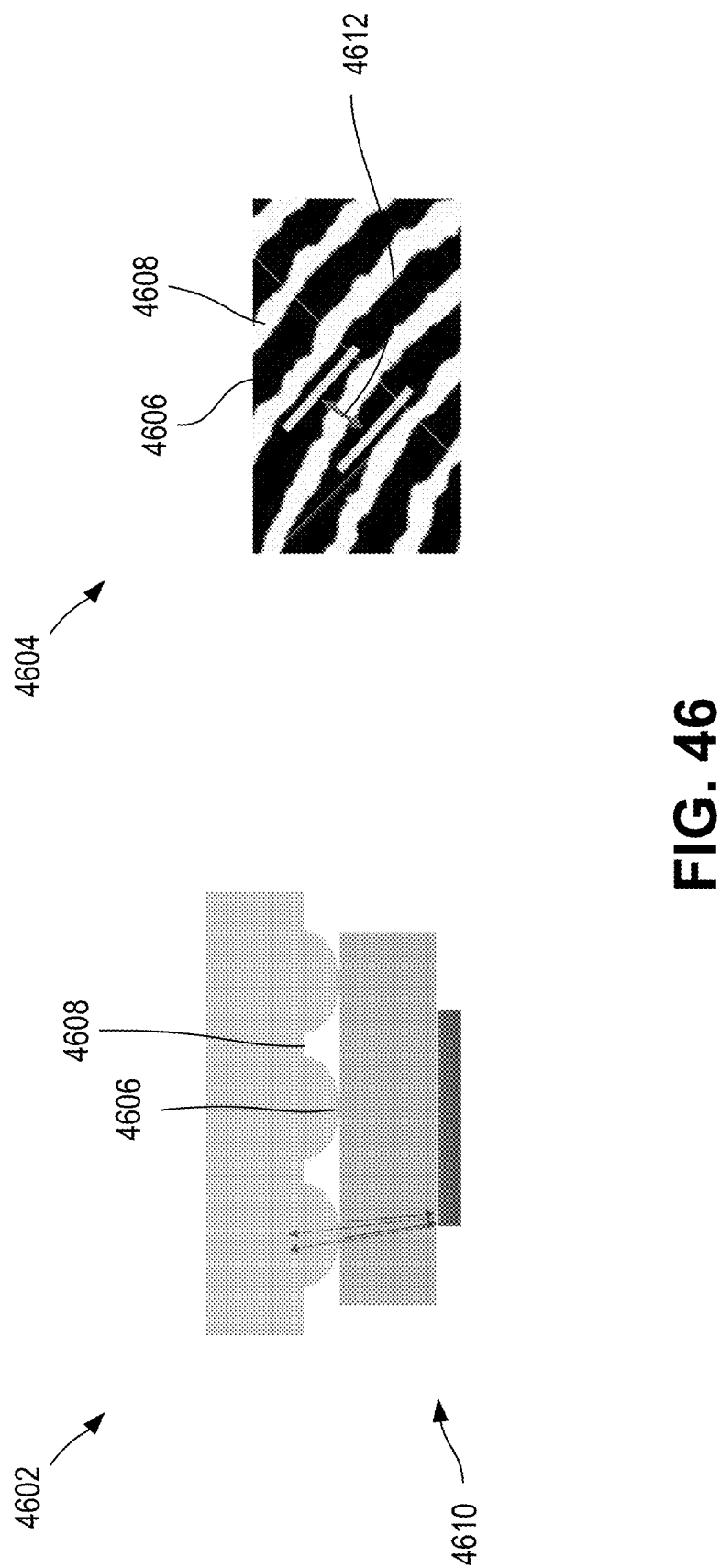

FIG. 46 is a combination schematic side view and signal map depicting ridges and valleys of a fingerprint initiating a touch event on an ultrasound input system according to certain aspects of the present disclosure.

Figure 47:
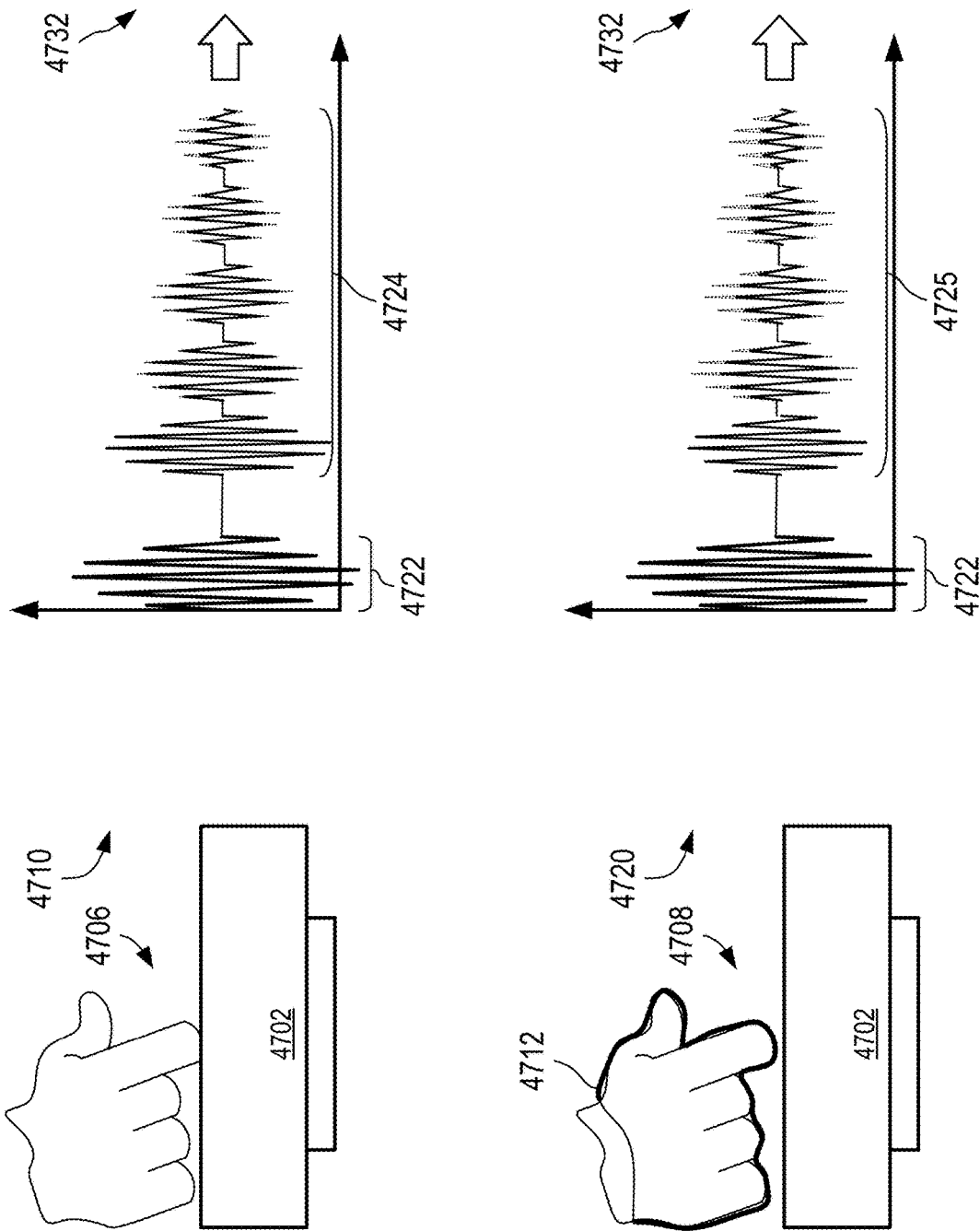

FIG. 47 is a schematic diagram depicting example signals received by an ultrasound input system attributable to the same user initiating touch events with and without a glove according to certain aspects of the present disclosure.

Figure 48:
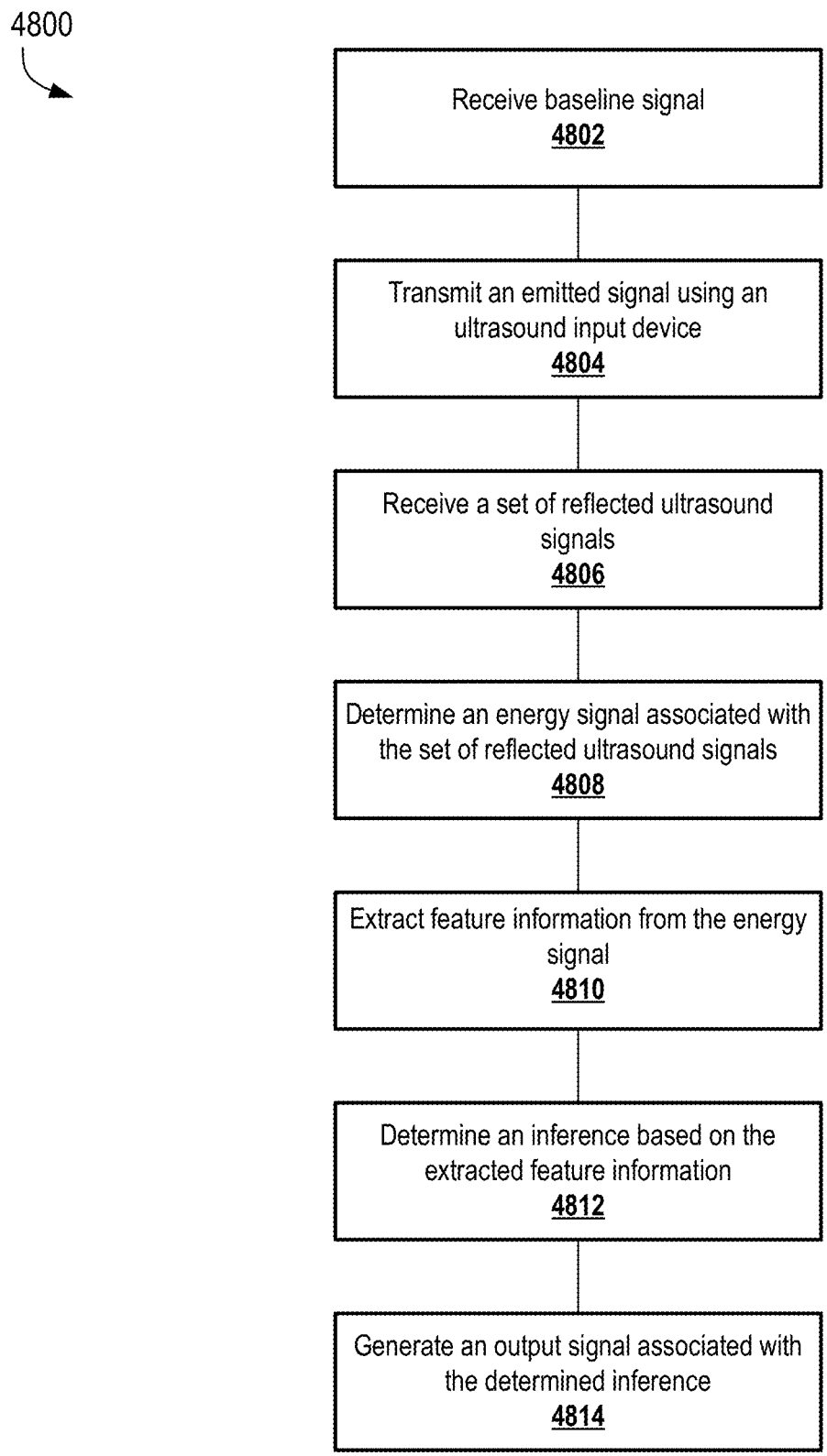

FIG. 48 is a flowchart depicting a process for extracting features from a signal of an ultrasound input system according to certain aspects of the present disclosure.

Figure 49:
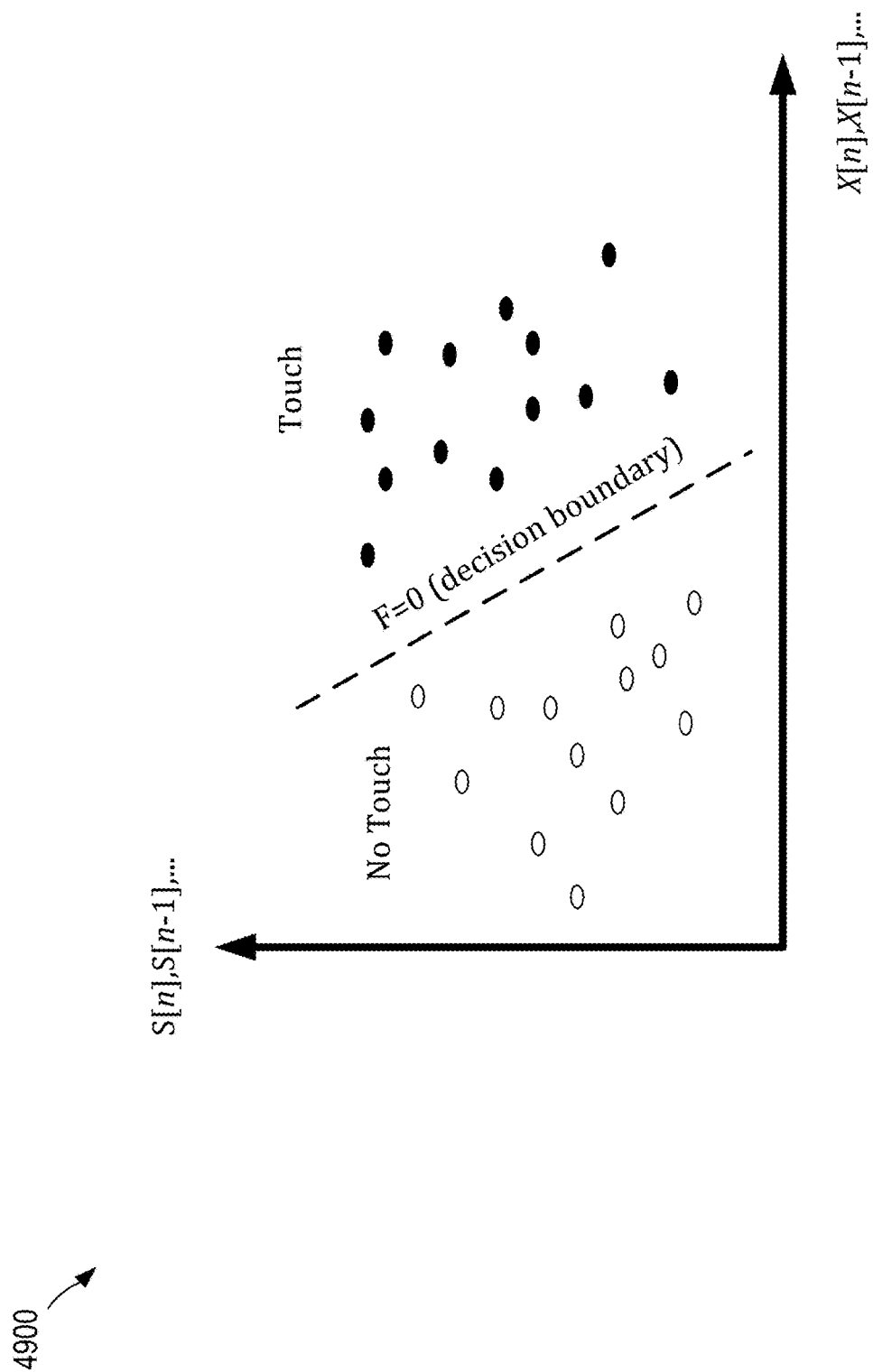

FIG. 49 is a chart depicting a machine learning decision algorithm used to improve touch detection according to certain aspects of the present disclosure.

Figure 50:
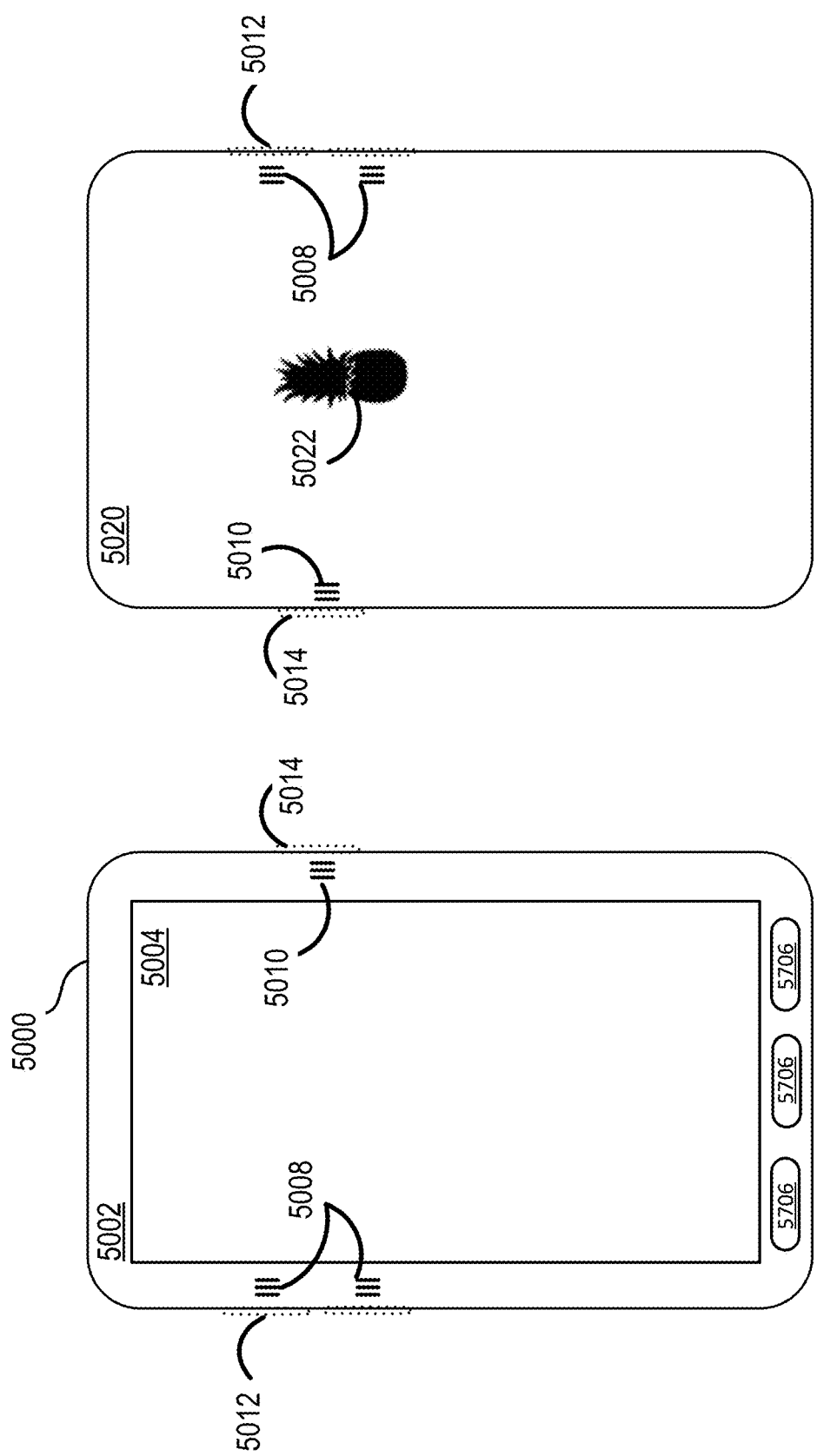

FIG. 50 is a schematic diagram depicting an electronic device with an ultrasound input device according to certain aspects of the present disclosure.

Figure 51:
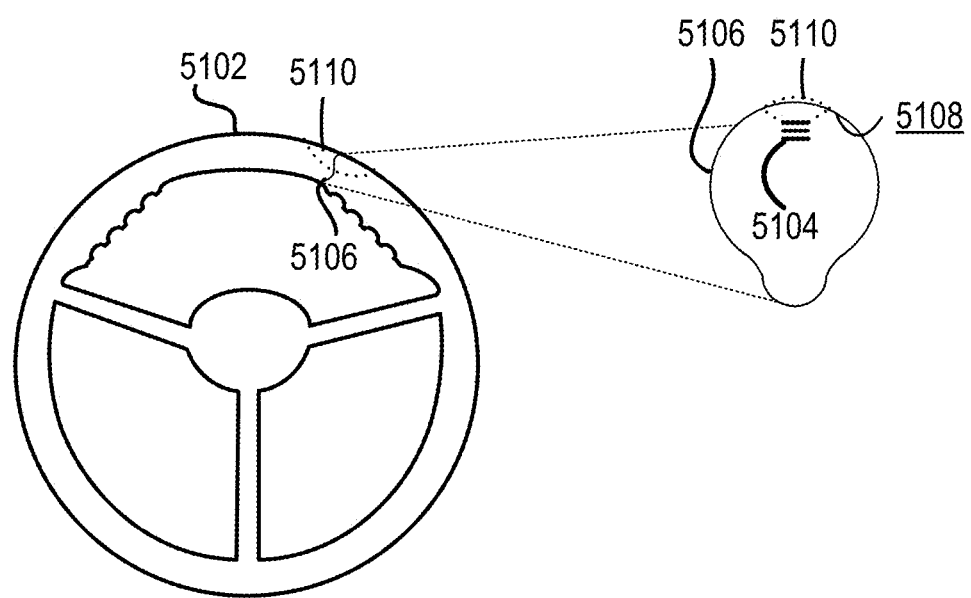

FIG. 51 is a schematic diagram depicting an automotive component with an ultrasound input device according to certain aspects of the present disclosure.

Figure 52:
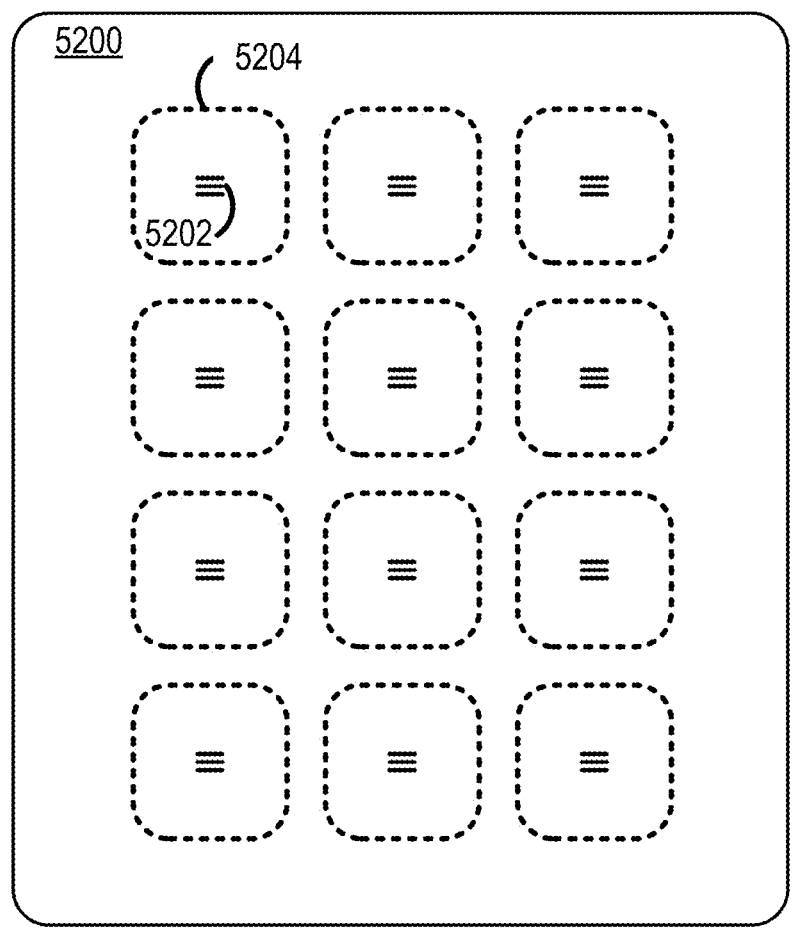

FIG. 52 is a schematic diagram depicting a keypad using an ultrasound input device according to certain aspects of the present disclosure.

Figure 53:
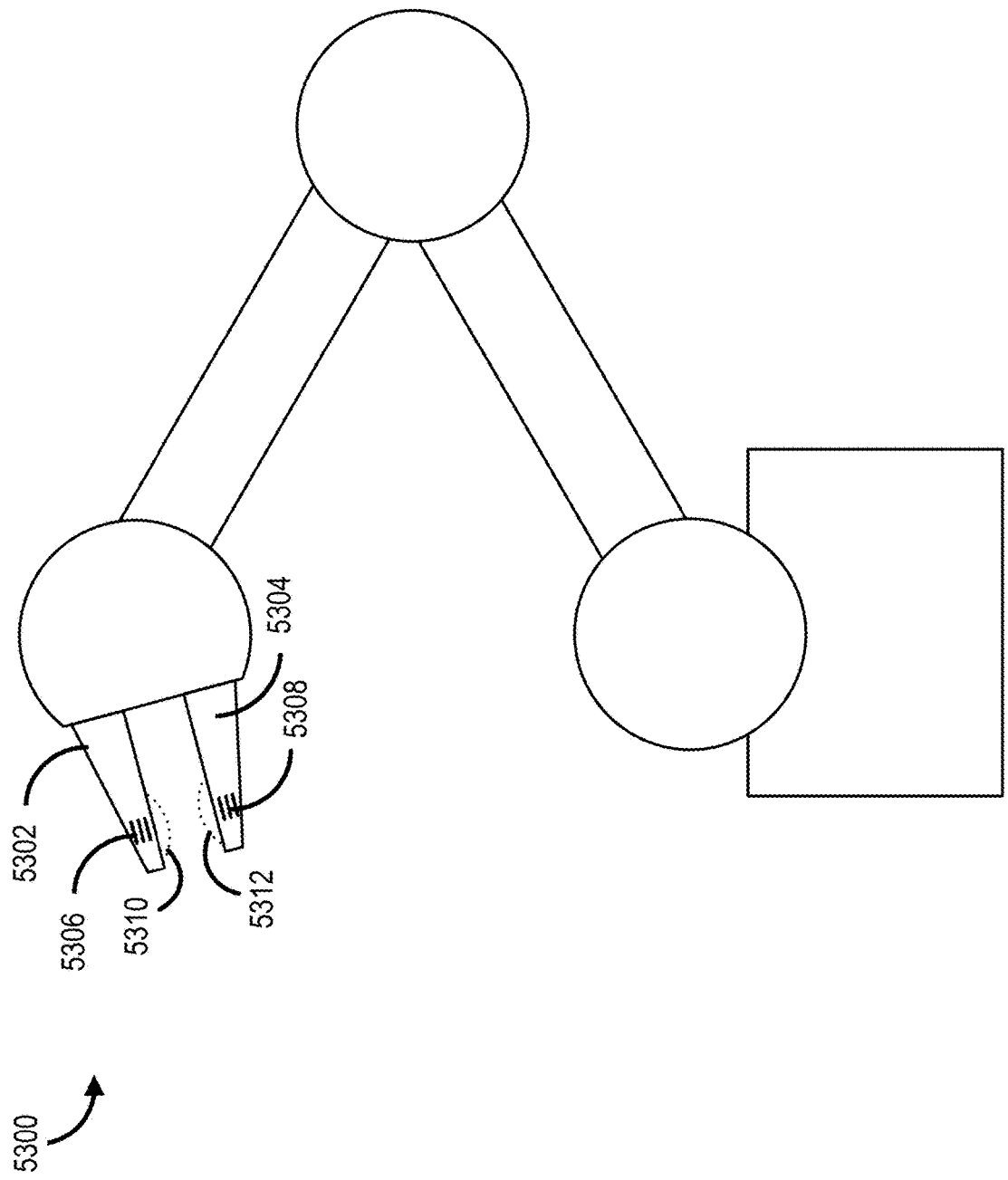

FIG. 53 is a schematic diagram depicting a robotic arm using an ultrasound input device according to certain aspects of the present disclosure.

Figure 54:
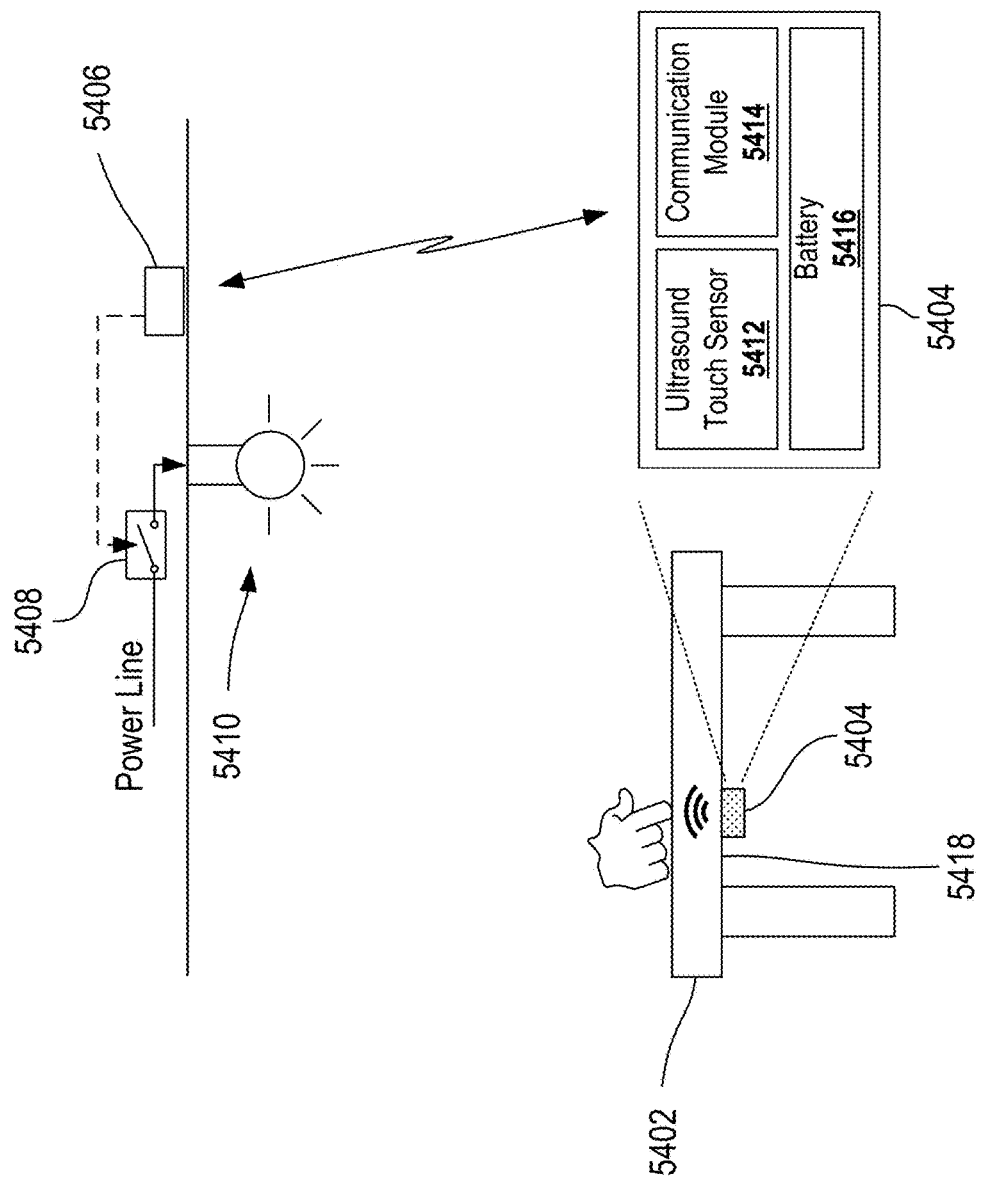

FIG. 54 is a schematic diagram depicting a piece of furniture using an ultrasound input device according to certain aspects of the present disclosure.

FIG. 55 is a set of charts depicting the energy measurement signals of an ultrasound input device demonstrating material detection according to certain aspects of the present disclosure.

Figure 56:
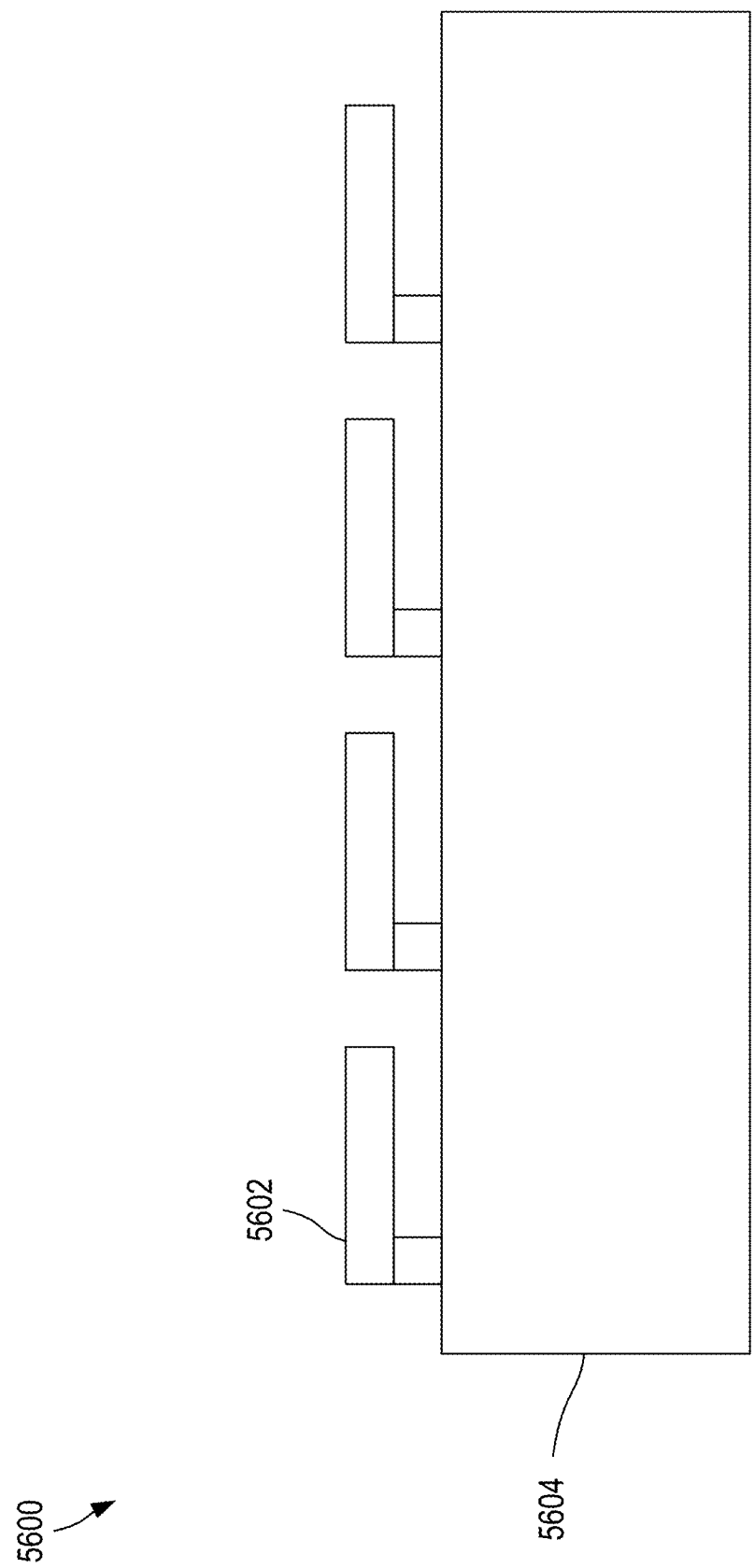

FIG. 56 is a schematic diagram of a piezoelectric resonator array containing piezoelectric cantilevers usable in an ultrasound input device according to certain aspects of the present disclosure.

Figure 57:
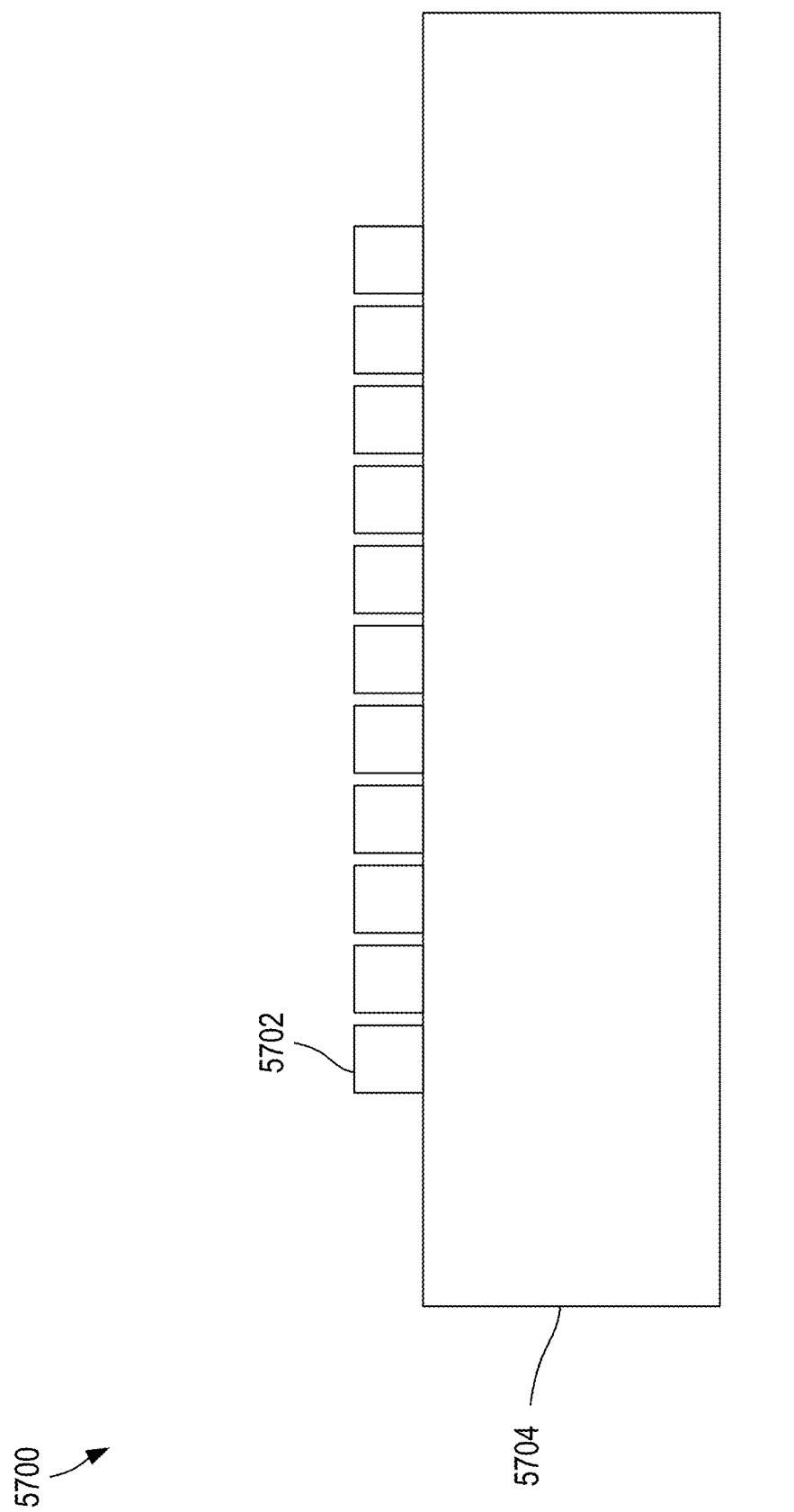

FIG. 57 is a schematic diagram of a piezoelectric resonator array containing piezoelectric pillars usable in an ultrasound input device according to certain aspects of the present disclosure.

DETAILED DESCRIPTION

A touch input solution is provided for improving detection of touch inputs in HMIs. An ultrasound input device can detect the presence of an object on any surface with a sensor positioned on the reverse side of the surface material. The ultrasound input device enables creative designs without disruption of product skin or design material. Such an ultrasound input device can be implemented in various devices, e.g., input touch buttons, sliders, wheels, etc. The ultrasound input device can be deployed under surfaces comprising a variety of materials simplifying industrial designs and appearance. Furthermore, a grid of the ultrasound input device buttons can be implemented to create key pad, mouse pad, or touch input on any surface anywhere. An ultrasound input device allows touch input deployment of an HMI on surfaces comprising wood, leather, glass, plastic, metal (e.g., aluminum or steel), ceramic, plastic, a combination of one or more materials, etc.

In some cases, an ultrasound input device can comprise an ultrasound sensor coupled to a processor, such as an application specific integrated circuit (ASIC) to provide a fully integrated system on a chip (SOC) that can receive touch inputs via ultrasonic detection. In some cases, the ultrasound sensor and processor (e.g., ASIC) can be produced in a single die. A fully integrated SOC can provide numerous benefits, such as low costs due to mass production via a wafer-level process, low profile form factors, improved signal to noise ratios, and improved freedom for design of the sensor array.

In some cases, an ultrasound input device can comprise an ultrasounds sensor that comprises a micromachined ultrasonic transducer (MUT), such as a piezoelectric micromachined ultrasonic transducer (pMUT) or capacitive micromachined ultrasonic transducer (cMUT). Numerous benefits can be achieved by using a MUT in an ultrasound input device as disclosed herein, optionally as part of a fully integrated SOC. The use of a MUT can provide an improved energy transmission region since the MUT, due to its unique and predictable flexural mode shape, creates signal propagating normal to the transducer surface (longitudinal waves normal to the surface) more dominantly as compared to other types of waves travelling laterally. Since the predictable flexural mode shape of a MUT is far separated from other modes (e.g., bulk modes) in a large frequency range, it is also more immune to generate or receive other types of acoustic waves, such as shear waves or surface wave that might be travelling laterally or normal to the sensor surface. Thus, a MUT can achieve a more distinct transmission and sensing region on a surface material, such as the region directly perpendicular to the MUT through the surface material. Additionally, the use of MUTs can reduce or minimize the amount of power needed to operate the ultrasound input device. For example, MUTs can be used with low parasitic, low driving voltages, and with low device capacitance around three orders of magnitudes below that of traditional piezoelectric ceramic ultrasound transducers.

An ultrasound input device can detect patterns associated with touch inputs and distinguish between different types of touch inputs. Different types of touch inputs can vary between a finger press, a palm press, a tap, a touch and hold, or other such inputs. Each of the various types of touch inputs can have a recognizable and/or distinguishable pattern. In some cases, feedback from multiple sensors, such as multiple sensors arranged in an array, can be used to determine the type of touch input initiated. For example, a palm resting on an array of ultrasound input devices may register a recognizable pattern across multiple ultrasound input devices, and thus a processor coupled to the multiple ultrasound input devices can make a determination that the touch input is a palm rest and take appropriate action (e.g., reject the palm rest as a touch input or initiate an action based on the palm rest).

An ultrasound input device can detect patterns associated with touch inputs and distinguish between different users initiating the touch input. It has been found that different users of an ultrasound input device will often produce a recognizable and distinguishable signal upon initiating a touch input. For example, the signal measured from a touch input can change based on a user's finger, such as the moisture content of the finger, the size of the ridges and valleys of the fingerprint, and other mechanical properties of the individual finger. Additionally, some users may initiate a touch input in a repeatable fashion which can be used to identify the user. For example, a first user may usually rapidly tap the input device, whereas as second sensor may usually place their finger over the input device and then depress. As another example, different users might create different touch pressures which could also be detected by monitoring the amount of ultrasound signal change. Such factors, such as speed of the touch input and style of the touch input, can be used to facilitate identifying a user.

In some cases, the use of an array of ultrasound transducers (e.g., MUTs) can enable the use of beamforming technologies to facilitate detection of various patterns associated with touch inputs. In some cases, an ASIC or other processor incorporated into an ultrasound input device can facilitate and/or perform pattern recognition of touch inputs, as well as perform desired actions upon identification of particular patterns.

In some cases, an ultrasound input device can provide an improvement to the aesthetic features and reliability of touch input detection over capacitive and mechanical devices. A button can be implemented on a surface by defining the button area on a touch surface. An ultrasound input device can be embedded/placed behind the surface and thus limits environmental exposure including dust and moist, as well as reducing the manufacturing costs associated with creating special openings on the surface required for other sensors. An ultrasound input device can increase flexibility of button programmability options. For example, a user can define the functionality of the button through a system controller, which can be embedded on a shared printed circuit board (PCB) with the ultrasound input device. In some embodiments, the system controller can monitor user behaviors to improve machine/system preferences and performance. An ultrasound input device mechanically coupled to a surface but positioned away from view, such as underneath or behind an opaque surface, can be used to provide a hidden input not discernable or not easily discoverable to those who do not already know its location. For example, an ultrasound input device can be placed underneath a logo (e.g., on a laptop or another surface or device), behind a wall, or underneath a surface of a piece of furniture.

An ultrasound input device can be low power and/or battery powered, such as to operate for extended periods of time without requiring direct connection to a mains power source. An ultrasound input device can be or be incorporated into an internet of things (JOT) device capable of providing sensor data (e.g., a button press) to other devices on a local or remote network. In some cases, the use of MUTs can permit the ultrasound input device to operate with especially low power requirements. In some cases, an ultrasound input device that is a fully integrated SOC can operate with low power and/or can provide IOT functionality.

The analog and/or digital circuits necessary to operate the ultrasonic touch input device can be integrated with the ultrasound transducers. This integration allows for achieving very small chip height (e.g., less than 0.5 mm) and foot print (e.g., less than 1 $mm^2$) and enables input touch detection in tight spaces. In some embodiments, the output from the chip can be based on Inter-Integrated Circuit (VC) or Serial-Peripheral Interface (SPI), although other protocols can be used. This on-chip processing can eliminate the need for separate analog chips for ultrasonic sensor signal amplification and analog to digital conversion. The ultrasonic touch input sensor can process and output a signal indicating a touch input independent from a main microcontroller or any other board component in the system in which the sensor is installed.

I. Device Overview

Embodiments of the invention are directed to an ultrasound input device to detect touch inputs. Specifically, embodiments are directed to an ultrasound input device comprising a transducer coupled to a material layer that provides a surface to receive touch input signals to a system. The ultrasound input device can be implemented using a variety of material layers including wood, leather, glass, plastic, metal (e.g., aluminum, steel, or others), stone, concrete, sheetrock, gypsum, paper, polymers, biological materials (e.g., tissues, such as skin), a combination of one or more materials, etc. The flexibility of material selection enables the use of an ultrasound input device in a variety of applications including front and side buttons of a mobile device; a steering wheel, infotainment unit, center console controls, mirrors, seats, door handles, windows, etc. of a vehicle; internet-of-things devices; medical devices such as bed controls, blood pressure measurement devices; input detection for robotics such as touch sensing for robotic fingers; and hidden input devices such as hidden within furniture or behind walls.

A. Detecting a Touch Input Using Ultrasonic Signals

Figure 1:
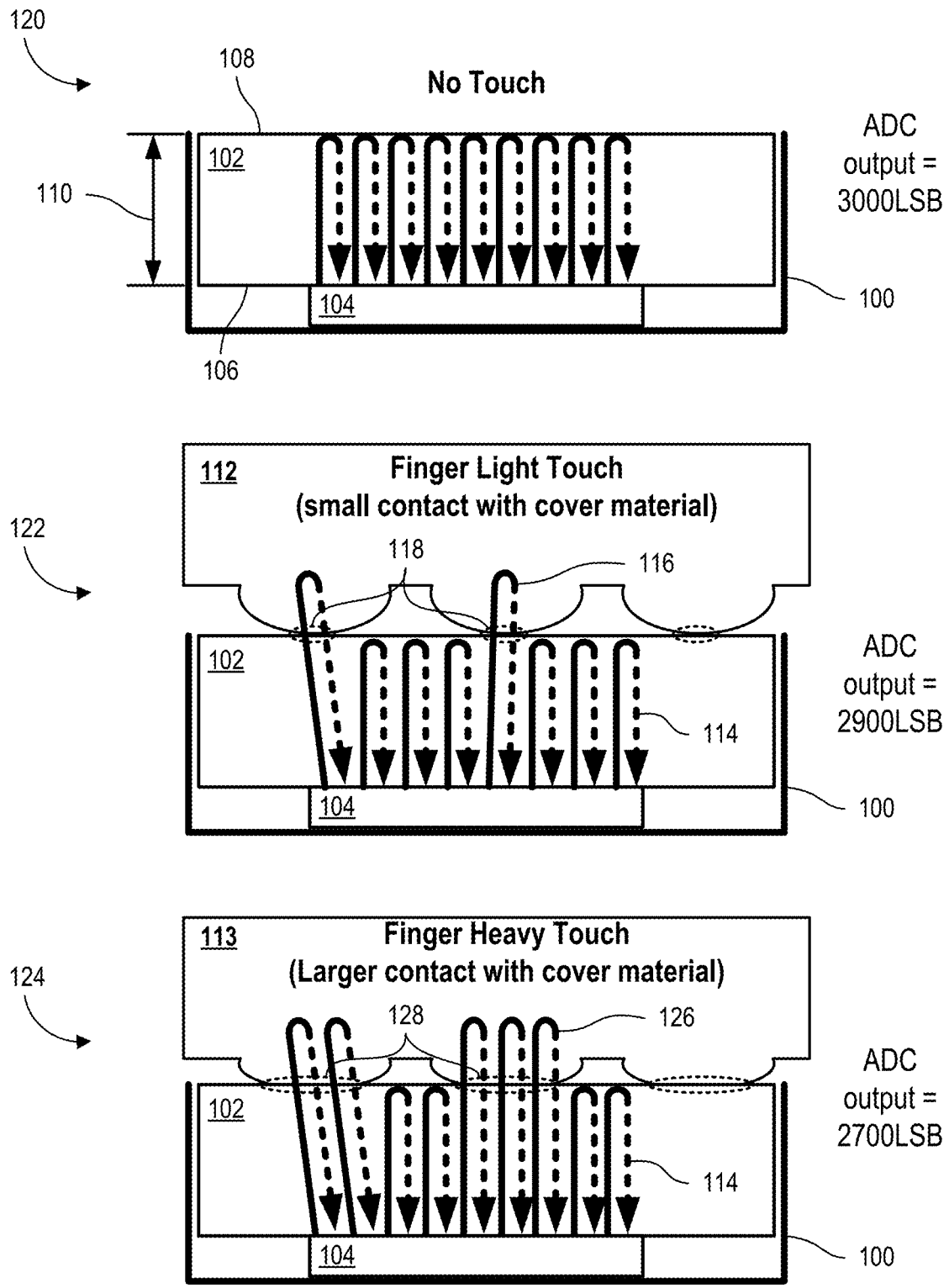
FIG. 1 is a schematic diagram depicting the effect of touch force on the reflected ultrasound signals in an ultrasound input system according to certain aspects of the present disclosure.

FIG. 1 is a schematic diagram depicting the effect of touch on the reflected ultrasound signals in an ultrasound input system according to certain aspects of the present disclosure. The ultrasound input can include a transducer 104 coupled to a material layer 102. The material layer 102 can be known as a stack and can incorporate one or more sublayers of one or more materials. For example, a stack can be a single sheet of glass, a piece of drywall, a laminated set of plastics and glasses, or a plastic steering wheel wrapped in leather, among others. The material layer 102 has a first (interior) surface 106 and a second (exterior) surface 108. The material layer can be characterized by a distance 110 between the first surface 106 and the second surface 108. The material layer 102 can be a cover material of a larger device that integrates an ultrasound input device. In some embodiments, the material layer 102 can form a body or a portion of the body of a device. In these embodiments, the first surface 106 can form an interior surface of the body and the second surface 108 can form the exterior surface of the body. Second surface 108 can be considered exterior as it is exposed to the environment. First surface 106 can be considered interior in that it is not the surface that contact is to be detected or in that it is the surface where the transducer 104 is acoustically coupled to the material layer 102. FIG. 1 shows the ultrasound input device with no touch 120, the ultrasound input device with a light touch 122, and the ultrasound input device with a heavy touch 124.

This touch sensor is triggered based on material acoustic properties of touch surface (material layer 102) and the input object 112. Detection of the light touch 122 is dependent on extent of reflected ultrasonic signals 114 in the material layer 102 versus absorbed ultrasonic signals 116 transmitted through the second surface 108 of the material layer 102 into the input object 112. As used herein, a reflected ultrasonic signal (e.g., reflected ultrasonic signals 114) can refer to a signal that has reflected off the second surface 108 of the material layer 102, and an absorbed ultrasonic signal (e.g., absorbed ultrasonic signals 116) can refer to a signal of which at least a portion of the signal has been absorbed by an input object 112 (e.g., a finger) contacting the second surface 108 of the material layer 102. The contact (e.g., based on pressure) of the input object 112 on the touch surface defines one or more contact areas 118 and an amount of reflection. The material layers 102 can be a single layer or can be comprised of multiple layers of materials with different properties. For example, in some implementations, the material layer 102 can be a uniform and isotropic material. In other implementations, the material layer 102 can be a composite material layer comprised of multiple layers of different materials. Thresholds can be set based on the contact area 118 of touch for triggering the button and impedance difference between input object 112 and material layer 102, as well as geometric and acoustic properties of the whole material stack of the material layer 102.

The size of the contact areas 118 and space between the contact areas 118 can be indicative of the size and spacing of the finger's ridges, as well as the size and spacing of the valleys of the finger's fingerprint. Certain changes in the size and/or spacing between contact areas 118 can be indicative of different fingers contacting the material layer 102. For example, a young individual may have smaller valleys (e.g., a smaller distance between contact areas 118) than an older individual. In some cases, the detected size and/or spacing between contact areas 118 can be used to detect or make an inference as to the user contacting the material layer 102. Such an inference can be used to apply customizations (e.g., have a touch event result in different actions for different users or have different sensing thresholds for different users), test for permissions (e.g., allow an action only if a recognized user is initiating the touch event or the user touches the surface in a certain way, identical to a "passcode"), or perform other rule-based actions using the inference.

The heavy touch 124 can be distinguished from the light touch 122 by determining that fewer reflected signals or fewer non-attenuated signal are received by the transducer 104 due to an increased number of absorbed ultrasonic signals 126. The ultrasound input device 100 and input object 113 (e.g., a finger) will have a larger contact area 128 if the pressure of the touch is increased, e.g., as the contacting surface flattens. As shown in FIG. 1, the larger contact area 128 increases the number of absorbed ultrasonic signals 126 passing through the second surface 108 of the material layer 102 into the input object 113. In the case of a user's finger, the larger contact area 128 can be indicative of a ridge of the user's finger being flattened against the second surface 108 of the material layer 102. In some cases, with the input object 113 is not a finger or is a finger covered by another material, the larger contact area 128 can be a result of textured elements of the input object 113 being flattened against the second surface 108 of the material layer 102.

Figure 2:
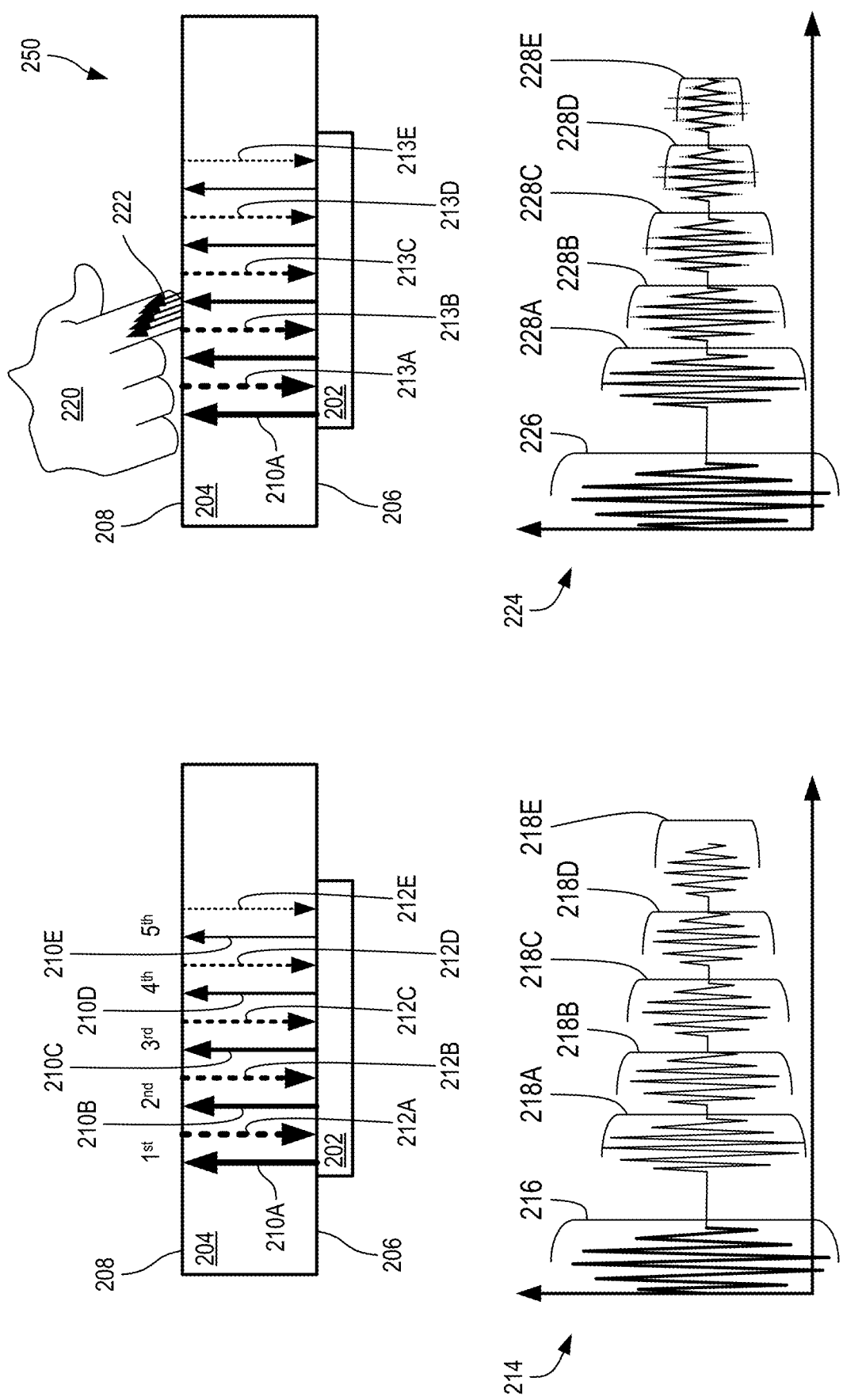
FIG. 2 is a schematic diagram depicting an ultrasound input system in an non-contacted state and a contacted state according to certain aspects of the present disclosure.

FIG. 2 is a schematic diagram depicting an ultrasound input system in a non-contacted state and a contacted state according to certain aspects of the present disclosure. FIG. 2 shows the ultrasound input device with no touch 200 (e.g., a non-contacted state) and with a touch 250 (e.g., a contacted state). The ultrasound input device includes a transducer 202 coupled to the material layer 204. In this embodiment, the material layer 204 is shown as aluminum, but can be any material (e.g., glass, wood, leather, plastic, etc., or a composite material formed of a combination of materials). The transducer 202 is coupled to a first (interior) surface 206 of the material layer 204. A second (exterior) surface 208 of the material layer 204 is in contact with the air or some other environment like liquid acoustic impedance different than human finger.

For the ultrasound input device with no touch 200, the transducer 202 emits an ultrasonic signal 210A directed into the material layer 204 and toward the second surface 208. Air has an acoustic impedance of approximately zero and causes the second surface 208 to reflect a reflected ultrasonic signal 212A with close to 100% of the emitted ultrasonic signal (e.g., at or more than 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.81%, 99.82%, 99.83%, 99.84%, 99.85%, 99.86%, 99.87%, 99.88%, 99.89%, 99.9%, 99.91%, 99.92%, 99.93%, 99.94%, 99.95%, 99.96%, 99.97%, 99.98%, and/or 99.99%.). The reflected ultrasonic signal 212A can itself be reflected off the first surface 206 to generate a reflected-emission signal 210B, which can be reflected off the second surface 208 to result in a second reflected ultrasonic signal 212B. In the case of a composite material stack for 204, the signal reflected from 208 can reflect multiple times internally within the composite stack itself and such echo chain can be sensed by the transducer 202. Analyzing the received echo-chain formed from the reflections between 206 and 208 and/or internal reflections within the multi-layers of 204, in case of a composite material, could be used directly to identify the material stack of 204 and/or the environment (e.g., air). Such information could be used solely to identify the acoustic and/or geometric properties of a stack or used as extra information for sensor calibration and threshold tuning of the detection algorithm. As depicted in FIG. 2, four reflected ultrasonic signals 212A, 212B, 212C, 212D generate four respective reflected-emission signals 210B, 210C, 210D, 210E. Any number of reflected ultrasonic signals 212A, 212B, 212C, 212D, 212E and reflected-emission signals 210B, 210C, 210D, 210E can result from an initial emitted ultrasonic signal 210A until the signals become too attenuated to be reflected and/or detected. Plot 214 shows a first amplitude 216 corresponding to the emitted ultrasonic signal 210A and a set of subsequent amplitudes 218A, 218B, 218C, 218D, 218E corresponding to the reflected ultrasonic signals 212A, 212B, 212C, 212D, 212E. The first subsequent amplitude 218A is smaller than the first amplitude 216 due to losses in the material layer 204. Each of the remaining subsequent amplitudes 218B, 218C, 218D, 218E is smaller than the amplitude of the previous subsequent amplitude 218A, 218B, 218C, 218D due to losses in the material layer 204.

In some cases, the frequency or frequencies selected for use with the ultrasound input device can be selected to achieve a small or minimal attenuation in a non-contacted state, thus achieving a large or maximum number of reflected ultrasonic signals. In some cases, the set of reflected ultrasonic signals 212A, 212B, 212C, 212D, 212E stemming from a single emitted ultrasonic signal 210A can be referred to as a train of reflected signals. For illustrative purposes, the various reflected ultrasonic signals 212A, 212B, 212C, 212D, 212E and reflected-emission signals 210B, 210C, 210D, 210E are depicted spaced apart from left to right in FIG. 2, however it will be understood that these signals are temporally separated and may not necessarily be spatially separated. The echo signals might be analyzed separately and/or combined or integrated with one another as the detection metric.

For the ultrasound input device with a touch 250, an input object 220, in this case a finger, is in contact with the second surface 208 of the material layer 204. Local reflection loss from the area contacted by the object, e.g., finger ridge, depends on how much the touch input medium versus the input object differ in terms of acoustic impedance. For example, reflection loss (dB) can be represented as $$20\log10\left(abs\left(\frac{Z2-Z1}{Z2+Z1}\right)\right),$$

where Z1 is the impedance of the material layer 204 and Z2 is the impedance of the input object 220. Once an input object 220 is in contact with material layer 204, the emitted ultrasonic signal 210A is divided into two parts. The first part, the echo, is a reflected ultrasonic signal 213A and is reflected back towards the transducer. The second part 222 is the transmitted signal which penetrates into the input object 220. The reflected ultrasonic signal 213A can itself be reflected off the first surface 206 to generate a reflected-emission signal. The reflected-emission signal can itself be divided into two parts, one of which is a second reflected ultrasonic signal 212B and another of which is the second part 222 that penetrates into the input object 220. As depicted in FIG. 2, four reflected ultrasonic signals 213A, 213B, 213C, 213D generate four respective reflected-emission signals. Any number of reflected ultrasonic signals 212A, 212B, 212C, 212D, 212E and reflected-emission signals can result from an initial emitted ultrasonic signal 210A until the signals become too attenuated to be reflected and/or detected.

As shown by plot 224, a first amplitude 226 corresponds to the emitted ultrasonic signal 210A. The first subsequent amplitude 228A corresponding to reflected ultrasonic signal 213A is reduced compared to the no touch ultrasound input device due to the second part 222 penetrating the input object 220. Each of the remaining subsequent amplitudes 228B, 228C, 228D, 228E is smaller than the amplitude of the previous subsequent amplitude 228A, 228B, 228C, 228D due to losses in the material layer 204 and internal multipath reflections in case of a composite material stack for 204. For illustrative purposes, plot 224 depicts the subsequent amplitudes 228A, 228B, 228C, 228D, 228E in solid line overlaid with the corresponding subsequent amplitudes 218A, 218B, 218C, 218D, 218E in dotted lines. The amount of overall attenuation of the subsequent amplitudes 228A, 228B, 228C, 228D, 228E of the ultrasound input device in a contacted state may be greater than that of the subsequent amplitudes 218A, 218B, 218C, 218D, 218E of the ultrasound device in a non-contacted state. Additionally, the amount of attenuation between each of the subsequent amplitudes 228A, 228B, 228C, 228D, 228E of the ultrasound input device in a contacted state may be greater that of the subsequent amplitudes 218A, 218B, 218C, 218D, 218E of the ultrasound device in a non-contacted state.

Of note, the subsequent amplitudes 228A, 228B, 228C, 228D, 228E from plot 224 that are associated with a touch event attenuate faster than the corresponding subsequent amplitudes 218A, 218B, 218C, 218D, 218E from plot 214 that are associated with no touch event. In other words, the contrast between subsequent amplitudes of a touch event and subsequent amplitudes of a no touch event is greater with each subsequent reflection number n. In some cases, the ratio of a the n-th subsequent amplitude associated with no touch event to the n-th subsequent amplitude associated with a touch event can be $\Gamma^n$:$(1-\Gamma^n)$ where $\Gamma$ is the percentage of the signal reflected back from the second surface 208. For example, the ratio of subsequent amplitude 218A to subsequent amplitude 228A may be 100:90; the ratio of subsequent amplitude 218B to subsequent amplitude 228B may be 100:81; the ratio of subsequent amplitude 218C to subsequent amplitude 228C may be 100:72; the ratio of subsequent amplitude 218D to subsequent amplitude 228D may be 100:63; and the ratio of subsequent amplitude 218E to subsequent amplitude 228E may be 100:54.

B. Ultrasound Touch Input Device

Figure 3:
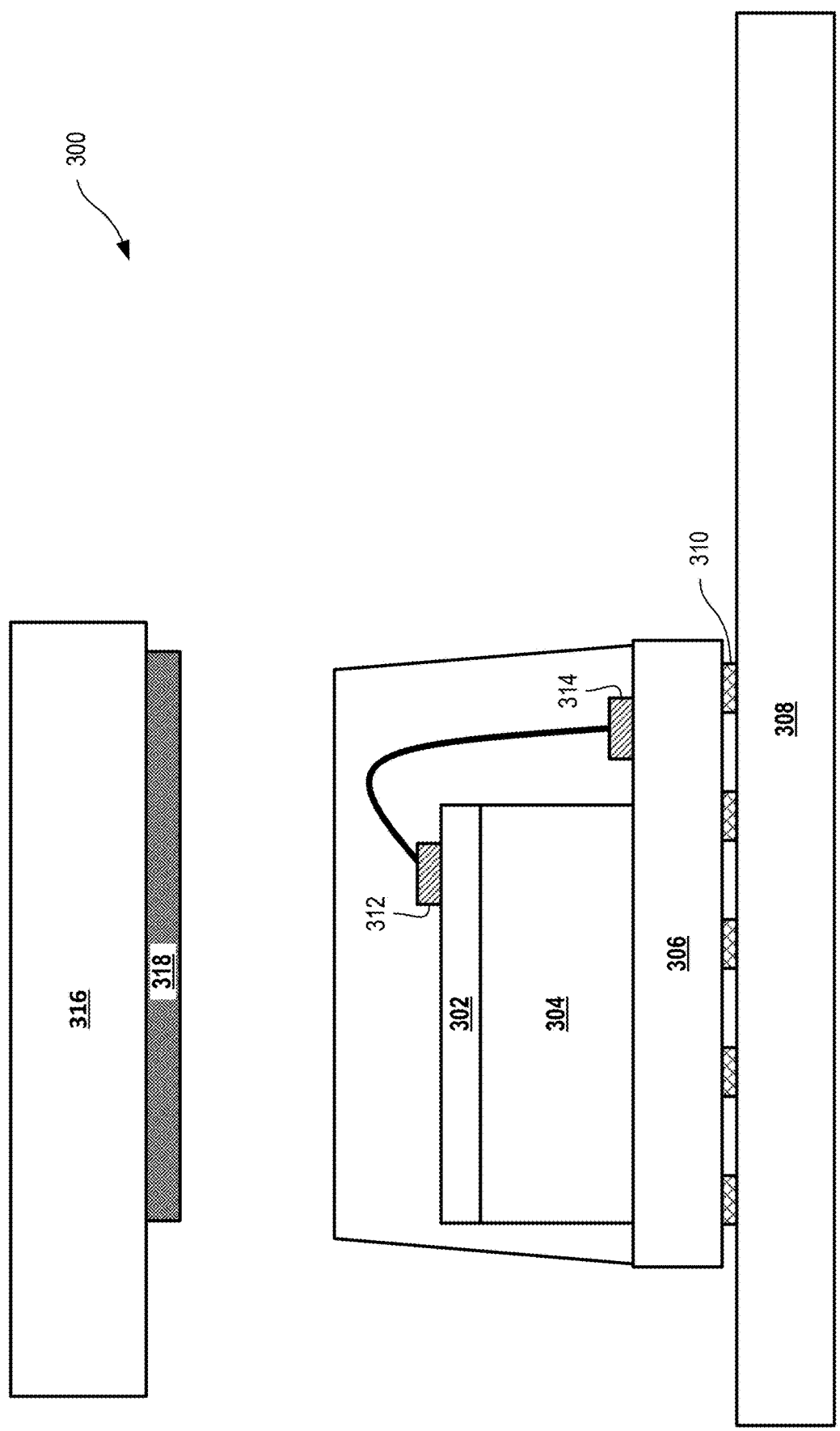
FIG. 3 is a schematic diagram depicting an ultrasound input device according to certain aspects of the present disclosure.

FIG. 3 shows an ultrasound input device according to certain aspects of the present disclosure. Ultrasound input device 300 can be attached to any surface to detect touch inputs. The ultrasound input device 300 can include a sensor 302, such as a piezoelectric micromachined ultrasonic transducer (PMUT). A PMUT transducer is a piezoelectric ultrasonic transducer that comprises a thin membrane coupled to a thin piezoelectric film to induce and/or sense ultrasonic signals. The sensor 302 can be integrated on an application-specific integrated circuit (ASIC), such as CMOS (complementary metal-oxide-semiconductor) ASIC 304 (all-in-one) and formed on a base 306. The ASIC 304 can include electrical circuits and/or modules usable to perform various processes as disclosed herein, such as various analog and/or digital processing as described with reference to at least FIGS. 24-39. For example, ASIC 304 can be used to drive sensor 302, detect reflected ultrasonic signals using sensor 302, and determine amplitudes associated with the reflected ultrasonic signals (e.g., using various analog technologies such as accumulation and integration). In some cases, ASIC 304 can optionally determine a threshold value to which the determined amplitudes can be compared to make a determination about whether or not a touch event has occurred, in which case the ASIC 304 can output a signal associated with the occurrence of the touch event.

In some cases, circuitry of the ASIC 304 can perform certain process in analog, such as signal rectification, integration, mixing, modification, accumulation, and the like. As used herein, analog circuitry can include any circuitry capable of performing an action (e.g., rectification, integration, and the like) on an analog signal without first digitizing the analog signal. In an example, ASIC 304 can include analog circuitry capable of taking a received ultrasonic signal, rectifying the signal, and integrating at least a portion of the rectified signal to provide an integrated signal, such as described with reference to FIG. 25. In another example, ASIC 304 can include analog circuitry capable of taking a received ultrasonic signal, calculating absolute values of the signal, and accumulating the absolute values to provide an accumulated signal, such as described with reference to FIG. 27. In another example, ASIC 304 can include analog circuitry capable of taking a received ultrasonic signal, squaring the signal through self-mixing, and integrating the squared signal to provide an integrated signal, such as described with reference to FIG. 28.

In some cases, a different style of ultrasonic transducer can be used for sensor 302 instead of a PMUT sensor. In some cases, the ultrasonic sensor can be formed using a deposited layer of piezoelectric material (e.g., aluminum nitride, lead zirconate titanate (PZT), or polyvinylidene fluoride (PVDF)). In some cases, the ultrasonic sensor can be a capacitive micromachined ultrasonic transducer (CMUT). In some cases, the ultrasonic sensor can be a resonator array of piezoelectric devices (e.g., piezoelectric cantilevers or piezoelectric pillars).

The base 306 can be bonded 310 to a flexible printed circuit/printed circuit board 308 (FPC/PCB) of a larger integrated device such as a mobile phone. In some embodiments, a contact area 312 on the sensor 302 can be bonded to a base contact 314. As shown, the dimensions of the ultrasound input device 300 can be equal to or less than 1.5 mm×1.5 mm×0.5 mm in size, although other sizes can be used. In some cases, the FPC/PCB 308 to which the base 306 is attached can receive information associated with the amplitude of detected reflected ultrasonic signals and perform some of the functionality disclosed herein, such as determining threshold values and/or determining when a touch event has occurred. However, in some cases, the FPC/PCB 308 simply receives a signal associated with occurrence of a touch event, and thus does not need to perform further analysis of amplitudes of detected reflected ultrasonic signals to perform actions based on a touch event.

The ASIC 304 and the sensor 302 integration enables small form factor that leads placement of buttons or other functionality in many space-limited applications. For example, smartphone side mechanical buttons can easily be replaced with the ultrasound input device 300 under casing. To implement a touch interface of a system or other suitable functionality, the ultrasound input device 300 can be bonded to a surface 316 using an adhesive 318.

Figure 4:
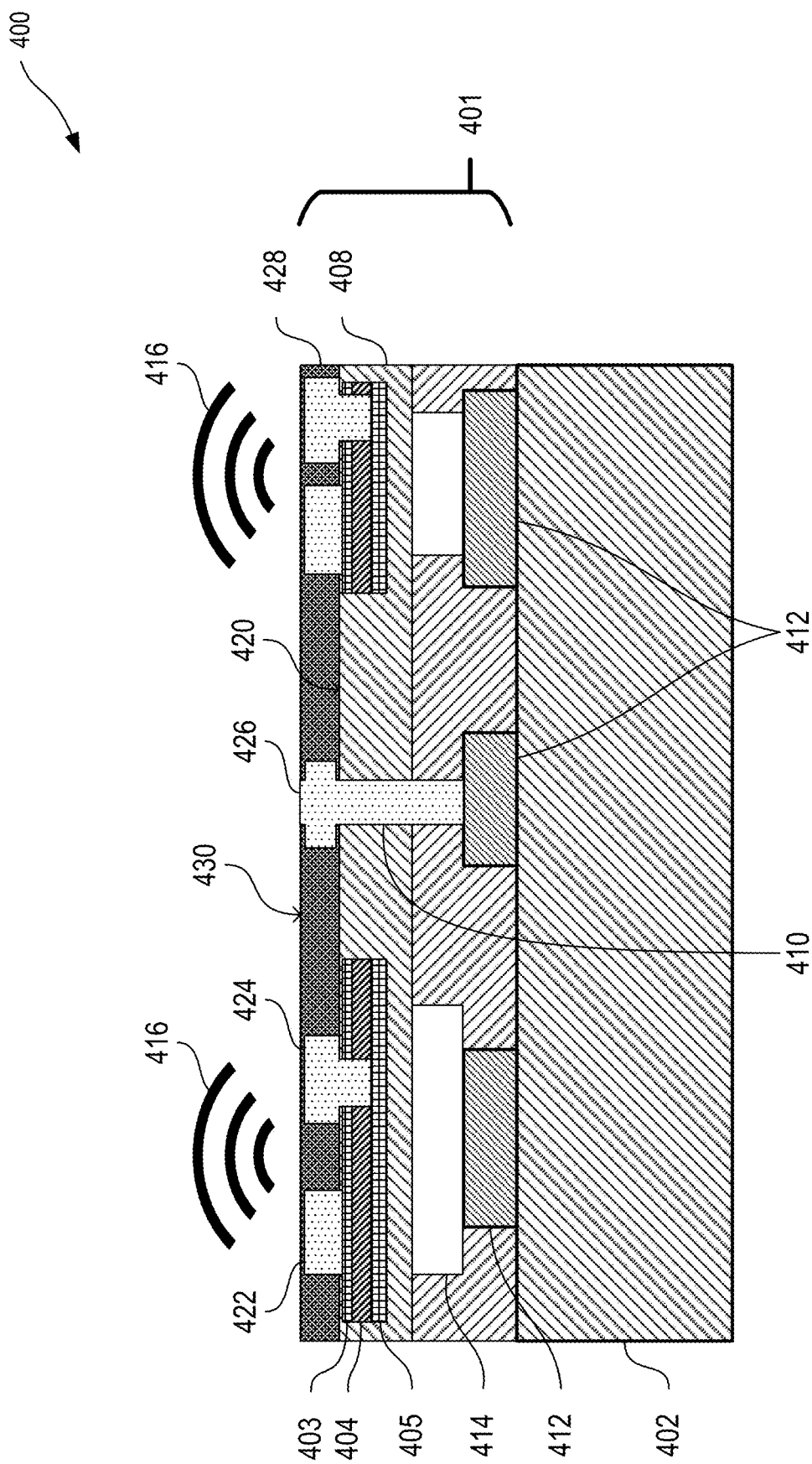
FIG. 4 is a cross-sectional view of two piezoelectric micromachined ultrasonic transducers bonded to a CMOS wafer according to certain aspects of the present disclosure.

FIG. 4 is a cross-sectional view of two piezoelectric micromachined ultrasonic transducers integrated to a CMOS wafer according to certain aspects of the present disclosure. Device 400 shows a cross-sectional view of two PMUTs bonded to a CMOS wafer 402 that can be used in an ultrasound input device. Each PMUT may be formed on a MEMS wafer 401 that is bonded to a CMOS wafer 402. In this way, PMUTs may be coupled to the requisite processing electronics of the CMOS wafer 402. It will be understood that each PMUT may have an active piezoelectric layer 404 along with a first electrode 403 and a second electrode 405. The first electrode 403 and the second electrode 405 can be electrically coupled to the piezoelectric layer 404.

In some embodiments, the PMUTs may include a first contact 422 electrically coupled to the first electrode 403, a second contact 424 electrically coupled to the second electrode 405, and a third electrode 426 electrically coupled to the CMOS wafer 402. Applying alternating voltage through the first electrode 403 and the second electrode 405 can cause movement (e.g., flexural motion) of the piezoelectric layer 404, which can result in generated sound waves. Likewise, received sound waves that induce movement in the piezoelectric layer 404 can be sensed as changing voltages across the first electrode 403 and second electrode 405. One or more vias (vertical interconnect access) 410 may be formed to in the PMUTs. Each of the contacts may be wire bonded to an electronics board. In some embodiments, PMUTs may include a passivation layer 428 formed on a surface 420 and the contacts. The surface 420 or an adhesive coupling surface 430 on the surface of the passivation layer 428 may be coupled to a material layer of an ultrasound input device.

In some embodiments, the passive electrical layer 408 may comprise $SiO_2$ or any other suitable passive layer. The active piezoelectric layer 404 may be approximately 1 µm thick Aluminum Nitride, and the passive elastic layer may be approximately 1 µm thick single-crystal Silicon, although other sizes and materials may be used. In some embodiments, the active piezoelectric layer 404 may be Scandium-doped Aluminum Nitride. Alternatively, the active piezoelectric layer 404 may be another suitable piezoelectric ceramic such as PZT. Both the top and bottom electrodes 406 may comprise Molybdenum. In order to bond the PMUTs to the top metal 412 of CMOS wafer 402, fusion bonding via thru-silicon-via (TSV) as shown at via 410 may be used. This methodology results in significant parasitic reduction which in turn results in improved signal integrity and lower power consumption.

In some embodiments, cavity 414 may be formed with a vacuum or near vacuum to isolate the transducer from the processing electronics in the CMOS wafer 402. The sound generated by the PMUTs will not travel through the near vacuum of cavity 414 minimizing reflection and interference that may be caused by material interfaces with the CMOS wafer 402. The cavity 414 may cause ultrasound 416 to travel away from the PMUTs. Ultrasound 416 may travel through the adhesive coupling surface 430 and into the material layer of the ultrasound input device. The material layer may reflect ultrasound 416 causing a return echo to reflect back to the PMUTs. The return echo travels through the adhesive coupling interface and is received by the PMUTs.

In some embodiments, the CMOS wafer 402 may be an application specific integrated circuit (ASIC) that includes one or more devices necessary to drive the transducer. The drive voltage for an array of PMUTs may be less than 4 volts. In some cases, the drive voltage may be less than 1.8 volts. In some cases, the drive voltage may be at or less than 4, 3.5, 3, 2.5, 2, 1.9, 1.8, 1.7, 1.6, or 1.5 volts. The ASIC can be manufactured to meet size requirements associated with the size of an associated PMUT. In some embodiments, the ASIC may include one or more modules to receive measured signals. The ASIC may be configured to further process the signal. For example, the ASIC may include one or more rectifiers to generate an absolute value signal by taking the absolute value of the received signals, which may be an alternating current. The ASIC may also include an integrator and analog to digital converters (ADCs) to convert the reflected ultrasonic signal to a digital representation of the reflected signal. The integration of ASIC and PMUTs further allows for embedding gain amplifiers and ADC in an ASIC and eliminating the standalone ADC-sensor controller chip. This opens up space on associated circuit boards and reduces touch input sensor implementation cost. In some embodiments, the ASIC may transmit the digital signal to at least one or more of a memory, a processor, and a remote device. In other embodiments, the ASIC may include one or more signal processing modules.

The PMUT arrays can be compatible with CMOS semiconductor processes. In some embodiments, PMUT materials and dimensions can be compliant with Semiconductor Equipment and Materials International (SEMI) standard specifications. Because PMUTs can be compliant with SEMI specifications, the transducer arrays can be used with existing CMOS semiconductor fabrication tools and methods. For example, photolithography may be used to form one or more PMUTs. In contrast, current piezoelectric ultrasound transducer arrays are formed using a die saw that cannot match the precision of photolithography. As a result, PMUTs can be smaller, operate at lower voltages, and have lower parasitics.

C. Integration with Circuit Board

Figure 5:
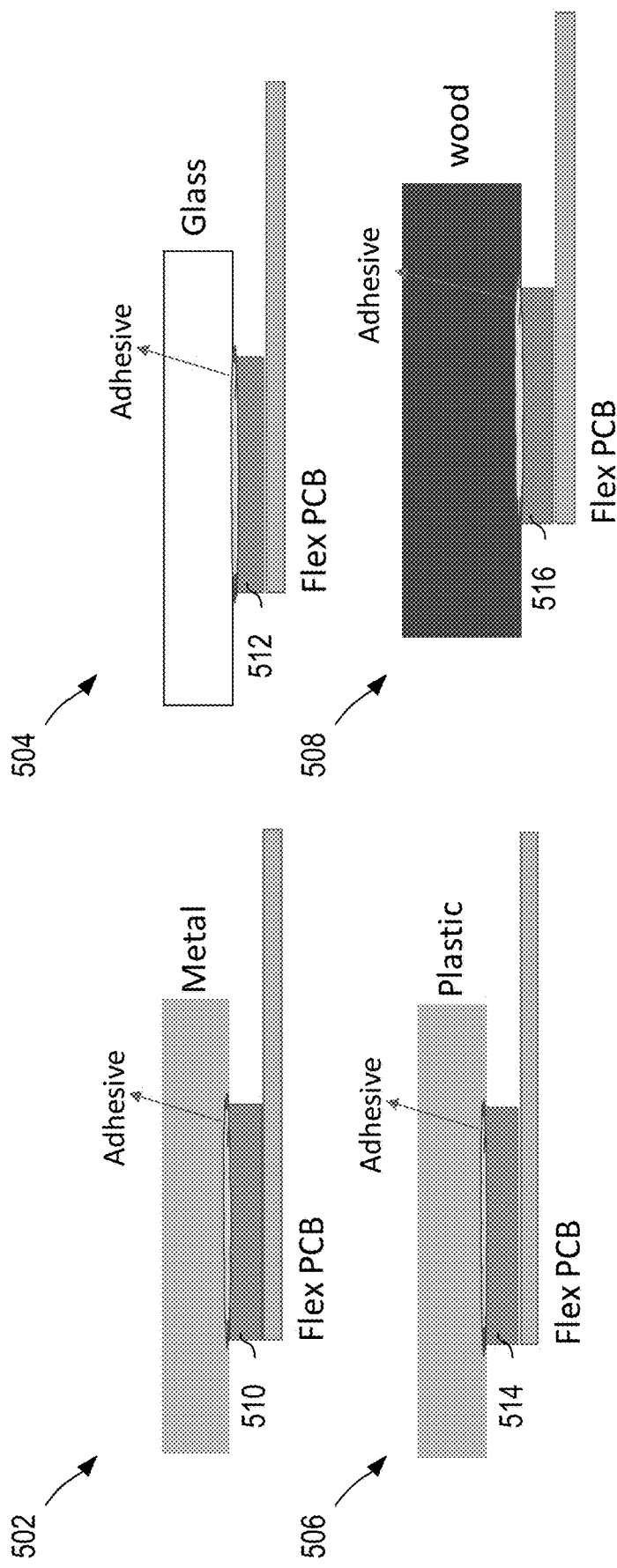
FIG. 5 is a set of schematic diagrams depicting an ultrasound input device coupled to a variety of surfaces according to certain aspects of the present disclosure.

FIG. 5 is a set of schematic diagrams 502, 504, 506, 508 depicting an ultrasound input device 510, 512, 514, 516 coupled to a variety of surfaces according to certain aspects of the present disclosure. Diagram 502 depicts an ultrasound input device 510 coupled to a metal surface via an adhesive. Diagram 504 depicts an ultrasound input device 512 coupled to a glass surface via an adhesive. Diagram 506 depicts an ultrasound input device 514 coupled to a plastic surface via an adhesive. Diagram 508 depicts an ultrasound input device 516 coupled to a wooden surface via an adhesive. Any suitable material can be used as a sensing surface, such as non-porous materials or semi-porous materials. Porous materials may be useable for sensing surfaces, although better results can be achieved with smaller pores, higher density, and more consistent density.

Additionally, an ultrasound input device 510, 512, 514, 516 can be coupled to a flexible PCB, such as on a side opposite where the ultrasound input device 510, 512, 514, 516 is coupled to the sensing surface. The ultrasound input device 510, 512, 514, 516 can act as a mechanical coupler between the sensing surface and the PCB, with the PCB not being elsewhere attached to the sensing surface, although that need not always be the case. In some cases, a flexible PCB can be used.

The use of a PCB can permit additional components to be integrated with the ultrasound input device 510, 512, 514, 516 to extend the functionality of the ultrasound input device 510, 512, 514, 516, such as described with reference to FIG. 6.

Figure 6:
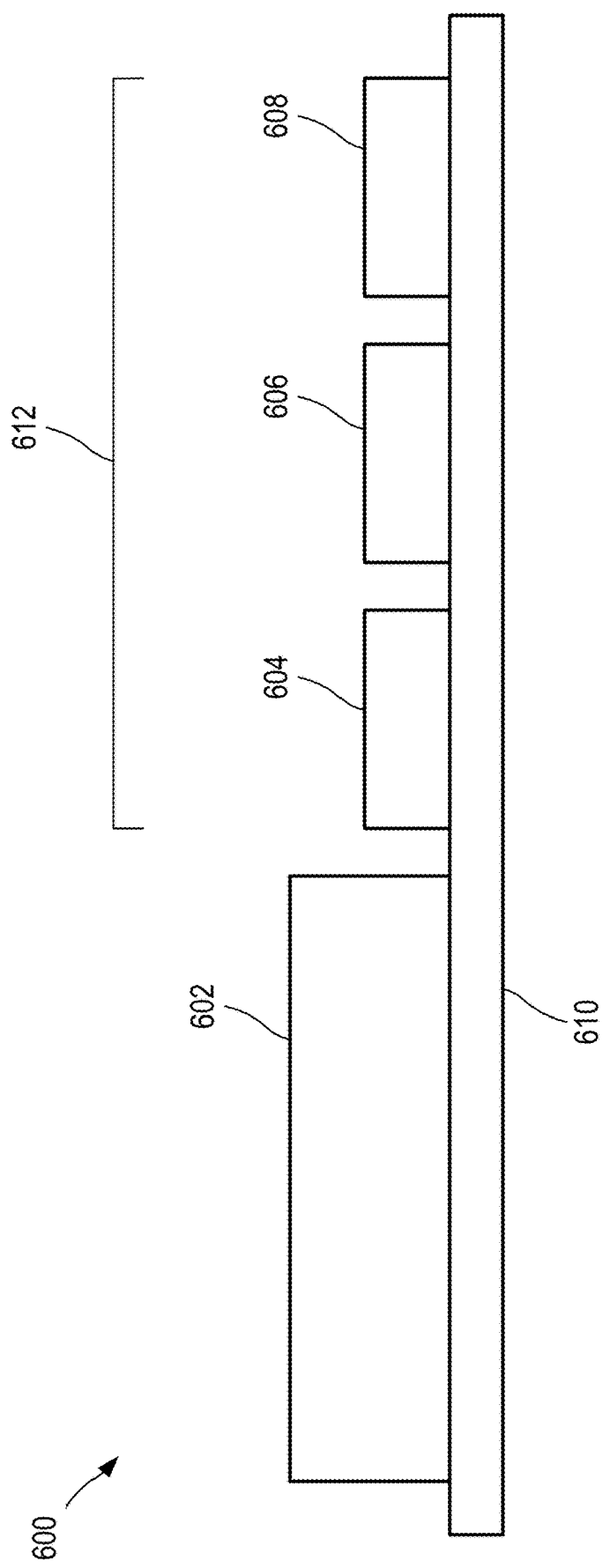
FIG. 6 is a schematic side view diagram depicting an ultrasound input system with shared-board components according to certain aspects of the present disclosure.

FIG. 6 is a schematic side view diagram depicting an ultrasound input system 600 with shared-board components according to certain aspects of the present disclosure. The ultrasound input system 600 can include an ultrasound input device 602 electrically coupled to a circuit board 610, and any number of shared-board components 612. Each shared-board component can be electrically coupled to the circuit board 610. In some cases, the ultrasound input device 602 can be mechanically coupled to the circuit board 610, such as using electrical couplings (e.g., solder points) or other mechanical supports. In some cases, one, some, or all of the shared-board components 612 can be mechanically coupled to the circuit board 610. In some cases, the circuit board can be a printed circuit board, such as a flexible PCB, although that need not always be the case.

The entire ultrasound input system 600 can be contained within a single, shared housing, within multiple housing, or may not be contained within a housing. In some cases, two or more of the shared-board components 612 can be contained within a single housing, with or without the ultrasound input device 602. In some cases, all of the shared-board components 612 can be located on the same side of the circuit board 610 as the ultrasound input device 602, although that need not always be the case. When located on the same side as the ultrasound input device 602, the shared-board components 612 can be selected or designed to have a height that is less than the height of the ultrasound input device 602.

In some cases, an ultrasound input system 600 can comprise a power component 604. The power component 604 can provide power to the ultrasound input device 602 and/or any of the other shared-board components 612. Examples of power components 604 include batteries, transformers (e.g., transformers coupled to a mains line), capacitors (e.g., ultra-capacitors), solar cells, fuel cells, and/or any other suitable source of power.

In some cases, an ultrasound input system 600 can comprise a processor 606. The processor 606 can enable various processing functions to be performed within the ultrasound input system 600 based on signals received from the ultrasound input device 602. Examples of suitable processors 606 include microcontrollers, central processing units, or other suitable devices. The processor 606 can be further coupled to memory to access processing routines, access stored data, and/or store data.

In some cases, an ultrasound input system 600 can comprise a communication component 608. The communication component 608 can interact with the ultrasound input device 602 and/or a processor 606 to send or receive signals to or from an external device. Examples of suitable communication components 608 include wireless radios (e.g., Bluetooth, WiFi, Zigbee, Z-wave, or others), audio devices (e.g., microphones or speakers), visual devices (e.g., cameras, lights, or displays), tactile devices (e.g., haptic feedback devices such as motors and vibrators), or other devices suitable for sending or receiving signals.

In some cases, an ultrasound input system 600 can comprise shared-board components 612 that include a power component 604, a processor 606, and a communication component 608. In some cases, an ultrasound input system 600 can include more or fewer shared-board components, including different types of components.

II. Fully Integrated System on a Chip for Ultrasonic Touch Input

Embodiments of the present disclosure allow for a fully integrated system on a chip for ultrasonic touch input. For example, an integrated ultrasound input device can include an ultrasound sensor and an application specific integrated circuit (ASIC). An integrated ultrasound input device wafer can be created using various production techniques to allow for a low profile size as well as improved resistance to noise and lower power.

A. Integrated Ultrasound Input Device Overview

Figure 7:
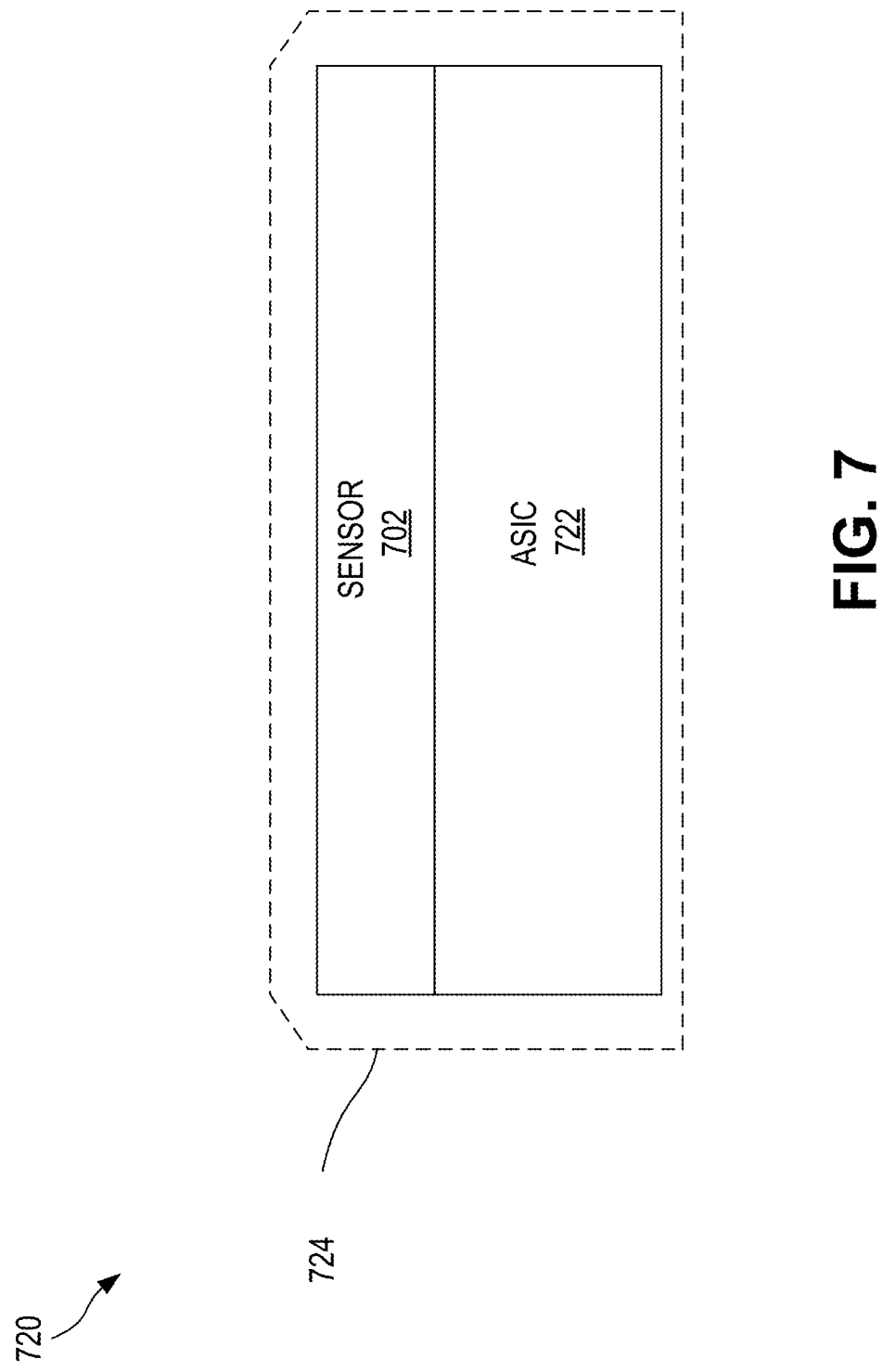
FIG. 7 is a schematic side view diagram depicting an integrated ultrasound input device with an ultrasound sensor and an ASIC according to certain aspects of the present disclosure.

FIG. 7 is a schematic side view diagram depicting an integrated ultrasound input device 720 with an ultrasound sensor 702 and an application specific integrated circuit (ASIC) 722 according to certain aspects of the present disclosure. The ultrasound sensor 702 can be composed of one or more ultrasound transducers disposed in an array. In some cases, the ultrasound transducers are MUTs.

The ASIC 722 can be any suitable circuit designed to enable the driving and receiving of the one or more transducers of the ultrasound sensor 702. The ASIC 722 can drive transducers to send and receive ultrasonic signals to achieve the touch sensing capabilities described herein. In some cases, the ASIC 722 can output measured energy levels associated with the sensor 702, which can later be used to determine if a touch event has occurred. In some cases, the ASIC 722 can output a touch signal that is indicative of occurrence of a touch event. In such cases, the ASIC 722 can perform the necessary processing to determine if a touch event has occurred. In some cases, the ASIC 722 can further perform the necessary processing to determine additional information associated with the touch event, such as whether the touch event was initiated by a bare finger or a gloved finger, whether the touch event was initiated by a first user or second user, or other aspects of the touch event. Such additional information can take the form of inferences and can have varying degrees of confidence, although that need not always be the case. In some case, the ASIC 722 can have the capability to process the signal and identify the type of pattern the user is inputting (e.g., single-tap, double-tap, hold, etc.). Such capability in the ASIC 722 could be enabled by hardware processing blocks or could be written in the chip memory as part of the firmware. In some cases, the ASIC 722 might have the capability to self-calibrate and tune its parameters for signal identification and pattern recognition.

The integrated ultrasound input device 720 can be fully or partially encapsulated within a housing 724, forming a package. The housing 724 can take the form of any suitable material, such as a solidified resin. In some cases, the housing 724 contains solely the sensor 702 and ASIC 722, as well as any electrical contacts necessary to couple the ASIC 722 to an external component. In some cases, the housing 724 can contain additional components, such as additional sensors (e.g., thermal sensor, vibration sensor, or gyroscope). In some cases, the material used for the housing 724 can be selected to perform well as a portion of the stack of the ultrasound input system. For example, a material having maximum energy transmission in the ranges of frequencies associated with the particular ultrasound input device 720 can be used to maximize signal. In some cases, additional materials can be used within the housing 724 or incorporated into the housing 724 itself to achieve a desired response of ultrasound propagation into a stack. For example, a window can be fitted into the housing 724 adjacent the sensor 702 to provide a path for transmission of ultrasonic signals to and from the sensor 702. This window can be made of an optically transparent, translucent, or opaque material, and can be selected to pass ultrasonic signals therethrough with little or no attenuation. Also, materials could be used in the stack to enhance acoustic matching between layers to boost transmit and/or receive signals.

In some cases, a housing 724 can be applied after the sensor 702 and ASIC 722 have been formed into a wafer and cut into individual chips. However, in some cases, a housing 724 can be applied while the sensor 702 and ASIC 722 are still part of a wafer containing numerous chips. Any suitable method of chip packaging can be used to encapsulate the sensor 702 and ASIC 722.

In some cases, other types of processors or circuits can be used in place of ASIC 722. For example, instead of ASIC 722, a general-purpose programmable processor can be used while still achieving many of the benefits associated with an integrated ultrasound input device 720. In some cases, ASIC 722 can receive power as an input, which can be used to power the ASIC 722 itself and to drive the transducers of the sensor 702. In some cases, a general-purpose programmable processor can be used to communicate between multiple chips with or without internal ASIC in form of master and slave.

In some cases, the package of the integrated ultrasound input device 720 can be approximately 500 microns or smaller in height. In some cases, the sensor 702 and ASIC 722 of the integrated ultrasound input device 720 can have a combined height of approximately 150 microns or less.

B. Production Techniques

Figure 8:
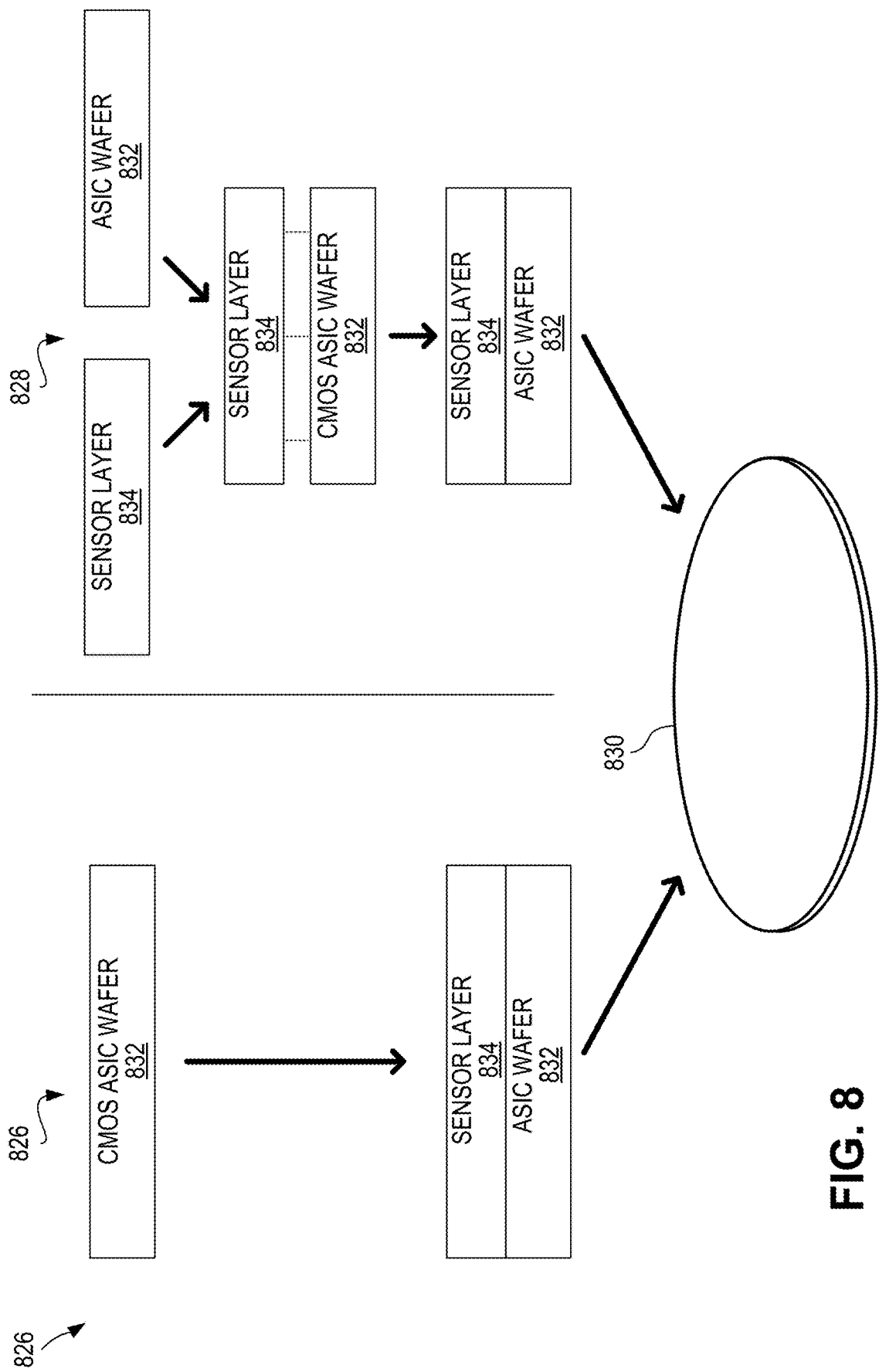
FIG. 8 is a combined set of schematic views depicting two processing routes for generating an integrated ultrasound input device wafer according to certain aspects of the present disclosure.

FIG. 8 is a combined set of schematic views depicting two processing routes 826, 828 for generating an integrated ultrasound input device wafer 830 according to certain aspects of the present disclosure. A first processing route 826 depicts the generation of a wafer 830 using a monolithic technique. A second processing route 828 depicts the generation of a wafer 830 using a wafer bonding technique. Any suitable process can be used to generate a wafer 830 containing a sensor and ASIC as described herein.

Under the first processing route 826, an ASIC wafer 832 is provided and then a sensor layer 834 is created on the ASIC wafer 832, resulting in a monolithic wafer 830 that contains both a sensor and ASIC. This type of wafer-level fabrication can permit generation of a small form factor in an economical fashion.

Under the second processing route 828, a sensor layer 834 is provided and an ASIC wafer is provided 832. The provided sensor layer 834 can then be bonded to the ASIC wafer 832 using any suitable wafer bonding technique, with or without an intermediate layer.

The wafer 830 that results from the first processing route 826, the second processing route 828, or any other suitable processing route can comprise one or more instances of a sensor and ASIC usable to create an integrated ultrasound input device.

Figure 9:
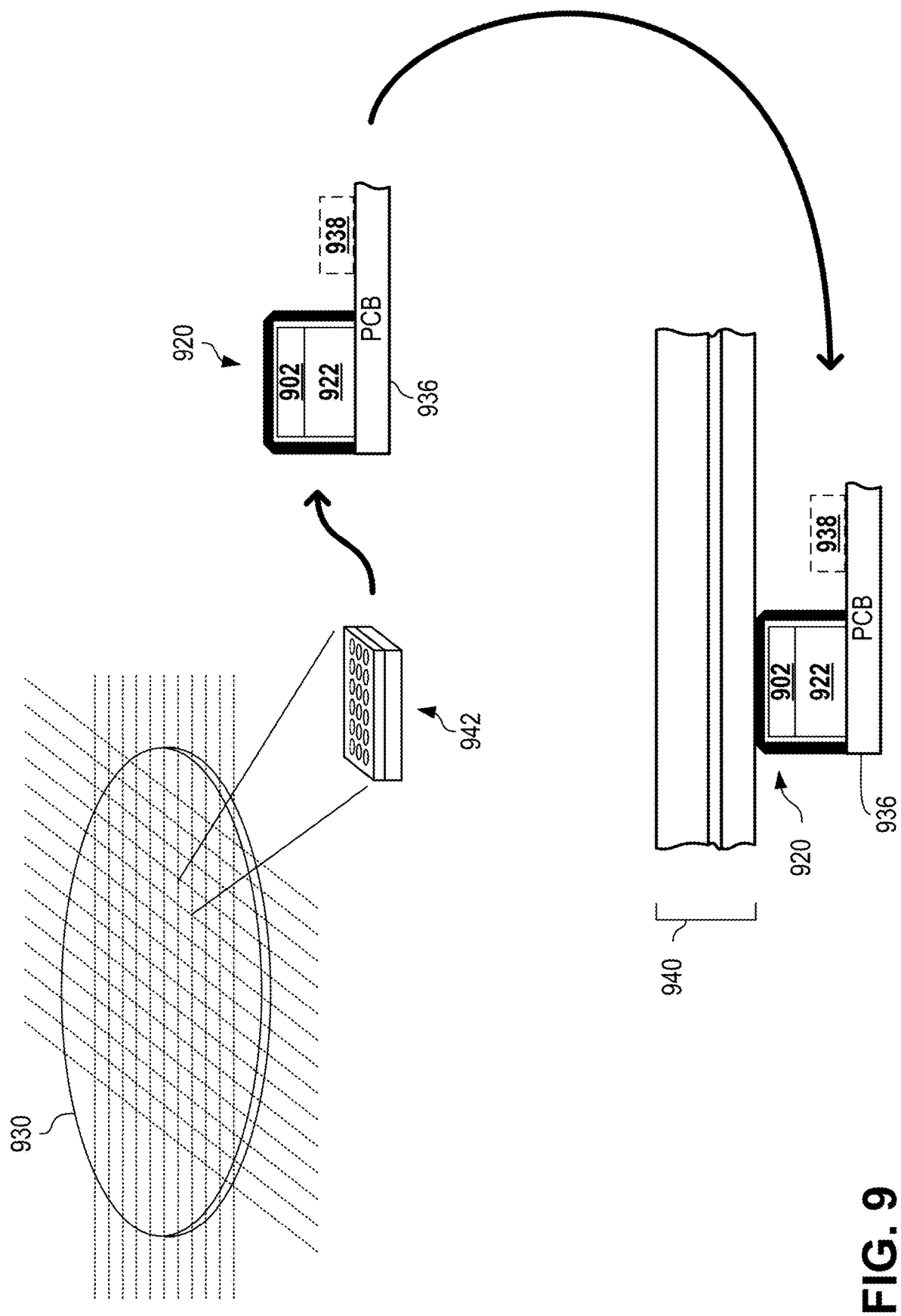
FIG. 9 is a set of schematic views depicting a single integrated ultrasound input device cut from a wafer, PCB-mounted, and stack-mounted according to certain aspects of the present disclosure.

FIG. 9 is a set of schematic views depicting a single integrated ultrasound input device 920 cut from a wafer 930, PCB-mounted, and stack-mounted according to certain aspects of the present disclosure. The wafer 930 can be wafer 830 of FIG. 8. The wafer 930 can be cut or diced into numerous pieces (e.g., dies). Each die 942 can contain a sensor 902 and ASIC 922 for a single integrated ultrasound input device 920. Each die 942 can be packaged in a housing, if the housing was not previously applied to the wafer 930, to result in the integrated ultrasound input device 920.

The ultrasound input device 920 can be mounted on a printed circuit board (PCB) 936 or otherwise electrically coupled to any other necessary electronics. For example, in some cases, an ultrasound input device 920 can be electrically coupled to a battery or other power source. In some cases, an ultrasound input device 920 can be mounted on a PCB 936 that contains other electronic components 938, such as processors and power supplies.

The ultrasound input device 920 can be mounted to a substrate 940. The substrate 940 can be any combination of one or more materials through which ultrasonic signals can pass to the sensor 902. The housing of the ultrasound input device 920 can be coupled to the substrate 940. The combination of materials through which ultrasonic signals pass from the exterior surface of the substrate 940 to the sensor 902, which can include the housing of the ultrasound input device 920, can be known as a stack. The ultrasound input device 920 can be coupled to the substrate 940 using any suitable technique, including using adhesives, mechanical couplings, active pressure, or any other suitable technique for acoustically coupling the ultrasound input device 920 and the substrate 940.

C. Low Profile Size

Figure 10:
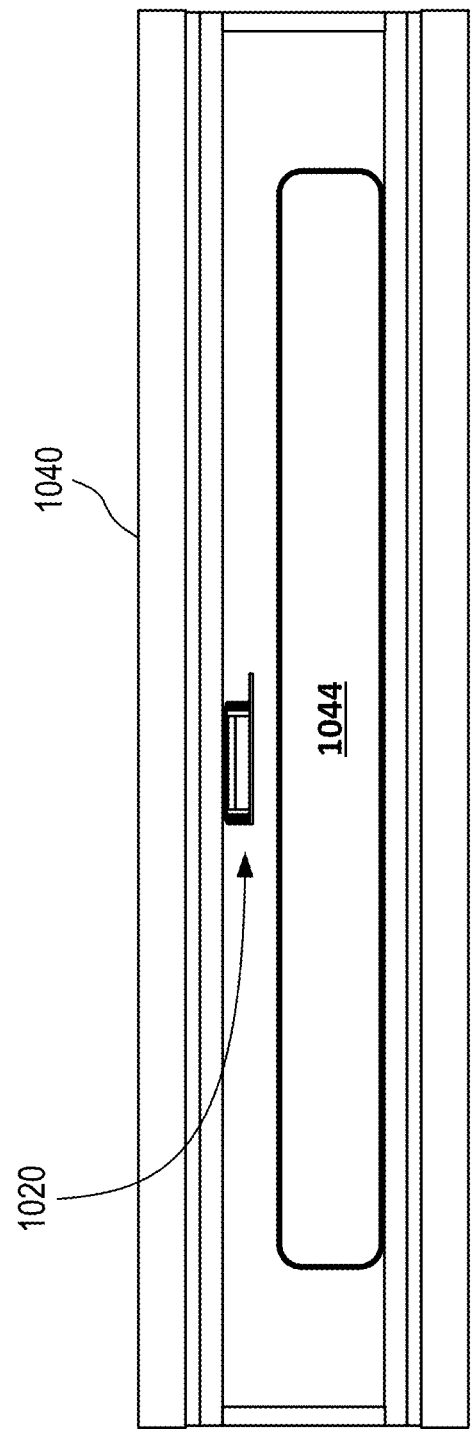
FIG. 10 is a cross-sectional schematic view of a consumer electronic product containing an integrated ultrasound input device according to certain aspects of the present disclosure.

FIG. 10 is a cross-sectional schematic view of a consumer electronic product 1000 containing an integrated ultrasound input device 1020 according to certain aspects of the present disclosure. The consumer electronic product 1000 can be a smartphone or any other suitable device. The integrated ultrasound input device 1020 can be attached to a substrate consisting of one or more layers of a display 1040 or any other part of the consumer electronic device such as the frame or the backside which could be made of metal, plastic, or other materials (1044). The display 1040 can include several layers, including display layers, illumination layers, protective layers, sensing layers, and other suitable layers. Through its coupling with the display 1040, the integrated ultrasound input device 1020 can be used to register touch events associated with the display 1040. In some cases, however, the integrated ultrasound input device 1020 can be coupled to any surface of the consumer electronic product to detect touch events on the opposite side of that surface, such as a back side or side edge of the consumer electronic product.

As described herein, the integrated ultrasound input device 1020 can be formed to have a very small height, such as at or less than 500 microns. Due to the low profile of the integrated ultrasound input device 1020, one or more of such integrated ultrasound input devices can be easily positioned within a consumer electronic product 1000, leaving ample space for other components. For example, the low profile of the integrated ultrasound input device 1020 can occupy only a small amount of the overall height of the consumer electronic product 1000, permitting more space for other components, such as larger batteries 1044 with more capacity, or more open space for airflow. In addition, due to the design and the physics behind the operation of the device as described, the integrated ultrasound input device can be made to operate in a small local region for transmitting and receiving the ultrasound information. Such local operation largely boosts the performance robustness of the device to sources of disturbances, such as touches or holds, induced outside of the operation region.

D. Improved Resistance to Noise and Lower Power

Figure 11:
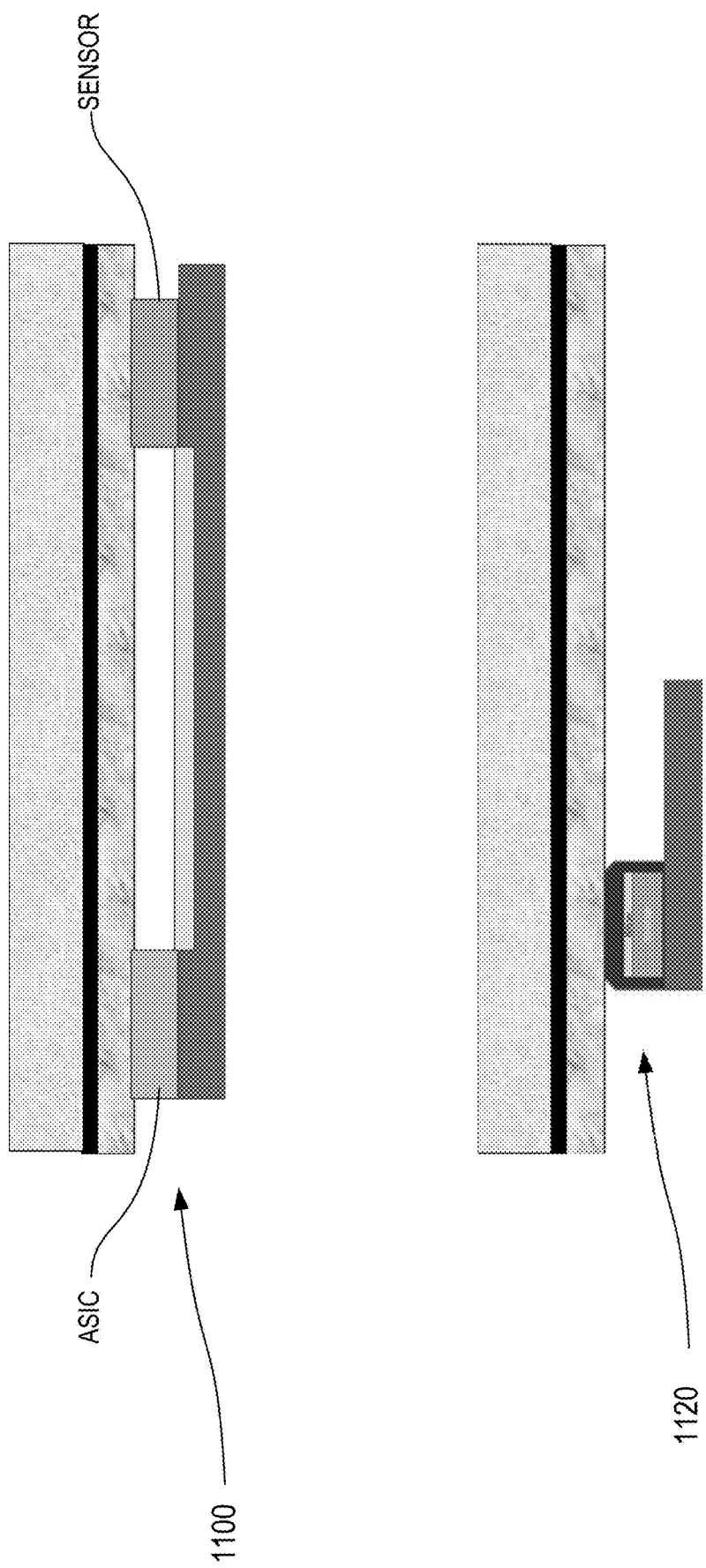
FIG. 11 is a set of cross-sectional schematic diagrams comparing a non-integrated ultrasound input device with an integrated ultrasound input device according to certain aspects of the present disclosure.

FIG. 11 is a set of cross-sectional schematic diagrams comparing a non-integrated ultrasound input device 1100 with an integrated ultrasound input device 1120 according to certain aspects of the present disclosure. The non-integrated ultrasound input device 1100 is much more susceptible to noise due at least in part to the relatively long length of conductor needed to couple the ASIC and sensor. For example, the non-integrated ultrasound input device 1100 can have an exposed electrical trace. Not only is power used to transmit signals along that electrical trace, but the electrical trace can be further susceptible to interference. Therefore, the overall signal to noise ratio for a non-integrated ultrasound input device is relatively low. If a higher signal to noise ratio is desired, the ASIC must provide more power to drive the sensor, in which case the overall system would have relatively higher power consumption.

By contrast, the integrated ultrasound input device 1120 of the present disclosure is an integrated chip packaged in a housing. The integrated ultrasound input device 1120 does not have large exposed traces or conductors between the sensor and the ASIC. Thus, there is little or no risk of interference and little or minimal energy sapped while transmitting signals from the sensor to the ASIC, due at least in part to the minimal conductive traces between the sensor and the ASIC. Therefore, an integrated ultrasound input device 1120 can be capable of operating at improved signal to noise ratios and/or with improved power efficiency than a similar non-integrated ultrasound input device 1100.

III. Ultrasound Sensor Design

Ultrasound input devices can include a plurality of transducers that may be configured, for example, in a sensor array. In some embodiments, the plurality of transducers can allow for the measurement of multiple frequencies. Furthermore, in other embodiments, the plurality of transducers can allow for a separation of transmitting and receiving capabilities. For examples, some transducers can be configured to transmit ultrasound signals, whereas other transducers of the plurality of transducers can be configured to receive ultrasound signals. In yet other embodiments, the plurality of transducers can allow for beamforming.

A. Transducer Array

FIG. 12A is a top view of a sensor array 1202 of an ultrasound input device according to certain aspects of the present disclosure. The sensor array 1202 can comprise one or more transducers 1250 (e.g., a MUT). Generally, a sensor array 1202 can have a plurality of transducers 1250. The sensor array 1202 of FIG. 12A is depicted with 144 different transducers 1250 across the sensor array 1202 that is approximately 1.2 mm square, although other numbers of transducers 1250 and other size arrays can be used. Various electrical traces 1255 in the sensor array 1202 can interconnect the different transducers 1250 to an ASIC. Each transducer 1250 can be individually addressable. In some cases, the use of a transducer 1250 for a particular purpose (e.g., as a transmitter or receiver, or with certain particular frequencies) can be set or changed via the ASIC, thus each transducer 1250 can perform any particular function performed by any other transducer 1250 of the array 1202. However, in some cases, one or more transducers 1250 can be specifically selected or configured to more efficiently or effectively perform a particular function. For example, some transducers 1250 can be designed to achieve improved transmission, whereas other transducers 1250 can be designed to achieve improved reception.

FIG. 12B is a top view of an alternate sensor array 1212 of an ultrasound input device according to certain aspects of the present disclosure. The sensor array 1212 can comprise one or more transducers 1260. The sensor array 1212 depicts a sensor array comprising 36 ultrasonic transducers 1260. Various electric traces in the sensor array 1212 can interconnect the different transducers 1260 to an integrated circuit layer. One or more of the transducers 1260 of the sensor array 1212 may be transmitting ultrasonic transducers. One or more transducers of the transducers 1260 of the sensor array 1212 may be receiving ultrasonic transducers. The transducers 1260 of the sensor array 1212 can transmit and receive at any suitable frequencies, as described herein. The relative sizes of the transducers 1260 can indicate the frequency capable of being emitted/received by the transducer.

Various electrical traces (not shown) in the sensor array 1212 can interconnect the different transducers 1260 to an integrated circuit. The various electrical traces can interconnect the different transducers 1260 in any suitable manner. For example, the electrical traces may connect the transducers 1260 in a horizontal and vertical grid. As another example, the electrical traces may connect the transducers 1260 that are located diagonal from one another.

FIG. 13A is a schematic diagram of the sensor array 1202 of FIG. 12A depicting one example configuration of the various transducers of the array 1202 according to certain aspects of the present disclosure. In this example configuration, out of the 144 different transducers, 60 are set up to operate as low frequency transmitters, 8 are set up to operates as low frequency receivers, 56 are set up to operate as high frequency transmitters, and 20 are set up to operate as high frequency receivers, in a sensor array 1302. The configuration depicted in FIG. 13A can be especially useful for sensing touch events using multiple ultrasonic frequencies to, for example, identify environmental variations versus real touch events betters and/or to improve the operation frequency bandwidth of the device so that the device is more responsive across a broader range of frequencies.

FIG. 13A further illustrates the sensor array 1302 including four corner regions. A corner region of the sensor array 1302 can include a plurality of transducers. For example, the sensor array 1302 includes four rotationally symmetric corner regions comprising mainly (e.g., a majority) low frequency transmitting ultrasonic transducers, which can surround low frequency receiving ultrasonic transducers. The corner region of the sensor array 1302 includes 16 ultrasonic transducers in a 4×4 array. However, it is understood that the corner region of the sensor array 1302 can include up to one fourth of the total number of ultrasonic transducers included in the sensor array 1302. For example, a square sensor array comprising 81 transducers can include four corner regions. Each of the four corner regions can include a 1×1, 2×2, 3×3, or 4×4 grid of transducers. In some cases, the sensor array 1302 can include high frequency transmitting ultrasonic transducers surrounding the low frequency transmitting ultrasonic transducers, e.g., as shown. In some implementations, the high frequency transmitting ultrasonic transducers may not be on a diagonal from the corner regions, and instead a high frequency receiving ultrasonic transducer may exist, e.g., as is shown in FIG. 13A. Further, a center region can include mainly low frequency transmitting ultrasonic transducers. The center region can be surrounded by high frequency transmitting ultrasonic transducers. In some cases, the center region can include transmitting ultrasonic transducers. In other cases, the center region can include receiving ultrasonic transducers. The center region of a sensor array can be of any suitable size, for example, 1×1, 2×2, 3×3, 4×4, 5×5, 6×6, 7×7, etc.

In some cases, a sensor array 1202 can have any number of transducers operating across any number of different frequencies. While the example configuration of FIG. 12A can be useful in some cases, other configurations can be used. In some cases, a single type of sensor array 1202 can be manufactured in bulk and used with ASICs that are of the same or different types. For example, different types of ASICs can be set up to operate the same sensor array 1202 under different configurations (e.g., with more or fewer transmitters or receivers, different frequencies, or more or fewer numbers of different frequencies). In some cases, the same type of ASIC can also be programmed to run under different configurations. In some cases, an integrated version of the transducer and/or ASIC can be used in conjunction with a non-integrated transducer and/or ASIC to achieve a certain purpose, such as to boost the transmission power.

The sensor arrays depicted in FIG. 12A and in FIG. 13A can include one or more piezoelectric micromachined ultrasonic transducers, one or more capacitive micromachined ultrasonic transducers, one or more integrated bulk piezoelectric transducers, or one or more non-integrated bulk piezoelectric transducers. In some cases, the sensor array can include any suitable combination of the aforementioned transducers. Further, the sensor array can be of any suitable size. For example, the sensor array can include a 2×2, 3×3, 5×5, 9×9, 16×16, etc. array of ultrasonic transducers. For example, the sensor array 1212 depicts a sensor array of 6 ultrasonic transducers by 6 ultrasonic transducers.

FIG. 13B is a schematic diagram of a sensor array depicting eight example configurations of the various transducers of a corner region of the sensor array according to certain aspects of the present disclosure. The sensor arrays depicted in FIG. 13B are 12×12 transducers in size, and the corner regions are 4×4 transducers in size, however, it is understood that embodiments can include sensor arrays and corner regions of any suitable size.

Each of the corner regions of the sensor arrays 1310-1324 can include transmitting ultrasonic transducers 1326 and receiving ultrasonic transducers 1325. The transmitting ultrasonic transducers and the receiving ultrasonic transducers can be arranged as shown in the sensor arrays 1310-1324. Thus, in various combination, the receiving transducers can be diagonal to each other, where the diagonals can be in various locations and of various length. The receiving transducers can be in blocks (e.g., 2×2) in various locations, as well as other shapes, including of odd number of receiving transducers.

The transmitting ultrasonic transducers in, for example, the sensor array 1310 can each transmit at the same frequency. Similarly, the receiving ultrasonic transducers in the sensor array 1310 can each receive the same frequency, which may be the same frequency transmitted from the transmitting ultrasonic transducers. The corner regions do not all have to be the same and can occur in various combination, e.g., a combination can have one type selected from 1310, 1312, 1314, and 1316. The interior regions can have various combination shown in FIG. 13C.

FIG. 13C is a schematic diagram of a sensor array depicting eight example configurations of the various transducers of the sensor array according to certain aspects of the present disclosure. The sensor arrays depicted in FIG. 13C depict transducers that are interior to the corner regions of the sensor array. An interior region can include transducers that are between at least two corner regions. The transducers shown in the sensor array can include transmitting ultrasonic transducers 1346 and receiving ultrasonic transducers 1345. The transmitting ultrasonic transducers and the receiving ultrasonic transducers can be arranged as shown in the sensor arrays 1330-1344. Any of the arrangement in FIG. 13C can be used with any of the corner arrangements in FIG. 13B.

As depicted, a majority can be transmission transducers although they can be in the minority. The receiving transducers may touch each other to form a ring, e.g., as in sensor arrays 1330-1338. As an alternative, the receiving transducers may form disjoint groups, as in sensor arrays 1340-1344. In such disjoint groups, there may be an even or odd number of receiving transducers. Such groups can all be the same or can vary.

FIG. 13D is a schematic diagram of a sensor array depicting eight example configurations of the various transducers of the sensor array according to certain aspects of the present disclosure. The sensor arrays depicted in FIG. 13D depict sensor arrays comprising differing numbers of ultrasonic transducers. For example, the sensor array 1350 includes 36 transducers, whereas the sensor array 1360 includes 64 transducers. Transmitting ultrasonic transducers 1348 and receiving ultrasonic transducers 1347 can be arranged as shown in the sensor arrays 1350-1364.

FIG. 13E is a schematic diagram of a sensor array depicting two example configurations of the various transducers of the sensor array according to certain aspects of the present disclosure. FIG. 13E illustrates two example sensor arrays that are 12×12 ultrasonic transducers in size. For example, the sensor array 1365 and the sensor array 1366 both include 144 transducers. Transmitting ultrasonic transducers 1392 and receiving ultrasonic transducers 1391 can be arranged as shown in the sensor arrays 1365-1366. In some implementations, the center region of the sensor arrays 1365-1366 may not include ultrasonic transducers. The sensor array 1365 can then, for example, comprise 128 ultrasonic transducers. However, it is understood that the center region can be larger or smaller than the size 16 transducers in a square. In some implementations, ultrasonic transducers can form a ring around a center region that does not include ultrasonic transducers. The center region of the sensor array that does not include ultrasonic sensors can be included for routing space.

In some cases, ultrasonic transducers in a sensor array may be in groups. For example, the sensor array 1365 can include 8 groups of ultrasonic transducers, where each group can include 16 ultrasonic transducers included in a square shape. The center region of the sensor array 1365 does not include a group of ultrasonic transducers. Each group of ultrasonic transducers can be disjointed from one. For example, there may be a gap between two or more groups of ultrasonic transducers. The groups can be disjointed horizontally, vertically, diagonally, etc.

FIG. 13F is a schematic diagram of a sensor array depicting example configurations of the various transducers of the sensor array of various sizes according to certain aspects of the present disclosure. FIG. 13F illustrates ten example sensor arrays that are vary in size. For example, the sensor array 1367 includes 16 ultrasonic transducers, the sensor array 1368 includes 25 ultrasonic transducers, the sensor array 1369 includes 36 ultrasonic transducers, the sensor array 1370 includes 49 ultrasonic transducers, the sensor array 1371 includes 64 ultrasonic transducers, the sensor array 1372 includes 81 ultrasonic transducers, the sensor array 1373 includes 100 ultrasonic transducers, the sensor array 1374 includes 121 ultrasonic transducers, the sensor array 1375 includes 144 ultrasonic transducers, and the sensor array 1376 includes 169 ultrasonic transducers. Transmitting ultrasonic transducers 1394 and receiving ultrasonic transducers 1393 can be arranged as shown in the sensor arrays 1367-1376. However, it is understood that the configuration of the transmitting ultrasonic transducers 1394 and the receiving ultrasonic transducers 1393 can be of any suitable arrangement as described herein.

FIG. 13G is a schematic diagram of a sensor array depicting twelve example configurations of the various transducers of the sensor array of a size of 9×9 transducers according to certain aspects of the present disclosure. For example, the sensor arrays 1377-1388 include 81 transducers. Transmitting ultrasonic transducers 1396 and receiving ultrasonic transducers 1395 can be arranged as shown in the sensor arrays 1377-1388.

In some implementations, a sensor array can include any suitable combination of sensor array characteristics (e.g., regions, groups, arrangements, etc.) described herein and described in reference to FIGS. 12A-12B and 13A-13G. For example, a sensory array can include corner regions as depicted in the sensor array 1320 of FIG. 13B as well as interior and center regions as depicted in the sensor array 1372 of FIG. 13F. The arrangement of ultrasonic transducers in a sensor array can be based on an application of the sensor array, a frequency of operation, size limitations, power constraints, etc.

Embodiments provide for a number of advantages. For example, depending on sensor area (physical size) limitations and power constraints, different array sizes can be implemented. The total array size, the configuration of transmitting and receiving ultrasonic transducers (e.g., pMUTs), and the size of ultrasonic transducer determines the transmitting and receiving acoustic aperture and beam shape. The transmitting and receiving acoustic aperture and beam shape can be altered using at least the aforementioned characteristics for which different stack thicknesses and materials, as well as other applications, could be selected to yield the optimum performance given the constraints (e.g., size, power, sampling frequency, supply voltage, process breakdown voltage, and etc.).

B. Multi-Frequency Measurement

FIG. 14 is a set of charts 1402, 1404, 1406 depicting energy measurements from transducers of a single sensor array operating in different frequencies according to certain aspects of the present disclosure. The charts 1402, 1404, 1406 show energy measurements over time for a pair of touch events. Chart 1402 depicts the energy measurements for transducers operating at 100 kHz, chart 1404 depicts the energy measurements for transducers operating at 1 MHz, and chart 1406 depicts the energy measurements for transducers operating at 10 MHz. It is apparent that the measurements taken at these different frequencies have different energy traces, especially with respect to temperature drift.

Since a drop in energy measurement associated with an ultrasonic transducer receiving reflected ultrasound signals is used as a factor in identifying a touch event, it can be desirable to find techniques to reduce any false touch events. As depicted in FIG. 14, the energy measurements across the different frequencies react differently with respect to temperature changes (e.g., the temperature changes that occur when heat passes from a finger to a substrate or from a substrate to air, or other such temperature changes). Therefore, instead of simply relying on identifying a drop in energy measurement to infer a touch event, an ultrasound touch input system can use energy measurements across multiple frequencies or other types of operation procedures, such as different ultrasound beam shapes, number of pulses, and the like to confirm or reject an inference of a touch event. For example, a perceived drop in energy in chart 1402 may not register as a touch event because no concurrent drop in energy is identified in charts 1404 or 1406. However, once all three charts 1402, 1404, 1406 register concurrent drops in energy, there can be an assumption that a touch event has occurred.

FIG. 15 is a chart 1500 depicting temperature behavior of an ultrasonic transducer with respect to operating frequency according to certain aspects of the present disclosure. The chart 1500 contains four lines, each associated with either an air signal or target signal at either a first or second frequency. An air signal can refer to the energy measured when there is no touch event, whereas a target signal can refer to the energy measured when a touch event is occurring. The first and second frequencies can be any suitable, different frequencies. The chart 1500 shows that for all signals, as the temperature increase, the overall signal strength diminishes. The chart 1500 also shows that the behavior of each frequency with respect to temperature differs, which can thus be leveraged to help identify if a touch event has occurred (e.g., identify whether a change in energy measurement is associated with a touch event or just temperature drift).

In an example, first and second measurements can be taken by transducers operating at a first frequency, resulting in the measurements at point 1510 and line 1512. At this time, it can be unclear if the measurements at line 1512 is associated with a touch event (e.g., a move from point 1510 to point 1514) or a temperature change (e.g., a move from point 1510 to point 1516). First and second measurements can also be taken of transducers operating at a second frequency, resulting in the measurements at point 1518 and either line 1520 or line 1522. If the second measurement at the second frequency falls on line 1520, it can be inferred that the drop in energy is associated with the temperature change from point 1518 to point 1526, and therefore not likely associated with a touch event. However, if the second measurement at the second frequency falls on line 1522, it can be inferred that the drop in energy is associated with a touch event, as the energy drops from point 1518 to point 1524. The measurements taken at first and second frequencies can be taken simultaneously, sequentially, or otherwise in close time proximity to one another (e.g., within ones, tens, or hundreds of milliseconds of one another). Thus, by comparing the change in energy measurement over a period of time across multiple frequencies, a determination can be made as to whether or not a touch event has occurred.

While chart 1500 has been described with reference to frequency-dependent energy changes due to changes in temperature, such a technique can be used to identify and leverage frequency-dependent energy changes due to changes in other environmental conditions, such as humidity.

FIG. 16 is a chart 1600 depicting frequency response with respect to stack makeup according to certain aspects of the present disclosure. The chart 1600 shows three lines, each of which correlate to different stacks. Each of the different stacks can be comprised of different materials or different combinations of materials. Due to the inherent differences in each stack, each stack may have a unique response curve associated with the transmission frequency used by the ultrasonic input device. The response curve can be a measure of energy, received signal peak, or any other figure of merit. As depicted in FIG. 16, the frequency that provides the highest response for stack/cover 1 is higher than the frequency that provides the highest response for stack/cover 2, which is itself higher than the frequency that provides the highest response for stack/cover 3.

Thus, a particular frequency and stack material can be matched to provide optimal results. For example, given a known set of frequencies, the material of which the housing of the integrated ultrasound input device is made can be selected to retain the highest possible energy measurements of reflected ultrasonic signals from an initial transmission by the ultrasound input device. As another example, given a known stack or known material (e.g., a particular display from a consumer product manufacturer or a particular type of wood), the ultrasound input device can be set up to operate on frequencies that provide the highest possible energy measurements. In some cases, an ultrasound input device can automatically detect the best frequencies to use based on measuring multiple frequencies in close time proximity to one another.

C. Separated Transmitting and Receiving

FIG. 17 is a schematic diagram depicting a circuit 1700 for receiving and transmitting a signal through an ultrasonic transducer, with the circuit in a transmitting state. The circuit 1700 drives an ultrasonic transducer to both transmit and receive signals, and thus requires high-voltage switching circuitry to separate the high-voltage transmitter from the low-voltage receiver. When transmitting, the high-voltage switch permits the high-voltage transmitter circuitry to drive the transducer, while isolating the low-voltage receiver. To move to a receiving state, the switch must isolate the high-voltage transmitter circuitry and couple the transducer to the low-voltage receiving circuitry.

FIG. 18 is a schematic diagram depicting the circuit 1700 of FIG. 17 for receiving and transmitting a signal through an ultrasonic transducer, with the circuit in a receiving state. When in the receiving state, the high-voltage switch isolates the high-voltage transmitter circuitry and couples the transducer to the low-voltage receiving circuity. However, the high-voltage switch often has large capacitances that inherently attenuate the signal received at the transducer as it is conducted to the low-voltage receiver. Thus, an incoming voltage of 0.37 millivolts (370 microvolts) can be attenuated to less than 2 microvolts, as an example. This parasitic effect can drastically reduce the available signal, thus decreasing the overall signal to noise ratio.

FIG. 19 is a schematic diagram depicting segregated circuits 1900, 1902 for receiving and transmitting signals through ultrasonic transducers according to certain aspects of the present disclosure. Unlike the circuit 1700 of FIGS. 17-18, the circuits 1900, 1902 of FIG. 19 eliminate the need for a high-voltage switch. Thus, the circuits 1900, 1902 can provide efficient driving of a transducer set up to be a transmitting transducer, while also providing efficient receiving by a transducer set up to be a receiving transducer. Circuit 1900 contains a high-voltage transmitter circuit that directly drives a transducer set up to be a transmitting transducer. Circuit 1902 contains a low-voltage receiver circuit that directly receives signal from a transducer set up to be a receiving transducer.

By separating transmission and receiving transducers, the signal integrity can be improved, the size can be decreased, and the overall cost can be decreased. For example, signal integrity can be improved, and power consumption can be improved by reducing or eliminating the parasitic effect from electrical components (e.g., high-voltage switches) inline between a transducer and its low-voltage receiver circuitry. Overall chip size can also be reduced, because high-voltage devices (e.g., high-voltage switches) tend to be larger in size. Thus, by eliminating these switches, as well as optionally eliminating some of the high-voltage transmitter circuits, the overall chip size and cost can be reduced.

D. Beamforming

FIG. 20 is a set of side view schematic diagrams 2000, 2002, 2004, 2006 depicting beamforming achieved through the use of ultrasonic transducers according to certain aspects of the present disclosure.

Diagram 2000 depicts the beam pattern of a single ultrasonic transducer, such as a standard piezoelectric transducer. The beam is broad and fixed by the sensor size and sensor topology. There is no ability to adjust the beam for the transducer of diagram 2000.

Diagram 2002 depicts a focused beam achieved by activating a particular set of transducers. Using beamforming techniques, the activated transducers can focus a beam to a particular distance, which can improve the pressure sensitivity and accuracy of the ultrasound sensor. For example, a focused beam can be used to provide fine point accuracy of touch events, as well as fine point accuracy for detecting other information associated with a touch event, such as the ridges and valleys of a user's fingerprint.

Diagram 2004 depicts a wide beam achieved by activating a particular set of transducers. Using beamforming techniques, the activated transducers can focus a beam to a close distance, permitting the beam to come to a point and spread out again before reaching a target distance. Such a wide beam can improve overall coverage of the sensor and can be used to obtain more of an average measurement over a greater area. This wide beam can be used to decrease the target location sensitivity, which can be advantageous in situations where a degree of variability is expected or desirable, such as providing large touch-sensitive areas and/or extra touch-sensitive areas on or around buttons.

As depicted in diagrams 2004 and 2006, the beam can be adjusted as needed and a tradeoff can be made between more focused transmission pressure on the target and a larger effective area with less target sensitivity.

Diagram 2006 depicts a multi-receiver configuration of activated transducers. In this configuration, a set of transmitting transducers can send out ultrasound signals that can be reflected and received at two or more sets of receiving transducers. For example, a first set of receiving transducers (e.g., one or more transducers) can be positioned to receive ultrasound signals that have been reflected within a first zone, and a second set of receiving transducers can be positioned to receive ultrasound signals that have been reflected within a second zone. As depicted in diagram 2006, the first zone can be smaller and enclosed within the second zone.

By performing beamforming using an array of ultrasonic transducers, energy can be confined to particular regions of interest, and thus the ultrasonic transducer can be less sensitive to regions outside the region of interest.

For example, in some embodiments, a touch device can generate one or more additional driving signals in the application specific integrated circuit. The touch device can then drive one or more additional transmitting ultrasonic transducers using the one or more additional driving signals to generate one or more additional emitted ultrasound signals.

The one or more additional emitted ultrasound signals and the emitted ultrasound signal can be designed to interact to achieve a desired pattern of constructive interference to facilitate beamforming. The set of reflections signals can comprise one or more ultrasound signals associated with the emitted ultrasound signal and the one or more additional emitted ultrasound signals.

In other embodiments, the receiving ultrasonic transducer can be surrounded by the transmitting ultrasonic transducer and the at least one additional transmitting ultrasonic transducers. The desired pattern of constructive interference can be adjustable to change a surface area of a sensitive region on the exterior surface of the material layer that is responsive to touch.

IV. Micromachined Ultrasonic Transducers for Touch Input

In some cases, an ultrasound input device can comprise an ultrasound sensor that comprises a micromachined ultrasonic transducer (MUT), such as a piezoelectric micromachined ultrasonic transducer (pMUT) or capacitive micromachined ultrasonic transducer (cMUT). Other types of transducers in addition to pMUT and cMUT can include bulk piezoelectric transducers both integrated (i.e., fabricated directly on CMOS) and non-integrated (i.e., fabricated separately and then assembled with a CMOS chip on a board or directly communicating with a microprocessor/microcontroller or field-programmable gate array (FPGA) or any hardware with inter-integrated circuit (I2C) or serial peripheral interface (SPI) communication capability). Micromachined ultrasonic transducers for touch input, as described herein, can allow for improved energy sensing regions. Further, MUTs can also decrease the overall power consumption of an ultrasound input device.

A. Improved Energy Sensing Region

FIG. 21 is a set of charts 2102, 2104 depicting modes of operation of micromachined ultrasonic transducers according to certain aspects of the present disclosure as compared to standard bulk transducers, depicted as average displacement for different frequencies. The charts 2102, 2104 contain lines depicting average displacement over a frequency range of 0.5 MHz to 5 MHz, and inset axisymmetric cross-sectional visualizations of the transducer's mode shapes.

Chart 2102 depicts modes of operation for a standard bulk transducer (e.g., standard piezoelectric transducer) operating from 0.5 MHz through 5 MHz. The number of peaks in average displacement and overall extent of each of these peaks over the course of this relatively small frequency range is evident of the various combinations of bulk mode, shear mode, flexural mode, surface acoustic mode, and other modes undergone by a bulk transducer. As a result, shear waves and surface acoustic waves in different directions can be generated in addition to the normal longitudinal waves of interest. Thus, sensors that make use of such bulk transducers can have uncontrollable beam patters, detrimental crosstalk, more multipath reflections from different angles from different modes, spurious modes and notches in the frequency spectrum, less clean received signal, more energy wasted on unwanted modes, and other such problems.

By contrast, chart 2104 depicts the uniform and predictable flexural mode shape present in MUTs (e.g., pMUTs) over the same frequency span and used to launch longitudinal acoustic waves in the normal direction towards the exterior surface of stack. As a result, the MUT is capable of achieving much improved performance over a standard bulk transducer.

Because of the nature of an ultrasound input device, it is desirable to detect ultrasound reflections based on longitudinal acoustic waves (e.g., propagating in a direction normal to the sensor). MUTs, when used as an ultrasonic transducer for touch input, perform exceptional well due to their inherent ability to perform flexural mode displacement to generate such longitudinal acoustic waves without inadvertently generating much, if any, lateral or otherwise undesirable waves. Thus, MUTs can be used in beamforming operations, such as those described herein, can be closely packed into sensor arrays, can be used with less filtering equipment, and can obtain higher signal to noise ratios using the same or less power than if standard bulk piezoelectric transducers were used.

FIG. 22 is a set of side view schematic diagrams 2202, 2204, 2206 depicting modes of operation of standard bulk transducers used for ultrasound touch detection. When a standard bulk transducer is used for ultrasound touch detection, driving the transducer to transmit signals can result in the transducer displacing in multiple modes of operation, which can cause errant signals to be transmitted into a receiving medium (e.g., a stack).

Diagram 2202 depicts a longitudinal mode of operation in which the driving of the transducer initiates longitudinal signals in a direction normal to the sensor. However, the same or similar driving of the transducer in diagram 2202 can cause lateral displacement as depicted in diagram 2204. This lateral displacement (e.g., due to the lateral mode of operation) can initiate lateral signals that are carried into the receiving medium in a direction other than normal to the sensor or could result in undesirable, normally-travelling shear waves. As a result, driving a bulk transducer can generate signals as depicted in diagram 2206, with both normal and non-normal signals propagating from the bulk transducer. Since the sensing region (e.g., the region desired for sensing) is generally directly above the stack, the non-normal signals can cause interference with the signal being received from the sensing region. Additionally, bulk transducers can be susceptible to the physical topology of the region of the stack near the sensing region, since differing topologies can initiate different reflections to non-normal signals, which can result in false positives or false negatives.

FIG. 23 is a set of side view schematic diagrams 2302, 2304 depicting lateral signal rejection of micromachined ultrasonic transducers according to certain aspects of the present disclosure. Diagram 2302 is a close-up view of a single transducer of a MUT array. The transducer can consist of several layers, including a piezoelectric layer, which, when energized, can initiate flexural displacement, causing a longitudinal wave to emit in a direction normal to the sensor (e.g., a direction normal to the surface of the MUT).

In some embodiments, a transmitting ultrasonic transducer can generate an emitted ultrasound signal in response to a driving signal. Transmitting the emitted ultrasound signal can include transmitting the emitted ultrasound signal through a material layer in a longitudinal direction that is normal to an exterior surface of the material layer or is within 20% of normal to the exterior surface of the material layer. In other embodiments, the emitted ultrasound signal can be transmitted though the material layer in a longitudinal direction that is within 2%, 5%, 10%, 15%, 20%, 25%, 30%, 35%, etc. of normal to the exterior surface of the material layer.

Diagram 2304 depicts an ultrasound input device using a sensor having MUTs. The ultrasound input device is depicted as being coupled to an aluminum layer and a glass layer, although any other stack configuration can be used. The nature of the MUTs can permit ultrasound signals to be emitted in a direction normal to the sensor, while minimizing or eliminating any signals that would have otherwise propagated in a direction not-normal or substantially not-normal to the sensor had a bulk transducer been used. Thus, the use of MUTs as transducers in an ultrasound input device can help focus the energy into a desired sensing region and reduce susceptibility to false positives or false negatives due to errant reflections.

B. Ease of Driving

In addition to the aforementioned benefits of MUTs when used with ultrasound input devise, MUTs can also decrease the overall power consumption of an ultrasound input device. Since the power necessary to drive the transducer is proportional to its capacitance times its voltage squared, the low levels of capacitance of an array of MUTs (e.g., on the order of picoFarads) result in much lower power consumption than the relatively high levels of capacitance for an equivalent standard bulk transducer (e.g., on the order of nanoFarads, which is three orders of magnitude larger than picoFarads).

V. Ultrasound Signal Processing

Reflected ultrasonic signals can be processed to produce images and determine a range to an object. Embodiments described herein can process reflected ultrasonic signals to determine if an object is in contact with a surface.

A. Detecting Touch Input by Digitizing Reflected Signal

FIG. 24 is a schematic diagram of a flow 2400 for processing ultrasound signals emitted and received by an ultrasound input device according to certain aspects of the present disclosure. The flow 2400 includes emitting and receiving an ultrasonic signal as illustrated in a first plot 2402. The first plot 2402 shows an analog measurement of a first signal 2403 for an emitted ultrasonic signal and a set of subsequent signals 2404A, 2404B, 2404C, 2404D, 2404E for a set of reflected ultrasonic signals associated with an ultrasound input device. The first signal 2403 and the subsequent signals 2404 can be measured using a high-speed ADC 2406 to digitize the signal.

The output of the high-speed ADC 2406 is shown in a second plot 2408. The second plot 2408 includes a first digital representation 2410 of the emitted ultrasonic signal and a subsequent digital representations 2412A, 2412B, 2412C, 2412D, 2412E of the reflected ultrasonic signals associated with the ultrasound input device. The first digital representation 2410 and the subsequent digital representations 2412A, 2412B, 2412C, 2412D, 2412E can be processed by a digital processing module in 2414 embedded in the ultrasound input device and/or a system coupled to the ultrasound input device. The digital processing module 2414 can demodulate the digital representations of the data to extract touch input information. For example, the digital processing module can process one or more of the subsequent digital representations 2412A, 2412B, 2412C, 2412D, 2412E to determine that an amplitude of the second digital representation is below a threshold value that is associated with an object being in contact with the surface of the ultrasound input device.

B. Detecting Touch Input Using Energy Integration

FIG. 25 is a schematic diagram of a flow 2500 for processing ultrasound signals emitted and received by an ultrasound input device using energy integration according to certain aspects of the present disclosure. The flow 2500 includes emitting and receiving an ultrasonic signal as illustrated in a first plot 2502. The first plot 2502 shows an analog measurement of a first signal 2503 for an emitted ultrasonic signal and a set of subsequent signals 2504A, 2504B, 2504C, 2504D, 2504E for a set of reflected ultrasonic signals associated with an ultrasound input device. The flow 2500 can include an ultrasound input device with an analog circuit including a rectifier 2506 to rectify the subsequent signals 2504A, 2504B, 2504C, 2504D, 2504E.

A second plot 2508 shows the first signal 2503 and a set of rectified signals 2510A, 2510B, 2510C, 2510D, 2510E each corresponding to respective ones of the set of reflected ultrasonic signals. The rectified signals 2510A, 2510B, 2510C, 2510D, 2510E can be processed by an analog integrator 2512 to output a direct current (DC) signal 2513, shown in a third plot 2514, which is directly proportional to an amplitude of the reflected ultrasonic signal. The DC signal 2513 can be determined using an energy measurement window 2516. The DC signal 2513 can represent an energy value associated with the energy of the received signal measured during the energy measurement window 2516. The DC signal 2513 can be processed by a low-speed ADC 2518. The DC signal 2513 output by the rectifier 2506 and the integrator 2512 remove the need to generate a high frequency digital output and, as a result, the low-speed ADC can use less power and can be fabricated on a smaller chip area.

FIG. 26 is a schematic diagram of an example of a flow 2600 for processing ultrasound signals emitted and received by an ultrasound input device using energy integration according to certain aspects of the present disclosure. The flow 2600 includes emitting and receiving an ultrasonic signal as illustrated in a first plot 2602. The first plot 2602 shows an analog measurement of a first signal 2603 for an emitted ultrasonic signal and a set of subsequent signals 2604A, 2604B, 2604C, 2604D, 2604E for a set of reflected ultrasonic signals associated with an ultrasound input device. The flow 2600 can include an ultrasound input device with an analog summation or integration circuit 2620 and a summed voltage output 2622.

A second plot 2608 shows the first signal 2603 and a set of energy signals 2610A, 2610B, 2610C, 2610D, 2610E each corresponding to the energy of respective ones of the set of reflected ultrasonic signals. For illustrative purposes, the set of energy signals 2610A, 2610B, 2610C, 2610D, 2610E is depicted in solid line overlaid with the set of subsequent signals 2604A, 2604B, 2604C, 2604D, 2604E from the first plot 2602 shown in dotted line.

A summation or integration circuit 2620 can received the set of energy signals 2610A, 2610B, 2610C, 2610D, 2610E from within an energy measurement window 2616. The summation or integration circuit 2620 can generate a voltage output 2622 that is an analog value representing the summed/integrated energy within the energy measurement window 2616.

In some cases, an optional negative DC charge circuit 2624 can be applied to the summation or integration circuit 2620 to offset information not associated with a touch event. Since touch events are identified based on differences between received signals during a non-contacting state and received signals during a contacting state, there is some amount of information within the set of subsequent signals 2604A, 2604B, 2604C, 2604D, 2604E that is not associated with those differences (e.g., a baseline signal). Removing such baseline signals can result in more effective range to sample during analog-to-digital conversion. Since removing such a baseline signal in analog in the set of subsequent signals 2604A, 2604B, 2604C, 2604D, 2604E would require precise phase alignment, it can be difficult to apply such corrections. However, as depicted in FIG. 26, and optional negative DC charge circuit 2624 applied to the summation or integration circuit 2620 can offset a particular amount of energy associated with the baseline signal or a portion thereof, thus improving the amount of effective range available for analog-to-digital conversion. In such cases, the voltage output 2622 can be proportional to the energy of the signal minus the energy of the negative DC charge circuit 2624.

The voltage output 2622 can be processed by a low-speed ADC 2618. The voltage output 2622 of the summed/integrated energy within the energy measurement window 2616 can remove the need to generate a high frequency digital output and, as a result, the low-speed ADC can use less power and can be fabricated on a smaller chip area.

FIG. 27 is a schematic diagram of a flow 2700 for processing ultrasound signals emitted and received by an ultrasound input device using energy integration via absolute value accumulation according to certain aspects of the present disclosure. Flow 2700 can be one technique for implementing flow 2600 of FIG. 26. The flow 2700 includes emitting and receiving an ultrasonic signal as illustrated in a first plot 2702. The first plot 2702 shows an analog measurement of a first signal for an emitted ultrasonic signal and a set of subsequent signals for a set of reflected ultrasonic signals associated with an ultrasound input device. The first plot 2702 can depict voltage as a function of time (e.g., V(t)). The first plot 2702 can be first plot 2602 of FIG. 26. The flow 2700 can include an ultrasound input device with an analog sampling circuit 2706, and absolute value circuit 2714, an analog accumulator 2724, and a summed voltage output 2728.

The set of subsequent signals from the first plot 2702 can be passed through an analog sampling circuit 2706 to result in a sampled first signal 2710 and a set of sampled subsequent signals 2712A, 2712B, 2712C, 2712D, 2712E as depicted in second plot 2708. First signal 1010 can correspond to the initially emitted ultrasonic wave. The second plot 2708 can depict voltage as a function of sample (e.g., V(n) where n is the sample number). The sampled subsequent signals 2712A, 2712B, 2712C, 2712D, 2712E can be passed to an absolute value circuit 2714 that can generate a set of energy signals 2720A, 2720B, 2720C, 2720D, 2720E as depicted in third plot 2716. The third plot 2716 can depict an absolute value of voltage as a function of sample (e.g., |V(n)|). The absolute value circuit 2714 can pass all zero or positive values of the set of sampled subsequent signals 2712A, 2712B, 2712C, 2712D, 2712E and reverse the polarity of all negative values. The sampled first signal 2718 is also shown in the third plot 2716, the sampled first signal 2718 can be similar to the sampled first signal 2710.

A switch-capacitor analog accumulator 2724 can be used to sum the set of energy signals 2720A, 2720B, 2720C, 2720D, 2720E from within the energy measurement window 2722. The switch-capacitor analog accumulator can generate a voltage output 2728 that is an analog value representing the sum of the energy within the energy measurement window 2722. In some cases, an analog integrator can be used instead of an accumulator.

In some cases, an optional negative clocked DC charge circuit 2726 can be applied to the switch-capacitor analog accumulator 2724 to offset information not associated with a touch event. Since the sampling circuit 2706 is clocked according to a sample rate, the optional negative clocked DC charge circuit 2726 can be clocked at the same rate to ensure the biasing voltage is applied at the appropriate intervals corresponding to the samples of the sampled subsequent signals 2712A, 2712B, 2712C, 2712D, 2712E. When an optional negative clocked DC charge circuit 2726 is used, the voltage output 2728 can be proportional to the energy of the signal minus the energy of the negative clocked DC charge circuit 2726.

The voltage output 2728 can be processed by a low-speed ADC 2730. The voltage output 2728 of the summed energy within the energy measurement window 2722 can remove the need to generate a high frequency digital output and, as a result, the low-speed ADC can use less power and can be fabricated on a smaller chip area.

FIG. 28 is a schematic diagram of a flow 2800 for processing ultrasound signals emitted and received by an ultrasound input device using energy integration via self-mixing and integration according to certain aspects of the present disclosure. Flow 2800 can be one technique for implementing flow 2600 of FIG. 26. The flow 2800 includes emitting and receiving an ultrasonic signal as illustrated in a first plot 2802. The first plot 2802 shows an analog measurement of a first signal for an emitted ultrasonic signal and a set of subsequent signals for a set of reflected ultrasonic signals associated with an ultrasound input device. The first plot 2702 can depict voltage as a function of time (e.g., V(t)). The first plot 2802 can be first plot 2602 of FIG. 26. The flow 2800 can include an ultrasound input device with a self-mixing circuit 2806, an analog integrator circuit 2820, and an integrated voltage output 2822.

The set of subsequent signals from the first plot 2802 can be passed through the self-mixing circuit 2806 to generate a set of squared subsequent signals 2810A, 2810B, 2810C, 2810D, 2810E as depicted in the second plot 2808. The self-mixing circuit 2806 can effectively multiply every analog value by itself over time. As a result, the second plot 2808 can depict squared voltage as a function of time (e.g., $V^2(t)$. Due to the nature of squares, and thus the nature of self-mixing circuit 2806, the set of squared subsequent signals 2810A, 2810B, 2810C, 2810D, 2810E will always be positive.

The set of squared subsequent signals 2810A, 2810B, 2810C, 2810D, 2810E can be passed to an analog integrator circuit 2820. The analog integrator circuit 2820 can integrate the set of squared subsequent signals 2810A, 2810B, 2810C, 2810D, 2810E within the energy measurement window 2816 to generate an integrated voltage output 2822. The integrated voltage output 2822 can be an analog representation of the total energy within the energy measurement window 2816 over time. In some cases, an accumulator can be used instead of an analog integrator circuit 2820.

In some cases, an optional negative bias current circuit 2824 can be applied to the analog integrator circuit 2820 to offset information not associated with a touch event. The negative bias current circuit 2824 can constantly drain charge out of the analog integrator circuit 2820 during integration. When an optional negative bias current circuit 2824 is used, the voltage output 2822 can be proportional to the energy of the signal minus the energy of the negative bias current circuit 2824.

The voltage output 2822 can be processed by a low-speed ADC 2826. The voltage output 2822 of the integrated energy within the energy measurement window 2816 can remove the need to generate a high frequency digital output and, as a result, the low-speed ADC can use less power and can be fabricated on a smaller chip area.

FIG. 29 is a schematic circuit diagram depicting an analog integrator 2900 with a negative bias current according to certain aspects of the present disclosure. The analog integrator 2900 negative bias can be the analog integrator circuit 2820 and optional negative bias current circuit 2824 of FIG. 28.

The analog integrator 2900 can receive an input voltage ($V_{in}$) through a resistor ($R_{in}$) to obtain an input current ($I_{in}$). A capacitor (C) can be charged by a charging current ($I_f$) to generate the integrated signal, which can feed the voltage output ($V_{out}$). Item (A) is an op-amp. A negative biasing current ($I_{bias}$) can be applied at point X to drain charge out of the analog integrator 2900, thus resulting in a reduced charging current ($I_f$). Therefore, the charging current can be calculated as $I_f = I_{in} - I_{bias}$.

C. Energy Measurement Windowing

FIG. 30 is a schematic diagram of a flow for processing ultrasound signals depicting the reduced effects of time-of-flight changes on touch input detection within an energy measurement window according to certain aspects of the present disclosure. In an ultrasound imaging system or proximity detection system, an accurate time-of-flight is critical to determine the distance of objects in a field of view from an ultrasonic transducer. In contrast with imaging and proximity systems, the distance to the first and second surface of the material layer in the ultrasound input device can be provided and a touch input can be detected without accounting for changes in time-of-flight. FIG. 30 shows a first plot 3002 where a first set of reflected ultrasonic signals 3004 is received starting at a first time 3006 and a second plot 3008 where a second set of reflected ultrasonic signals 3010 is received at a second time 3012. A first signal 3003 can be associated with an emitted ultrasonic signal, which occurs prior to the first time 3006 and the second time 3012 of the first plot 3002 and the second plot 3008, respectively. The first set of reflected ultrasonic signals 3004 is passed through an energy accumulator or integrator circuit 3020 to generate an output voltage 3022 (e.g., $V_{sum1}$) that can be fed into a low-speed ADC 3024 and processed to obtain an output value 3018 (e.g., 3000 LSB where LSB stands for least-significant bit). The second set of reflected ultrasonic signals 3010 is passed through an energy accumulator or integrator circuit 3020 to generate an output voltage 3023 (e.g., $V_{sum2}$) that can be fed into a low-speed ADC 3024 and processed to obtain an output value 3019 (e.g., 3000 LSB where LSB stands for least-significant bit). The output values 3018, 3019 can be representative of the pulse reflection energy during the energy measurement windows 3016 of plots 3002, 3008. Despite the different starting times of the first set of reflected ultrasonic signals 3004 and the second set of reflected ultrasonic signals 3010 (e.g., first time 3006 and second time 3012), the output values 3018, 3019 can be the same or substantially the same since the entire first set of reflected ultrasonic signals 3004 and entire second set reflected ultrasonic signals 3010 each fit within the energy measurement window 3016.

Thus, the ultrasound input device can be insensitive to time-of-flight, at least to a degree (e.g., within the energy measurement window). In some cases, advanced windowing techniques, such as those disclosed herein, can further improve the ultrasound input device's insensitivity to time-of-flight. As a result, the surface of the ultrasound input device (e.g., material layer) need not be entirely flat and/or the alignment of the ultrasound input device against a material (e.g., material layer) need not be exactly at 90° (e.g., the angle between the propagation direction of the ultrasonic transducer and the surface of the material layer). Further, the insensitivity to time-of-flight can permit some insensitivity to varying indexes of refraction through which the ultrasonic signals pass (e.g., a material layer having somewhat inconsistent indices of refraction throughout).

As shown in, for example, FIGS. 25-28 and 30, the energy of the reflected ultrasonic signals (e.g., reflected echoes and standing waves) is summed or integrated over an energy measurement window. This energy is correlated to the condition of a touch input and thus can be used for input touch detection. The energy measurement window 3016 can be sized to include the pulse time of the ultrasonic signal and account for changes in the time-of-flight due to temperature, stack variations (e.g., variations in the materials making up the ultrasound input device), etc. The energy measurement window 3016 can reduce errors due to variations in the time-of-flight. The ultrasonic touch device can determine input touch contact based on a specific threshold.

FIG. 31 is a schematic diagram of an abbreviated flow for processing ultrasound signals depicting the heightened effects of reflected ultrasonic signal time-of-flight changes on touch input detection outside of an energy measurement window. FIG. 31 shows a first plot 3102 where a first set of reflected ultrasonic signals 3104 is received starting at a first time 3106 and a second plot 3108 where a second set of reflected ultrasonic signals 3110 is received at a second time 3112. A first signal 3103 can be associated with an emitted ultrasonic signal, which occurs prior to the first time 3106 and the second time 3112 of the first plot 3102 and the second plot 3108, respectively. The first set of reflected ultrasonic signals 3104 can be processed as disclosed herein to obtain an output value 3118 (e.g., 3000 LSB where LSB stands for least-significant bit). The second set of reflected ultrasonic signals 3110 can be processed as disclosed herein to obtain an output value 3119 (e.g., 2500 LSB where LSB stands for least-significant bit). The output values 3118, 3119 can be representative of the pulse reflection energy during the energy measurement windows 3116 of plots 3102, 3108.

As depicted in FIG. 31, because nearly all of the first set of reflected ultrasonic signals 3104 fits within the energy measurement window 3116, but a smaller portion of the second set of reflected ultrasonic signals 3110 fits within the energy measurement window 3116, output value 3118 is greater than output value 3119. As depicted in FIG. 31, the output values 3118, 3119 differ by 500 LSB. If the reflected ultrasonic signals fall outside of the energy measurement window 3116, some of the measured pulses may be cut off from being measured and thus the ultrasound input device may be susceptible to time-of-flight variations (e.g., variations that would cause a difference in first time 3106 and second time 3112).

FIG. 32 is a schematic diagram of a flow for processing ultrasound signals depicting the minimal effects of reflected ultrasonic signal time-of-flight changes on touch input detection outside of an energy measurement window when window shaping is used according to certain aspects of the present disclosure. FIG. 32 shows a first plot 3202 where a first set of reflected ultrasonic signals 3204 is received starting at a first time 3206 and a second plot 3208 where a second set of reflected ultrasonic signals 3210 is received at a second time 3212. A first signal 3203 can be associated with an emitted ultrasonic signal, which occurs prior to the first time 3206 and the second time 3212 of the first plot 3202 and the second plot 3208, respectively. The first set of reflected ultrasonic signals 3204 can be processed as disclosed herein to obtain an output value 3218 (e.g., 2500 LSB where LSB stands for least-significant bit). The second set of reflected ultrasonic signals 3210 can be processed as disclosed herein to obtain an output value 3219 (e.g., 2450 LSB where LSB stands for least-significant bit). The output values 3218, 3219 can be representative of the pulse reflection energy during the energy measurement windows 3216 of plots 3202, 3208.

Unlike FIG. 31, an energy measurement window envelope 3220 is used in conjunction with the energy measurement window 3216. The energy measurement window envelope 3220 scales portions of the signal within the energy measurement window 3216 such that portions near the edges of the energy measurement window 3216 are given less weight than portions near the center of the energy measurement window 3216. Thus, despite small variations near the ends of the energy measurement window 3216, the resultant output values will be mostly based on the signals measured within the center of the energy measurement window 3216. The energy measurement window envelope 3220 is depicted in FIG. 32 as having a particular flared bell shape, although any suitable shape can be used, including symmetrical and non-symmetrical shapes. The vertical extent of the energy measurement window envelope 3220 as depicted in FIG. 32 can represent any suitable scale, such as 0% to 100%. In some cases, the energy measurement window envelope 3220 can include amplifying signals near the center of the energy measurement window 3216, such as to values above 100% of the original signal at that time.

As depicted in FIG. 32, because of the use of an energy measurement window envelope 3220, the signals (e.g., first set of reflected ultrasonic signals 3204 and second set of reflected ultrasonic signals 3210) are weighted so the portions of the signals nearest the center of the energy measurement window 3216 are given more weight than the portions nearest the edges of the energy measurement window 3216, thus de-emphasizing any portions cut off by the start or end of the energy measurement window 3216. As a result, the output values 3218, 3219 are much closer than output values 3118, 3119 of FIG. 31. As depicted in FIG. 32, the output values 3218, 3219 only differ by 50 LSB. Thus, as a result of an energy measurement window envelope 3220, the ultrasound input device can become less susceptible to time-of-flight variations.

FIG. 33 is a schematic circuit diagram depicting a window shaping circuit 3300 according to certain aspects of the present disclosure. The window shaping circuit 3300 can generate an energy measurement window having an energy measurement window envelope (e.g., energy measurement window 3216 having energy measurement window envelope 3220 of FIG. 32). The window shaping circuit 3300 can operate as a traditional analog accumulator circuit with the addition of an adjustable capacitor 3302. The adjustable capacitor 3302 can take any suitable form, such as a switched ladder of different sized capacitors. The choice of capacitor size for adjustable capacitor 3302 over time can result in an adjustment of gain on the analog accumulator circuit over time. In some cases, the adjustable capacitor 3302 can be driven by a clock 3304 or other source to determine when to chance capacitance. In some cases, the adjustable capacitor 3302 can be used with an analog sampling circuit, such as analog sampling circuit 2706 of FIG. 27, and the adjustable capacitor 3302 can be changed with different sample numbers (e.g., n of V(n)).

FIG. 34 is a schematic diagram depicting a flow 3400 for processing ultrasound signals to detect a touch input using the amplitude of reflected ultrasonic signals according to certain aspects of the present disclosure. FIG. 34 shows an ultrasound input device 3402 with no touch input 3404 and with a touch input 3406. A first plot 3408 associated with the ultrasound input device 3402 with no touch input 3404 shows a transmitted signal 3410 and a first set of reflected signals 3412. The first set of reflected signals 3412 can be processed to generate an output voltage 3430 (e.g., $V_{sum1}$) associated with the first set of reflected signals 3412, which can be provided to a low-speed ADC 3434 and further processed to generate a first output 3436. The first output 3436 can be representative of the energy of the first set of reflected signals 3412 within the energy measurement window envelope 3416. A second plot 3420 shows a transmitted signal 3422 and a second set of reflected signals 3424. The second set of reflected signals 3424 can be processed, as disclosed herein, to generate an output voltage 3432 (e.g., $V_{sum2}$), which can be provided to a low-speed ADC 3434 and further processed to generate a second output 3438. The second output 3438 can be representative of the energy of the second set of reflected signals 3424 within the energy measurement window envelope 3416.

An energy measurement window envelope 3416 (e.g., an envelope similar to energy measurement window envelope 3220 of FIG. 32) can be applied to the first set of reflected signals 3412 and the second set of reflected signals 3424. In some embodiments, the energy measurement window envelope 3416 can be applied to the first set of reflected signals 3412 and the second set of reflected signals 3424 to de-emphasize signals at the edges of the energy measurement window envelope 3416.

The first output 3436 and the second output 3438 can be compared to determine whether a touch input (e.g., touch event) has occurred. For example, if the second output 3438 is lower than the first output 3436 by a predetermined amount and/or if the second output 3438 is lower than a threshold value, the ultrasound input device 3402 can generate a signal indicating a touch input is present on a surface.

Since the output voltages 3430, 3432 are indicative of the first output 3436 and second output 3420, respectively, the output voltages 3430, 3432 can be used to determine whether a touch input has occurred. In some embodiments, only a single output, such as the first output 3418, can be compared to a reference value. The reference value can be established at the time of manufacturing and/or be updated based on background characteristics measured by or communicated to the device, such as temperature.

The techniques described with reference to FIG. 34 can be used to generate an output signal from an ultrasound input device 3402, although other techniques can be used. Any technique that can convert the signals associated with the first set of reflected signals 3412 or the second set of reflected signals 3424 to a measurement of total energy can be used.

D. Touch Input Error Prevention

FIG. 35 is a chart 3500 depicting reflected ultrasonic signal measurements made using an ultrasound input device and illustrating techniques to improve touch input detection according to certain aspects of the present disclosure. The sensor readout (e.g., DC signal or other sensor data) determined by the ultrasound input device can be measured continuously or at a specific frequency depending on the application. In some embodiments, the sensor readout can be measured at a frequency of 100 Hz. An individual measurement 3502 can correspond to the energy measurement within an energy measurement window. One or more individual measurements can be used to determine a current state 3506. The current state can be defined by the current individual measurement 3502 or by a best-fit line based on two or more individual measurements. In some embodiments, the best-fit line can be calculated using a least-squares method. A plurality of individual measurements can be used to determine a moving average threshold 3504.

The current state 3506 and the moving average threshold 3504 can be used to detect a touch event. The moving average threshold 3504 can be used to determine a sudden signal drop that can trigger a touch input event. For example, the system can detect a "hand-touch" effect only if a "rapid signal change" 3508 from a current state 3506 is detected. A rapid signal change 3508 can be associated with a sudden signal drop on all or many channels, and can be considered a touch input event. A threshold to detect the rapid signal change 3508 can be the moving average threshold 3504 when no hand-touch event is detected. (Dynamic threshold). In some embodiments, the rapid signal change 3508 can be a pre-programmed static threshold. The rapid signal change 3508 event can trigger a touch input event and cause the ultrasound input device to generate a signal indicating a touch input on a surface of the device. For a rapid signal change 3508 event, multiple measurements 3510 are made to ensure signal did actually drop and does not jump back up, such as to its original value. For example, a hard press by a user may result in a dropping sensor readout, but will still provide a continuous signal. During the multiple measurements 3510, if the signal rapidly returns to a higher value, such as the value previously seen before the suspected touch event, the ultrasound input device can recognize the temporary signal drop as a false touch event and not classify it as a touch event. Multiple measurements 3510 can occur over a very short timeframe (e.g., on the order of tens or hundreds of milliseconds). In some embodiments, a "gradual signal change" can be treated as temperature change but not hand touch event because the moving average will adjust with each individual measurement 3502 at a rate based on the number of measurements used to determine the moving average.

In some cases, a threshold 3504 can be based on a calculation other than a moving average calculation. In some cases, the threshold 3504 is simply some function of past history (e.g., historical measurements), such as a function of the past x number of measurements. In some cases, past measurements can be weighted, such as more recent measurements being weighted higher than measurements taken longer ago. In such cases, the response time of the ultrasound input device can be adjusted based on the weightings of the past x measurements. For example, a threshold can be calculated as a function of historical values according to Threshold=$f(X[n-1], X[n-2], \ldots, X[n-m])$ where $X[n]$ is the n-th sensor readout (or the current sensor readout). In another example, the threshold can be calculated as a function of weighted historical values according to Threshold=$w_1 X[n-1]+w_2 X[n-2], \ldots, w_m X[n-m]$ where $w_n$ is a weighting parameter for the n-th sensor readout. In some cases, weighting parameters can be trained using machine learning, such as described in further detail herein.

In some cases, in addition to or instead of determining a rapid signal change 3508 based on measurements themselves, the determination can be made using a slope of a set of measurements, such as a slope of the current measurement and some number of past measurements.

FIG. 36 is a chart 3600 depicting reflected ultrasonic signal measurements made using an ultrasound input device and illustrating additional techniques to improve touch input detection according to certain aspects of the present disclosure. A portion of chart 3600 is depicted as chart 3500 of FIG. 35. Chart 3600 shows that signal variation over time may occur due to various factors, such as temperature changes, however the ultrasound input device may be able to discern that these variations are not touch events. However, sudden signal drops between consecutive measurements can be indicative of a touch event. Current state 3606 can be similar to current state 3506 of FIG. 35. The moving average threshold 3604 can be similar to threshold 3504 of FIG. 35. This threshold 3604 can be based in part on a moving average of previous measurements of the current state 3606, such as a moving average of previous measurements offset by a given amount. This type of threshold 3604 can be known as a dynamic threshold, although other threshold techniques can be used.

At region 3616, a touch event occurs. When the touch event occurs, the current state 3606 quickly drops. As depicted in the callout portion of chart 3600, various measurements 3602 are shown. Each measurement 3602 can be separated in time based on a measurement frequency. For example, each measurement 3602 can be 0.01 seconds apart (e.g., at 100 Hz), although other frequencies can be used. A sudden drop can be detected between two or more consecutive measurements 3602. When the sudden drop in current state 3606 falls below the threshold 3604, a touch event can be considered to have occurred. Region 3617 depicts another touch event.

At region 3618 and region 3620, gradual changes in temperature of the ultrasonic sensor and surface to which the sensor is coupled can result in gradual changes in current state 3606. Because of the relatively slow changes in the current state 3606, the threshold 3604, which is based on a moving average of the current state 3606, will make changes as well. Since the threshold 3604 is able to compensate for slow changes in the current state 3606, such as those that occur due to temperature changes, these slow changes in current state 3606 do not pass the threshold 3604 and therefore do not trigger touch events. Furthermore, since the threshold 3604 is dynamically updating, the threshold 3604 is able to operate properly at different temperatures. In some cases, changes in current state 3606 due to temperature variation can be even larger than contrast resulting from an actual hand touch, but since these temperature variations are much slower than the changes in current state 3606 due to a touch event, they are not detected as touch events.

VI. Multifrequency Touch Detection

FIG. 37 is a chart depicting a temperature dependence of reflected ultrasonic signals according to certain aspects of the present disclosure. The reflected ultrasonic signals received by an ultrasound input device can include the main signal 3702 and any unwanted signals 3704. The main signal travels a first path through the material layer and is associated with a first time-of-flight (TOF) and any unwanted signals 3704 travel a second path through the material layer and are associated with a second TOF. The speed of sound in a material layer depends on the temperature of the material layer. Due to speed of sound changes as a result of temperature changes, the main signal 3702 and the unwanted signals 3704 travel through different acoustic paths, and the associated first TOF and second TOF change a different amount accordingly. This creates a net TOF difference Δt(T) 3706 between the main signal 3702 and the unwanted signal 3704 which change with temperature T. This then translates into a phase delay difference Δø(T) between the main signal 3702 and the unwanted signal 3704. And thus yields different integrated signal strength difference Dout(T) as depicted by line 3710.

FIG. 38 is a set of charts depicting TOF temperature dependence of a two frequency method of detecting a touch input according to certain aspects of the present disclosure. The charts can be similar to the charts of FIG. 37. In a multi-frequency ultrasound input device, different frequencies will have different temperature effects resulting in a different TOF for each signal. The multi-frequency ultrasound input device can process a "finger touch" (e.g., touch event) when a signal drop is detected in a threshold number of frequency channels. For example, two different methods can detect whether a finger touched the ultrasound touch input device, and the device can only process the touch event when both of the methods agree finger touch has been detected.

In a multi-frequency ultrasound touch input device, a first signal 3802 at a first frequency and a second signal 3804 at a second frequency have different background and temperature drift characteristics. For example, the first signal 3802 and the second signal 3804 experience the same Δt(T) when temperature changes. As a result of the different temperature drift characteristics, the same Δt(T) will translate to a different phase delay for each frequency. For example, the first signal 3802 will have a first phase delay of Δϕ↓1(T) 3806 and the second signal 3804 will have a second phase delay Δϕ↓2(T) 3808. The resulting difference in the phase delay can cause two different ADC output value patterns over temperature Dout↓1(T) and Dout↓2(T), as depicted by lines 3810, 3812, respectively.

Therefore, signal drop can be measured in multiple frequencies in order to increase touch detection reliability and reduce false trigger detection. A touch input event can be processed if all the frequency channels detect a sudden signal drop. The multiple measurements can occur very fast (<1 ms) to make sure the sudden signal drop is not due to temperature effects.

The multi-frequency ultrasound touch input device can avoid false triggers by reducing noise associated with environmental conditions. The touch input device can immediately execute a rapid pulse-echo test to ensure the touch event is real but not a false trigger due to noise. In some embodiments, the multiple tests can happen within 1 ms.

FIG. 39 is a multi-part chart 3900 depicting reflected ultrasonic signal measurements made across several frequencies using an ultrasound input device and illustrating techniques to improve touch input detection according to certain aspects of the present disclosure. Different frequencies of ultrasonic signals can exhibit different variation due to temperature changes. Thus, by sensing using multiple ultrasonic frequencies, the ultrasound input device can compare a suspected touch event with the data from one or more other frequencies to ensure the suspected touch event is confirmed by the one or more other frequencies. The use of multiple frequencies can reduce error rates.

Line 3906 can represent energy signals associated with a 100 kHz frequency, line 3905 can represent energy signals associated with a 1 MHz frequency, and line 3907 can represent energy signals associated with a 10 MHz frequency. Line 3904 can represent a moving average threshold, such as threshold 3504 from FIG. 35. For illustrative purposes, a moving average threshold is only depicted with respect to the 100 kHz frequency, but respective thresholds can exist for each frequency used (e.g., 1 MHz and 10 MHz). While the frequencies 100 kHz, 1 MHz, and 10 MHz are used with respect to FIG. 39, any other suitable frequencies can be used. While three different frequencies are used with respect to FIG. 39, any number of different frequencies, such as two or greater than three, can be used. A touch event may be registered only if the touch event is detected across all, a majority of, or at least a threshold percentage of different frequencies being used for detection.

In some cases, instead of or in addition to driving an ultrasound input device at different frequencies, the ultrasound input device can drive an ultrasonic array with different phase delays to generate different beampatterns. Since different beampatterns can have different temperature characteristics, different beampatterns can be used similar to different frequencies to reduce error and confirm suspected touch events.

FIG. 40 shows a plan view of a two-frequency PMUT 4000 according to certain aspects of the present disclosure. In some embodiments, a circular PMUT design can be fabricated to achieve multi-frequency transducers. The circular PMUT design can consist of multiple individual channels for transmit and receive per frequency. In some cases, the multiple channels or transducers can be arranged concentrically. For example, the two-frequency PMUT 4000 includes a first transmit/receive pair 4002 associated with a low frequency. The first transmit/receive pair 4002 can include a low frequency transmit ring 4004 and a low frequency receive ring 4006. The two-frequency PMUT 4000 also includes a second transmit/receive pair 4008 associated with a high frequency. The second transmit/receive pair 4008 can include a high frequency transmit ring 4010 and a low frequency receive ring 4012. In various embodiments, a circular PMUT design can include a range of multiple frequencies from 2 to 10. The range of frequencies can be from 1 MHz to 10 MHz. In some embodiments, frequencies less than 1 MHz can be used depending on the material layer and specific application. A second PMUT array can be added for TOF measurement at the 1-3 MHz range. In some cases, the ranges of frequencies used for any array can be from 30 kHz to 50 Mhz.

FIG. 41 is a schematic plan view depicting a multi-frequency ultrasound input device 4100 with a square design according to certain aspects of the present disclosure. The square sensor design can consist of a square grid of multiple individual channels for transmit and receive per frequency. In some cases, one or more receiving channels can be positioned between multiple transmitting channels. In such cases, the position of a receiving channel between multiple transmitting channels can facilitate receiving and detecting reflected signals. In an example, the multiple-frequency ultrasound input device 4100 can include various low-frequency transmitters 4102, low-frequency receivers 4104, high-frequency transmitters 4106, and high-frequency receivers 4108. The square design can include nested patterns, such as the cross-shaped nested pattern depicted in FIG. 41. Any other suitable pattern can be used. The various transmitters and receivers can be any suitable frequency, such as between 30 kHz to 50 MHz, 1 MHz to 10 MHz, or any other suitable range. It is understood that the frequencies described in reference to FIG. 41 can be applicable to any suitable sensor array, for example, as described in reference to FIG. 13A-13G.

VII. Feature Extraction

Systems and methods, according to embodiments of the invention, can allow for the extraction of features from signals, for example, received by an ultrasound input device. The ultrasound input device can be capable of extracting features such as energy signals as well as physical characteristics.

A. Discernable Energy Signals

FIG. 42 is a set of three charts 4202, 4204, 4206 depicting example signals 4212, 4214, 4216 received by an ultrasound input system attributable to three different users according to certain aspects of the present disclosure. Each of the charts 4202, 4204, 4206 depicts energy measurements over time associated with reflected signals detected by an ultrasound input device.

Signal 4212 of chart 4202 is an example of a dry finger quickly pressing with a relatively small force. The dryness of the finger and the relatively small force show a relatively smaller dip in the energy measurements during the touch event. The speed of the press is seen in the relatively short duration of the dip in the energy measurements.

Signal 4214 of chart 4204 is an example of a wet finger moderately pressing with relatively hard force. The wetness of the finger and the intensity of the press can both lead to a greater dampening effect on the reflected signals, and thus a deeper dip in the energy measurements. The speed of the press is seen in the moderately wide dip in the energy measurements. Further, the more noticeable presence of an initial drop and subsequent drop when the energy measurements first dip is indicative of a small amount of time spent in contact with the surface before the full force of the press is initiated.

Signal 4216 of chart 4206 is an example of a touch event pattern where a user lightly touches the surface before pressing and initiating the full touch event. The initial dip and relatively long delay until the subsequent, full dip in the energy measurements is indicative that the user placed a finger on the surface and waited a short time before pressing the finger down.

While signals 4212, 4214, 4216 can each be used to indicate a desired touch event due to the presence of a sufficient dip in energy measurements, each of the signals 4212, 4214, 4216 contains various features that are discernable. Examples of discernable features include depth of the dip in energy measurements, width of the dip in energy measurements, the presence of an initial dip before a subsequent and deeper dip in energy measurements, the delay between an initial dip and a subsequent and deeper dip in energy measurements, velocity of decrease and/or increase of energy measurements into and out of the dip (e.g., velocity of change in energy signal at the edge of the dip), or any other features of the energy measurements.

By extracting various features from energy measurement signals, it can be possible to distinguish and even recognize different users, enabling additional user-based advanced functionality. For example, after a training session, an ultrasound input system may be able to distinguish a first user and a second user due to the particular ways the users interact with the ultrasound input device, such as the style of touch (e.g., quick tap or place and press), duration of the touch, characteristics of the skin (e.g., natural wetness or dryness of a finger), intensity of the touch (e.g., light press or hard press), or other characteristics discernable from the energy measurement signals. While there characteristics may be discernable from the energy measurement signals, they may not be readily perceivable to a user due to the high speeds at which the energy measurement signals can be taken. Therefore, the difference between a quick tap and a place and press may be easily discernable from the energy measurement signals, but may be non-discernable or not easily discernable from a visual inspection of the touching action.

FIG. 43 is a set of charts depicting energy measurement signals associated with a human finger, a water drop, and placing a device on a desk (e.g., placing an object over a sensor). For a human finger, the energy measurement signal inevitably has slight movements or variations, even for the duration of a touch event, which can be detected and identified to confirm that a human finger is initiating the touch event. For a liquid droplet or water droplet, the energy measurement signal has certain characteristics, such as a steep drop followed by a generally steady signal without much variation, if any. Detection of such characteristics can be used to discriminate between an actual intended touch event and accidental contact by other objects, such as falling water. Placing a device or other object on a sensor (e.g., a desk-mounted sensor) can have an energy measurement signal with certain characteristics, such as a relatively shallow drop followed by a generally steady signal without much variation, if any.

Accordingly, a system as described herein can determine an energy signal associated with a set of reflected ultrasound signals. The system can then extract feature information associated with the energy signal and then determine an inference associated with the object based on the extracted feature information. Determining the inference can comprise using the feature information to determine whether the touch event is associated with a human digit or a water drop. For example, as illustrated in FIG. 26, a water drop (i.e., water droplet) can induce a larger drop in the energy signal determined by the system than a human digit (i.e., finger). The finger can have peaks and valleys (i.e., fingerprint) that decreases the amount of surface area placed on the sensor and thus the amount of ultrasonic signals absorbed by the object.

Thus, a criteria of a magnitude of the energy signal (e.g., corresponding to a steep drop) can be used to distinguish between a finger touch and a water drop. Further, the energy signal is more consistent over time than the human finger. Thus, a criteria of the energy signal being within a specified range over a specified amount of time can be used to distinguish between a water drop and a human finger. Such a measurement can be performed using a variation (e.g., a standard deviation) of the energy signal over time. Accordingly, the feature information can include a magnitude of the energy signal and/or a variation of the energy signal. The determining of the inference can include comparing the magnitude and/or the variation to a respective threshold to determine whether the touch event is associated with a human digit or a water drop.

FIG. 44 is a combination schematic diagram and set of charts depicting how temperature can be leveraged to further identify whether a human finger is initiating a touch event. The energy measurement signal output by the sensor (e.g., the sensor chip and/or substrate) is somewhat dependent on the temperature of the sensor. As the temperature increases, the energy measurement signal tends to decrease.

Generally, a chip will be at room temperature (e.g., at or around 20 or 21° C.), whereas a human finger will be at body temperature (e.g., at or around 30° C.). When living tissue (e.g., a human finger) initiates a touch event, heat will transfer between the tissue (e.g., finger) and the chip. When the finger is warmer, it may cause the chip to slightly increase in temperature. Since the energy measurement signal as a whole is partially dependent on the temperature of the chip and/or substrate, fluctuation in the temperature of the chip and/or substrate can be detected as an underlying steady increase or decrease in the energy measurement signal over time. As depicted in the chart at the bottom left of FIG. 44, when a warm finger is placed on a cooler sensor, the heat transfer will cause the energy measurement signal to take on a generally downward slope. As depicted in the chart at the bottom middle of FIG. 44, when a cool finger is placed on a warmer sensor, the heat transfer will cause the energy measurement signal to take on a generally upward slope. However, as depicted in the chart at the bottom right of FIG. 44, when something other than living tissue (e.g., a finger) is placed on a sensor and that other object has a temperature that is at or near the same temperature of the sensor (e.g., both at room temperature), the lack of heat transfer will cause the energy measurement signal to take on a generally flat slope. Overall, such temperature effects on the energy measurement signal can be used to identify when something that is touching the sensor is at or near body temperature, or at or near other temperatures. In some cases, it may be possible to discern an approximate temperature of the object initiating the touch event through analysis of the general slope of the energy measurement signal.

In some cases, one or more temperatures sensors can be used to measure the temperature of the chip and/or substrate. Knowledge of the temperature of the chip and/or substrate can help inform a determination of whether an object initiating a touch event is a human finger or not.

FIG. 45 is a combination schematic diagram and charts depicting a finger touch and associated temperature information according to certain aspects of the present disclosure. In some cases, the ultrasound input system can include a temperature sensor, such as within, on, or proximate the chip. The temperature sensor can provide a temperature signal (e.g., temperature sensor readout) associated with the temperature of the ultrasound input system. Generally, when no touch event is being initiated, there would be minimal or no change in the temperature signal, as the ultrasound input system would maintain a temperature of at or near the ambient temperature, such as room temperature. However, if a touch event is initiated with a human finger, an expected change in temperature towards body temperature (e.g., rise in temperature from room temperature to body temperature) may occur. As depicted in the bottom left chart of FIG. 45, a human finger touch can be detected or confirmed by identifying a change in the temperature signal towards body temperature (e.g., at or around 30° C.). As depicted in the bottom right chart of FIG. 45, a touch event initiated by an object (e.g., room-temperature object) other than a human finger would not elicit a change in temperature of the ultrasound input system towards body temperature.

B. Discernable Physical Characteristics

FIG. 46 is a combination schematic side view 4602 and signal map 4604 depicting ridges 4606 and valleys 4608 of a fingerprint initiating a touch event on an ultrasound input device 4610 according to certain aspects of the present disclosure. When a user places a finger on a surface associated with an ultrasound input device 4610, the ultrasound input device 4610 may be able to detect a portion of the user's fingerprint. Generally, the ultrasound input device 4610 may sense a region that is smaller than a user's entire fingerprint, although that need not always be the case.

The ultrasound input device 4610 can identify ridges 4606 and valleys 4608 of the user's fingerprint (e.g., of the portion of the user's fingerprint). At ridges 4606, the ultrasound input device 4610 will detect a decrease in energy measurements of reflected signals due to the damping effect of the flesh of the ridge 4606. However, at valleys 4608, the same damping effect does not exist.

Therefore, an ultrasound input device 4610 measuring a finger as depicted in the schematic side view 4602 may generate a signal map 4604 showing ridges 4606 and valleys 4608. As seen in the signal map 4604, darker areas denote dips in energy measurements of reflected signals and lighter areas denote signals closer to a baseline energy measurement. While the entire fingerprint cannot be discerned from the field of view of the ultrasound input device 4610, a number of ridges 4606 and valleys 4608 can be discerned. By measuring the widths of ridges 4606 and valleys 4608, as well as inter-valley distances and inter-ridge distances (e.g., inter-ridge distance 4612), the ultrasound input device 4610 may be able to discern one finger from another finger. In an example case, a finger of an adult may show wider ridges 4606 and valleys 4608 than that of a youth. Thus, in a household with an adult and a child, the ultrasound input device 4610 may be able to discern between the two users based on discernable physical characteristics of the user's finger, such as fingerprint characteristics. In some cases, the presence of a repeating line pattern (e.g., a pattern of ridges 4606 and valleys 4608) can be used to confirm or make a determination as to whether or not the object initiating the touch event is a human finger.

In some cases, discernable physical characteristics, like fingerprints, can be used along with discernable energy signals to further identify users.

FIG. 47 is a schematic diagram depicting example reflected signals 4724, 4725 received by an ultrasound input system 4702 attributable to the same user initiating touch events with a glove 4708 and without a glove 4706 according to certain aspects of the present disclosure. A first plot 4710 associated with the ultrasound input device 3402 with touch input from a user not wearing a glove 4706 shows a transmitted signal 4722 and a first set of reflected signals 4724. The first set of reflected signals 4724 show a characteristic dampening of the reflected signals associated with a touch event. A second plot 4720 associated with the ultrasound input device 3402 with touch input from a user wearing a glove 4708 shows a transmitted signal 4722 and a second set of reflected signals 4725. The second set of reflected signals 4725 show a characteristic dampening of the reflected signals associated with a touch event that is somewhat similar to the first set of reflected signals 4725, but may have additional dampening due to the presence of the glove 4712. The first set of reflected signals 4724 can be processed to generate a first output voltage 4732. Similarly, the second set of reflected signals 4725 can be processed to generate a second output voltage 4733.

Thus, an ultrasound input system 4702 can distinguish between a gloved hand and a non-gloved hand. In some cases, certain actions may be available or not available depending on whether or not the user is wearing a glove. For example, in a medical office, certain functions associated with an ultrasound input system may be unavailable unless the user is wearing a glove to ensure proper protection is in place.

C. Extracting and Using Features

FIG. 48 is a flowchart depicting a process 4800 for extracting features from a signal of an ultrasound input system according to certain aspects of the present disclosure. The method illustrated in FIG. 48 will be described in the context of a system comprising an ultrasound input device and one or more data processor determining an energy signal from a touch event. It is understood, however, that the invention can be applied to other circumstances.

At optional block 4802, a baseline signal can be received by an ultrasound input system. The baseline signal can be energy measurements associated with no touch event (e.g., when no user is touching the surface coupled to the ultrasound input device). Removing such baseline signals can result in more effective range to sample during analog-to-digital conversion, for example, as described herein in reference to at least FIG. 26. For example, the ultrasound input system can emit a first signal. Any suitable number of reflected ultrasonic signals and reflected-emission signals can then be measured by the ultrasound input system. The signal can be determined not to be associated with a touch event (e.g., a finger touching an external surface) based on the characteristics of the received signals. For example, the received signals can indicate a baseline signal associated an air signal. Further example details of a baseline signal are described herein.

At block 4804, the system can transmit an emitted signal using an ultrasound input device. The ultrasound input device can be coupled to a material layer having an external surface located opposite the material layer from the ultrasound input device. The emitted signal can pass through the material layer towards the external surface. Any number of reflected ultrasonic signals and reflected-emission signals can result from an initial emitted ultrasonic signal until the signals become too attenuated to be reflected and/or detected, as described in detail herein.

At block 4806, a signal associated with a touch event is received. For example, the system can receive a set of reflected ultrasound signals associated with the emitted signal. The received signal can be a measurement of energy associated with reflected ultrasonic waves. The signal received at block 4804 can depend on how the touch event is initiated (e.g., timing of the touch, style of touch, amount of force of the touch, physical characteristics of the object initiating the touch).

At block 4808, the one or more data processors of the system can determine an energy signal associated with a set of reflected ultrasound signals associated with the touch event between an object and an external surface of a material layer coupled to the ultrasound input device.

As an example, in reference to FIG. 26, the flow 2600 includes emitting and receiving an ultrasonic signal as illustrated in a first plot 2602. The first plot 2602 shows an analog measurement of a first signal 2603 for an emitted ultrasonic signal and a set of subsequent signals 2604A, 2604B, 2604C, 2604D, 2604E for a set of reflected ultrasonic signals associated with an ultrasound input device. The flow 2600 can include an ultrasound input device with an analog summation or integration circuit 2620 and a summed voltage output 2622.

A second plot 2608 shows the first signal 2603 and a set of energy signals 2610A, 2610B, 2610C, 2610D, 2610E each corresponding to the energy of respective ones of the set of reflected ultrasonic signals. For illustrative purposes, the set of energy signals 2610A, 2610B, 2610C, 2610D, 2610E is depicted in solid line overlaid with the set of subsequent signals 2604A, 2604B, 2604C, 2604D, 2604E from the first plot 2602 shown in dotted line.

At block 4810, after determining the energy signal associated with the set of reflected ultrasound signals, features can be extracted from the signal associated with the touch event. Extracted features can be any suitable characteristic of the signal that can be discernable and/or able to inform an inference. The one or more data processor can be configured to extract feature information associated with the energy signal in any suitable manner.

In some embodiments, extracting the feature information can include identifying a pattern in the energy signal associated with a dip in energy measurements that is associated with the touch event. For example, when an individual places their finger upon the system, specifically the external surface, the individual's finger can absorb at least a portion of an emitted ultrasonic signal, thus causing a dip in the energy measurement.

The pattern can be identified in any suitable manner described herein. For example, in some embodiments, identifying the pattern in the energy signal can include identifying a depth of the dip, a duration of the dip, a presence of a subsequent dip after the dip, a delay between the dip and another dip, and/or a rate of change in the energy signal at an edge of the dip (e.g., during finger land or removal). In other embodiments, identifying the pattern can include identifying a change in the energy signal attributable to a temperature shift in the material layer, as described in detail herein.

In some cases, extracting features (i.e., feature information) at block 4810 can comprise comparing the signal to stored historical signal(s), such as to determine if the received signal at block 4810 matches a stored signal associated with a particular user. In some cases, extracting features at block 4810 can comprise identifying a pattern in the received signal, such as to identify that the received signal is attributable to a sharp tap or a place and press action. In some cases, extracting features at block 4810 can comprise measuring characteristics of the received signal. Any discernable characteristic of the received signal can be measured and used to make a determination or inference regarding the source of the touch event.

At block 4812, an inference can be determined based on the extracted feature information. The one or more data processor can be configured to determine an inference associated with an object based on the extracted feature information in any suitable manner.

For example, in some embodiments, determining the inference can include estimating a relative temperature of the object based on an identified change in the energy signal attributable to the temperature shift in the material layer. For example, an individual that touches the external surface of the material layer can have a body temperature that is higher than the ambient temperature and/or the temperature of the material layer. The determined energy signal can be influenced by temperature, as described herein, and thus allow for the one or more data processor to determine an inference of a temperature measurement and/or temperature shift (e.g., as measured by a temperature sensor as described below.

In other embodiments, the one or more data processors can determine the inference by comparing the identified pattern with stored data. The stored data can be associated with prior touch events of the external surface. For example, the prior touch events of the external surface may have been performed by an individual. The current touch event can be compared to the prior touch events to determine if the current touch event is also performed by the individual, as described herein.

In yet other embodiments, the one or more data processors can determine the inference by using the feature information to determine that the touch event is associated with a human digit, a bare human digit, a wet human digit, a dry human digit, and/or a gloved human digit. For example, as described herein, the determined energy signal can be affected by one or more than one characteristic(s) of the individual's digit(s) placed on the external surface of the material layer. The one or more data processors can also determine the inference by using the feature information to determine a style of touch (e.g., tap, double tap, place and press, etc.) of the touch event, a touch intensity associated with the touch event, and/or a physical characteristic of the object.

In some embodiments, determining the inference can include identifying that the object is associated with one out of a plurality of users based on associating the touch event with the style of touch of the touch event, the touch intensity associated with the touch event, and/or the physical characteristic of the object. The physical characteristic of the object can include a measurement associated with a portion of a fingerprint contacting the external surface.

In some embodiments, the one or more data processors can determine an additional signal associated with an additional sensor (e.g., a temperature sensor of FIG. 28) associated with the ultrasound input device. The one or more data processors can then determine the inference further using the additional signal. The additional sensor can include any suitable additional sensor associated with the ultrasound input device. For example, the additional sensor can include a temperature sensor, a pressure sensor, a charge-coupled device, etc.

For example, the system can include a temperature sensor. The temperature sensor can record temperature of, for example, the external surface of the system over time. Since the human fingertip has a certain physical size and temperature range, when a human touches the external surface the one or more data processors can determine that the touch event is caused by a human finger. As an illustrative example, the temperature sensor can record the temperature of at least one portion of the external surface at a predetermine interval (e.g., 1 ms, 0.1 s, 1 s, etc.). The temperature sensor can record the ambient temperature (e.g., 70° F.). When a user touches the external surface during a touch event, the system can record an energy signal which can include, for example, a dip in energy. During the touch event, the temperature sensor can continue to measure the temperature of the external surface. The human finger in contact with the external surface can increase the temperature of the external surface, thus leading the temperature sensor to record an increase in temperature. For example, the human finger can be approximately 98° F. The temperature sensor can record a temperature between the ambient temperature of 70° F. and the temperature of the human finger of 98° F., since the finger will heat up the external surface and the temperature sensor.

The temperature measured by the temperature sensor can be an additional signal associated with an additional sensor (e.g., the temperature sensor) associated with the ultrasound input device. The one or more data processors can determining an inference using the additional signal along with the energy signal. For example, the one or more data processors can determine that the dip of the energy signal as well as the rise in temperature from an ambient temperature to a higher temperature between the ambient temperature and an average human temperature indicates that the touch event is indicative of a human finger touching the external surface. In some cases, the one or more data processors can determine whether or not a signal change is a result of a human touch or from another object (e.g., table, pocket fabric, pen/stylus, etc.) coming into contact with the external surface using the temperature data from the temperature sensor. For example, the temperature sensor may not measure as large of an increase in temperature when touched with a table, pocket fabric, pen/stylus, etc. as when touched by a human finger.

In some cases, the temperature sensor may be a known (i.e., predetermined) distance from the finger. For example, the temperature sensor may be on the opposite side of the external surface from the finger. In this case, during processing of the additional signal associated with an additional sensor (e.g., temperature sensor), a heat transfer problem with known boundary conditions and initial values can be solved to determine what the temperature is at the external surface.

In some embodiments, the additional sensor can include a pressure sensor and/or a strain gauge. For example, a typical touch from a human finger can impose a certain force and strain on the external surface which can be propagated to the additional sensor. The pressure sensor and/or the strain gauge can measure the force and/or strain imparted into the system by the finger. The one or more data processors can determine that the force and/or strain measured by the pressure sensor and/or the strain gauge indicates a force and/or stain typical of a touch of a finger. The one or more data processors can also determine whether or not the energy signal is indicative of a touch of a finger. If both the additional signal, from the pressure sensor and/or the strain gauge, as well as the energy signal indicate a touch of a finger, then the one or more data processors can determine that the touch event was a touch of the finger.

In some cases, the additional sensor can include the strain gauge. The strain gauge can detect the deflection of the surface associated with the touch event and can output an electrical signal. The stronger the touch event (e.g., more force exerted on the external surface by the object such as a finger), the more deflection imparted onto the strain gauge. Thus, the strain gauge can output a larger electrical signal.

At block 4814, the one or more data processors can generate an output signal associated with the determined inference. The output signal can include any suitable output generated based on the determined inference. In some embodiments, the output signal can indicate a particular action that can be performed by the one or more data processors and/or an external devices.

In some embodiments, the one or more data processors can perform an action based on the extracted feature(s). The action can include any suitable process that can occur based on the output signal. In an example, if the extracted features are used to identify a particular use, the action performed can be to authenticate or authorize the user to access a resource. In another example, if multiple users have preset customizations for a particular ultrasound input system, the extracted feature information can be used to determine which user is interacting with the ultrasound input system and therefore perform the customized actions for that particular user. In some cases, performing actions can include permitting or denying access to a resource, such as denying access to a room or a tool when the extracted features indicate that a user is not wearing gloves when gloves are required.

VIII. Machine Learning Decision Algorithm

FIG. 49 is a chart 4900 depicting a machine learning decision algorithm used to improve touch detection according to certain aspects of the present disclosure. As described with reference to FIG. 35, weighting parameters can be used to drive various decisions regarding when a touch event is detected or not detected. In some cases, a machine learning approach can take into account sensor output values and slopes between a sensor value and a previous sensor value to generate inferences that a touch event has occurred or not occurred. The machine learning approach can use a decision function (f), such as:

$$f = w_0 X[n] + w_1 X[n-1] + w_2 X[n-2] + \ldots + w_m X[n-m] + w_{s0} S[n] + W_{s1} S[n-1] + \ldots + w_{sm} S[n-m]$$

where $w_n$ and $w_{sn}$ are weighting parameters, $X[n]$ is the current sensor output, $X[n-1]$ is the previous sensor output, $X[n-m]$ is the m-th previous sensor output, $S[n]$ is the slope of the current sensor output (e.g., as compared to an immediately prior sensor output), $S[n-1]$ is the slope of the previous sensor output, and $S[n-m]$ is the slope of the m-th previous sensor output. In some cases, other parameters can be used in the decision function.

The weighting parameters of the decision function can be trained over a corpus of data to generate a decision boundary between inputs that are considered touch events and inputs that are not considered touch events, as depicted in chart 4900. Thus, for any given sensor outputs and slopes of sensor outputs, a point on chart 4900 can be identified, and if that point falls above the decision boundary, those sensor outputs and slopes of sensor outputs can be considered indicative of a touch event.

IX. Applications

FIG. 50 is a schematic diagram depicting an electronic device with an ultrasound input device according to certain aspects of the present disclosure. The electronic device 5000 can include a case 5002, a screen 5004, one or more front facing buttons 5006, a pair of ultrasound input devices 5008, and an individual ultrasound input device 5010. The electronic device 5000 can include a processor, memory, and a network interface. In some embodiments, the ultrasound input devices can be coupled to the processor of the electronic device 5000.

In some embodiments, the pair of ultrasound input devices 5008 can define an input touch area 5012 to detect user inputs. For example, a user can contact the input touch area 5012 to adjust the volume, the brightness, etc. of the electronic device. In some embodiments, an array of ultrasound input devices can be positioned under the screen or other places such as the side or the back of the electronic device to detect touch inputs and replace or augment a capacitive touch or force touch capability or mechanical buttons of the electronic device. The individual ultrasound input device 5010 can define an input touch area 5014 to detect user inputs. The input touch area 5014 can be configured to control the device power, screen on/off, etc.

In some embodiments, an ultrasound input device can be used to detect a touch input at each of the one or more front facing buttons 5006. The ultrasound input device can replace the capacitive sensing used to detect a touch input on a fingerprint sensor. The ultrasound input device offers a low power solution to detect the touch input on the fingerprint sensor. In some embodiments, one or more ultrasound input devices can be positioned under a logo 5022 on the back 5020 of the case 5002 to detect user input. They also could be placed under the side of the electronic device to replace the commonly used side mechanical buttons used, for example, for power or volume.

FIG. 51 is a schematic depiction of a steering wheel 5102 with an ultrasound input device 5104 according to certain aspects of the present disclosure. The ultrasound input device 5104 can be used to form a touch input area on the steering wheel 5102 to detect a touch input. The flexibility of the ultrasound input device 5104 facilitates detection of a touch input through a variety of materials used to manufacture a steering wheel such as plastic, leather, wood, etc. The cross section 5106 of the steering wheel 5102 shows the ultrasound input device coupled to a surface 5108 to form a touch input area 5110. The touch input area can be combined with a plurality of touch input areas for a applications such as cruise control, infotainment input control, cellular communications controls, volume, and driver detection systems. For example, the ultrasound input device 5104 can be used in a driver detection system to determine if a driver's hands are in contact with the steering wheel.

FIG. 52 is a schematic depiction of a keypad 5200 using an ultrasound input device according to certain aspects of the present disclosure. The shape and materials that can be used to design a touch area with underlying ultrasound input devices are limited only be the creativity of the designer. For example, a 12-key standard telephone keypad is shown in FIG. 52. The keypad 5200 can include 12 ultrasound input devices 5202 to form a touch area 5204 for each key. As another example, the keypad 5200 can include 23 or fewer ultrasound input devices 5202.

FIG. 53 is a schematic diagram depicting a robotic arm using an ultrasound input device according to certain aspects of the present disclosure. The robotic arm 5300 can include a first finger 5302 and a second finger 5304. The ultrasound input device can be implemented as a robot finger input device. The first finger 5302 and the second finger 5304 can include a first ultrasound input device 5306 and a second ultrasound input device 5308 respectively. The first ultrasound input device 5306 can form a contact area 5310 on the surface of the first finger 5302 and the second ultrasound input device 5308 can form a second contact area 5312 on the second finger. The ultrasound input devices improve the detection capability of the robot arm because they can be integrated into fingers comprising any material. Further, the ultrasound input devices can detect a touch input without requiring a cutout and/or a different material being integrated into the finger.

In some cases, the ultrasound input device can identify the type of material being touched by analyzing the energy measurement signals. In some cases, the ultrasound input device can identify the elasticity of the object being grasped. For example, a less elastic object will generally absorb less ultrasonic waves than a more elastic object, thus resulting in a generally higher energy measurement signal. In some cases, a determination about the elasticity of the object can be used to adjust the behavior of the robot arm, such as to adjust the force with which the robot arm grasps the object. In some cases, the ultrasound input device may be capable of detecting texture or other mechanical properties of an object based on analyzing the energy measurement signals associated with the object. In some cases, analysis of energy measurement signals from an ultrasound input device can be combined with other inputs, such as machine vision, to confirm or make determinations about an object with which the robot arm is to interact or is interacting.

FIG. 54 is a schematic diagram depicting a piece of furniture 5402 using an ultrasound input device 5404 according to certain aspects of the present disclosure. The ultrasound input device 5404 can be coupled to the furniture 5402 in any suitable fashion. A user touching the furniture 5402 at or adjacent to the location of the ultrasound input device 5404 can be detected by the ultrasound input device 5404 (e.g., via ultrasound touch sensor 5412). Upon detecting touch, the ultrasound input device 5404 can perform any preprogrammed functions. For example, a communication module 5414 of the ultrasound input device 5404 can send a signal (e.g., a wireless signal) to a control module 5406 spaced apart from the ultrasound input device 5404 and/or the furniture 5402. The control module 5406 can control another device, such as a power switch 5408 coupled to a light bulb 5410. Thus, upon pressing a location on the furniture 5402 that is at or adjacent to the location of the ultrasound input device 5404, the light bulb 5410 can be turned on, be turned off, or otherwise be controlled. The device being controlled (e.g., light bulb 5410) can be in the same environment as the ultrasound input device 5404, although that need not always be the case. In some cases, the device being controlled can be in an adjacent environment or even a distant environment.

In some embodiments, a piece of furniture or IoT could be equipped with one or more of these ultrasound input devices which could operate individually or in the form of a network of sensors communicating with one another to perform multiple tasks. The sensors could also communicate with other sensors on other devices as well, through the IoT device itself or through sensors' general-purpose programmable processor, to exchange information.

The ultrasound input device 5404 according to certain aspects of the present disclosure can operate on very low power, such as from an internal battery 5416. This battery-powered, low power operation can permit use of the ultrasound input device 5404 in otherwise inaccessible or inconvenient locations. For example, a light switch can be incorporated into a table or desk, or a television remote can be incorporated into an armrest of a chair.

In some cases, an ultrasound input device 5404 can be positioned on a hidden surface 5418 so as to hide the ultrasound input device 5404 from sight during normal operation. A hidden surface 5418 can be an underside of a table (e.g., furniture 5402), the inside of a piece of furniture, the inside of a wall, or any other suitable location hidden from view. Thus, the hidden ultrasound input device can be actuated only by those knowing its location, which would otherwise be hidden from view.

FIG. 55 is a set of charts depicting the energy measurement signals of an ultrasound input device demonstrating material detection according to certain aspects of the present disclosure. The characteristics of an energy measurement signal, such as shape, duration, slopes, or other characteristics, can be leveraged to make a determination as to the material interacting with the ultrasound input device. For example, a bare human finger may elicit a different energy measurement signal than a human finger wearing a plastic glove. The top chart depicts an example of an energy measurement signal from a bare human finger contacting an ultrasound input device, with a characteristic rapid drop and relatively quick increase back to a baseline signal as the finger is removed. The bottom chart, however, depicts an example of an energy measurement signal from a human finger wearing a plastic glove. When a plastic glove is worn, the energy measurement signal has different characteristics than when no plastic glove is worn. For example, the energy measurement signal when a plastic glove is worn has a discernably slower increase back to the baseline signal after the finger is removed. This relatively slower increase is in part due to the slight stickiness between the interaction of the plastic glove and the substrate of the ultrasound input device. While the human finger may be pulling away more quickly, the plastic glove around the finger will tend to remain on the substrate for a short duration longer, which can be discernable in the resultant energy measurement signal. This type of comparison can be used to make determinations as to the material initiating a touch event.

X. Additional Piezoelectric Array Designs

FIG. 56 is a schematic diagram of a piezoelectric resonator array 5600 containing piezoelectric cantilevers 5602 usable in an ultrasound input device according to certain aspects of the present disclosure. The piezoelectric resonator array 5600 can contain a set of piezoelectric cantilevers 5602 on a base 5604. A piezoelectric resonator array 5600, when acoustically coupled to a material layer (e.g., material layer 102 of FIG. 1) can operate with a particular acoustic resonance. When a touch event is occurring, the touch event can cause the piezoelectric resonator array 5600 to resonate differently. This change in acoustic resonance due to the touch event can be detected and used as a sensor signal in an ultrasound input device, such as instead of a PMUT. Additionally, the piezoelectric cantilevers 5602 can be driven to flex and thus induce emitted signals.

FIG. 57 is a schematic diagram of a piezoelectric resonator array 5700 containing piezoelectric pillars 5702 usable in an ultrasound input device according to certain aspects of the present disclosure. The piezoelectric resonator array 5700 can contain a set of piezoelectric pillars 5702 on a base 5704. A piezoelectric resonator array 5700, when acoustically coupled to a material layer (e.g., material layer 102 of FIG. 1) can operate with a particular acoustic resonance. When a touch event is occurring, the touch event can cause the piezoelectric resonator array 5700 to resonate differently. This change in acoustic resonance due to the touch event can be detected and used as a sensor signal in an ultrasound input device, such as instead of a PMUT. Additionally, the piezoelectric pillars 5702 can be driven to flex and thus induce emitted signals. The piezoelectric pillars 5702 can be arranged in any suitable pattern, such as a hexagonal grid.

Aspects of embodiments can be implemented in the form of control logic using hardware circuitry (e.g., an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned herein are incorporated by reference in their entirety for all purposes. None is admitted to be prior art.

As used below, any reference to a series of examples is to be understood as a reference to each of those examples disjunctively (e.g., "Examples 1-4" is to be understood as "Examples 1, 2, 3, or 4").

Example 1 is a touch sensor chip, comprising: an ultrasound sensor layer comprising an array of ultrasonic transducers, wherein the array of ultrasonic transducers comprises one or more piezoelectric micromachined ultrasonic transducers; and an integrated circuit layer coupled to the ultrasound sensor layer, wherein the integrated circuit layer comprises circuitry configured for: driving the array of ultrasonic transducers to generate ultrasound signals; receiving reflected ultrasound signals using the array of ultrasonic transducers; and generating an energy signal associated with received reflected ultrasound signals.

Example 2 is the chip of example(s) 1, wherein the ultrasound sensor layer and integrated circuit layer are enclosed within a housing couplable to a material layer through which a touch event can be sensed by the ultrasound sensor layer.

Example 3 is the chip of example(s) 1 or 2, wherein the sensor layer is formed and wafer bonded to the integrated circuit layer during fabrication.

Example 4 is the chip of example(s) 1 or 2, wherein the sensor layer is fabricated directly onto the integrated circuit layer during fabrication.

Example 5 is the chip of example(s) 1-4, wherein the array of ultrasonic transducers comprises a transmitting set of ultrasonic transducers configured for transmitting ultrasound signals and a receiving set of ultrasonic transducers configured for receiving ultrasound reflections associated with the transmitted ultrasound signals.

Example 6 is the chip of example(s) 5, wherein the transmitting set of ultrasonic transducers comprises a high frequency transmitting subset of ultrasonic transducers and a low frequency transmitting subset of ultrasonic transducers, and wherein the receiving set of ultrasonic transducers comprises a high frequency receiving subset of ultrasonic transducers and a low frequency receiving subset of ultrasonic transducers.

Example 7 is the chip of example(s) 6, wherein the low frequency transmitting subset of ultrasonic transducers are arranged to surround the low frequency receiving subset of ultrasonic transducers, and the high frequency transmitting subset of ultrasonic transducers are arranged to surround the high frequency receiving subset of ultrasonic transducers.

Example 8 is the chip of example(s) 5-7, wherein the integrated circuit layer comprises ultrasound transmitting circuitry and ultrasound receiving circuitry, wherein the ultrasound transmitting circuitry is electrically coupled to the transmitting set of ultrasonic transducers and not electrically coupled to the receiving set of ultrasonic transducers, and wherein the ultrasound receiving circuitry is electrically coupled to the receiving set of ultrasonic transducers and not electrically coupled to the transmitting set of ultrasonic transducers.

Example 9 is the chip of example(s) 1-8, wherein the array of ultrasonic transducers are arranged to facilitate beamforming through a material layer through which a touch event can be sensed by the ultrasound sensor layer.

Example 10 is a method, comprising: generating a driving signal in an integrated circuit coupled to a transmitting ultrasonic transducer in an array of ultrasonic transducers coupled to the integrated circuit, wherein the transmitting ultrasonic transducer is a piezoelectric micromachined ultrasonic transducer; generating an emitted ultrasound signal, by the transmitting ultrasonic transducer, in response to the driving signal, wherein generating the emitted ultrasound signal comprises transmitting the emitted ultrasound signal through a material layer in a longitudinal direction that is normal to an exterior surface of the material layer or within 20% of normal to the exterior surface of the material layer; receiving a set of reflection signals at a receiving ultrasonic transducer in the array of ultrasonic transducers, wherein the set of reflection signals comprise one or more ultrasound signals associated with the emitted ultrasound signal, and wherein the receiving ultrasonic transducer is a piezoelectric micromachined ultrasonic transducer; measuring an energy signal associated with the received set of reflected signals; and determining that a touch event has occurred at the exterior surface of the material layer based on the measured energy signal.

Example 11 is the method of example(s) 10, wherein measuring the energy signal comprises: generating a non-negative analog signal associated with the received set of reflection signals using analog circuitry of the integrated circuit; and generating the energy signal by converting the analog signal into a digital signal.

Example 12 is the method of example(s) 10 or 11, wherein the array of ultrasonic transducers is located within a sensor layer that is coupled to an integrated circuit layer comprising the integrated circuit, and wherein the sensor layer and the integrated circuit layer are enclosed within a hosing couplable to the material layer.

Example 13 is the method of example(s) 12, wherein the sensor layer is formed and wafer bonded to the integrated circuit layer during fabrication.

Example 14 is the method of example(s) 12, wherein the sensor layer is fabricated directly onto the integrated circuit layer during fabrication.

Example 15 is the method of example(s) 10-14, further comprising: generating an additional driving signal in the integrated circuit; driving an additional transmitting ultrasonic transducer using the additional driving signal to generate an additional emitted ultrasound signal; receiving an additional set of reflected signals at an additional receiving ultrasonic transducer, wherein the additional set of reflected signals are associated with the additional emitted ultrasound signal; measuring an additional energy signal associated with the received additional set of reflected signals; and wherein determining that the touch event has occurred is further based on the measured additional energy signal.

Example 16 is the method of example(s) 15, wherein the additional emitted ultrasound signal is at a frequency that is different from a frequency of the emitted ultrasound signal.

Example 17 is the method of example(s) 10-16, wherein the array of ultrasonic transducers comprise a plurality of transmitting ultrasonic transducers and a plurality of receiving ultrasonic transducers, and wherein the plurality of transmitting ultrasonic transducers are arranged to surround the plurality of receiving ultrasonic transducers.

Example 18 is the method of example(s) 10-17, wherein the integrated circuit comprises ultrasound transmitting circuitry and ultrasound receiving circuitry, wherein the ultrasound transmitting circuitry is electrically coupled to the transmitting ultrasonic transducer and not electrically coupled to the receiving ultrasonic transducer, and wherein the ultrasound receiving circuitry is electrically coupled to the receiving ultrasonic transducer and not electrically coupled to the transmitting ultrasonic transducer.

Example 19 is the method of example(s) 10-18, further comprising: generating one or more additional driving signals in the integrated circuit; and driving one or more additional transmitting ultrasonic transducers using the one or more additional driving signals to generate one or more additional emitted ultrasound signals, wherein the one or more additional emitted ultrasound signals and the emitted ultrasound signal are designed to interact to achieve a desired pattern of constructive interference to facilitate beamforming, wherein the set of reflections signals comprise one or more ultrasound signals associated with the emitted ultrasound signal and the one or more additional emitted ultrasound signals.

Example 20 is the method of example(s) 19, wherein the receiving ultrasonic transducer is surrounded by the transmitting ultrasonic transducer and the at least one additional transmitting ultrasonic transducers, and wherein the desired pattern of constructive interference is adjustable to change a surface area of a sensitive region on the exterior surface of the material layer that is responsive to touch.

What is claimed is:

1. A touch sensor chip, comprising:
an ultrasound sensor layer comprising an array of ultrasonic transducers, wherein the array of ultrasonic transducers comprises a transmitting set of ultrasonic transducers configured for transmitting ultrasound signals and a receiving set of ultrasonic transducers configured for receiving ultrasound reflections associated with transmitted ultrasound signals, wherein the transmitting set of ultrasonic transducers are separate from the receiving set of ultrasonic transducers, wherein the transmitting set of ultrasonic transducers are arranged to surround the receiving set of ultrasonic transducers within the ultrasound sensor layer; and
an integrated circuit layer coupled to the ultrasound sensor layer, wherein the integrated circuit layer comprises circuitry configured for:
driving the array of ultrasonic transducers to generate ultrasound signals;
receiving reflected ultrasound signals using the array of ultrasonic transducers; and
generating an energy signal associated with received reflected ultrasound signals.

2. The chip of claim 1, wherein the ultrasound sensor layer and the integrated circuit layer are enclosed within a housing couplable to a material layer through which a touch event can be sensed by the ultrasound sensor layer.

3. The chip of claim 2, wherein an additional sensor is coupled to the integrated circuit layer, wherein the additional sensor is enclosed within the housing, wherein the additional sensor is a thermal sensor, a vibration sensor, or a gyroscope.

4. The chip of claim 1, wherein the ultrasound sensor layer is formed and wafer bonded to the integrated circuit layer during fabrication.

5. The chip of claim 1, wherein the ultrasound sensor layer is fabricated directly onto the integrated circuit layer during fabrication.

6. The chip of claim 1, wherein the transmitting set of ultrasonic transducers comprises a high frequency transmitting subset of ultrasonic transducers and a low frequency transmitting subset of ultrasonic transducers, and wherein the receiving set of ultrasonic transducers comprises a high frequency receiving subset of ultrasonic transducers and a low frequency receiving subset of ultrasonic transducers.

7. The chip of claim 6, wherein the low frequency transmitting subset of ultrasonic transducers are arranged to surround the low frequency receiving subset of ultrasonic transducers, and the high frequency transmitting subset of ultrasonic transducers are arranged to surround the high frequency receiving subset of ultrasonic transducers.

8. The chip of claim 6, wherein the high frequency transmitting subset of ultrasonic transducers and the low frequency transmitting subset of ultrasonic transducers generate the ultrasound signals during a touch event.

9. The chip of claim 1, wherein the integrated circuit layer comprises ultrasound transmitting circuitry and ultrasound receiving circuitry, wherein the ultrasound transmitting circuitry is electrically coupled to the transmitting set of ultrasonic transducers and not electrically coupled to the receiving set of ultrasonic transducers, and wherein the ultrasound receiving circuitry is electrically coupled to the receiving set of ultrasonic transducers and not electrically coupled to the transmitting set of ultrasonic transducers.

10. The chip of claim 1, wherein the array of ultrasonic transducers are arranged to facilitate beamforming through a material layer through which a touch event can be sensed by the ultrasound sensor layer.

11. The chip of claim 1, wherein the array of ultrasonic transducers comprises one or more piezoelectric micromachined ultrasonic transducers, one or more capacitive micromachined ultrasonic transducers, one or more integrated bulk piezoelectric transducers, or one or more non-integrated bulk piezoelectric transducers.

* * * * *